(12) United States Patent
Labrador

(10) Patent No.: US 6,293,121 B1
(45) Date of Patent: Sep. 25, 2001

(54) WATER-MIST BLOWER COOLING SYSTEM AND ITS NEW APPLICATIONS

(76) Inventor: Gaudencio A. Labrador, 1312 Leaf Ter., San Diego, CA (US) 92114

( * ) Notice: Subject to any disclaimer, the term of this patent is extended or adjusted under 35 U.S.C. 154(b) by 0 days.

(21) Appl. No.: 09/137,499

(22) Filed: Aug. 20, 1998

Related U.S. Application Data

(63) Continuation-in-part of application No. 08/999,729, filed on Dec. 23, 1997, and a continuation-in-part of application No. 07/811,470, filed on Dec. 18, 1991, now Pat. No. 5,507,943, and a continuation-in-part of application No. 07/255,657, filed on Oct. 13, 1988, now Pat. No. 5,056,447.
(60) Provisional application No. 60/058,062, filed on Sep. 5, 1997.

(51) Int. Cl.[7] ........................................... F28D 5/00
(52) U.S. Cl. ................... 62/304; 62/310; 62/314
(58) Field of Search .............................. 62/314, 310, 304

(56) References Cited

U.S. PATENT DOCUMENTS

| | | | |
|---|---|---|---|
| 5,168,722 | * 12/1992 | Brock | 62/304 |
| 5,497,633 | * 3/1996 | Jones et al. | 62/314 |
| 5,598,719 | * 2/1997 | Jones et al. | 62/304 |
| 5,775,121 | * 7/1998 | Kuma et al. | 62/314 |
| 5,797,274 | * 8/1998 | Jackaman et al. | 62/171 |

* cited by examiner

Primary Examiner—William Doerrler
Assistant Examiner—Mark Shulman

(57) ABSTRACT

What had been created are various new processes with the corresponding newly created devices that support or to handle the new processes in order to attained the desired outcome of the new processes. One desired outcome is to produce a low technology cooling system that can be easily made by the ordinary man for himself and this is answered by the creation of a misting tube having a plurality of water misting nozzles and a blower blows wind thru the water mist towards a place or into a house or into an office. An alternative of this is a blower that blows wind thru the water mist created by an atomizer and into a house, a building, a work shop, a play area, or into a green house or plantation. An improvement of this is misting tube being place infront of a blower by attaching the misting tube to the frame/shell of the blower so that the misting tube goes freely with the left and right oscillation of the blower. A further improvement of this water-mist-blower system is where the water is mist sprayed inside a vacuumed air duct to speed up water evaporation wherein air is passed thru a multi-tube radiator inside the vacuumed air duct and the cold air from the air duct is passed thru a hybrid Centrifugal Cyclone separator to remove surplus water mist. Further created are desalination devices.

39 Claims, 18 Drawing Sheets

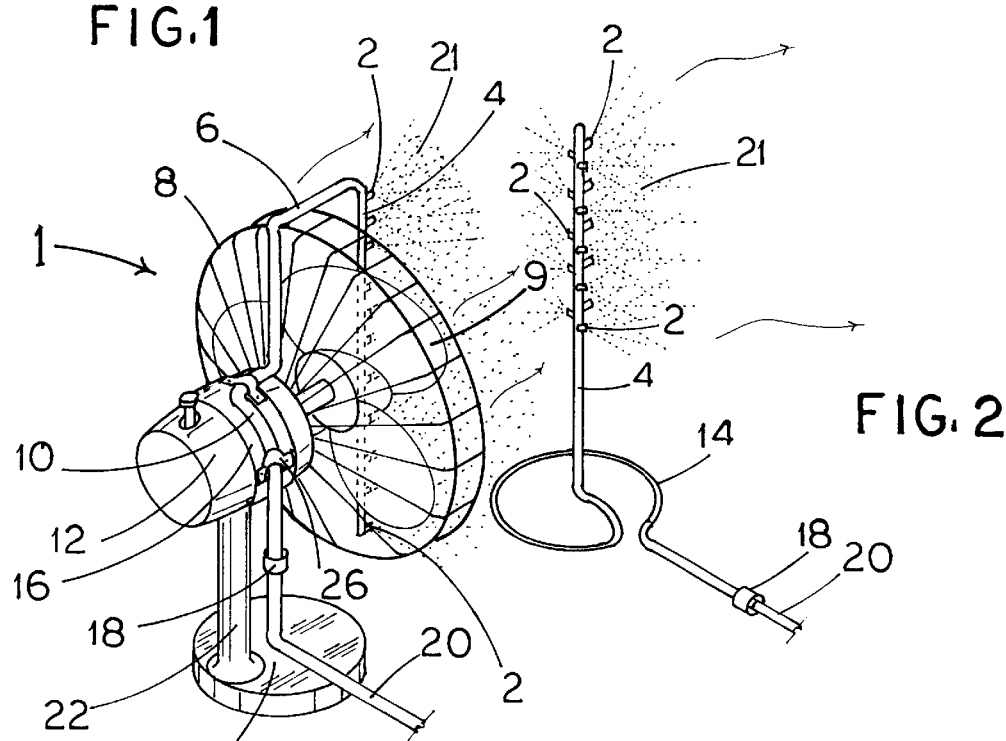
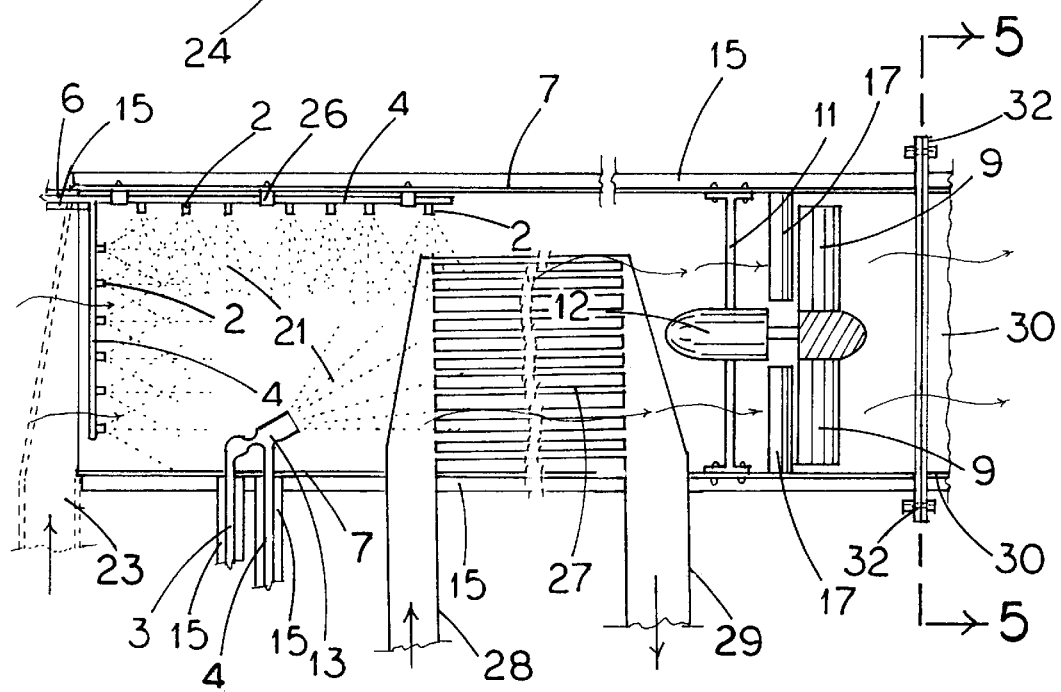

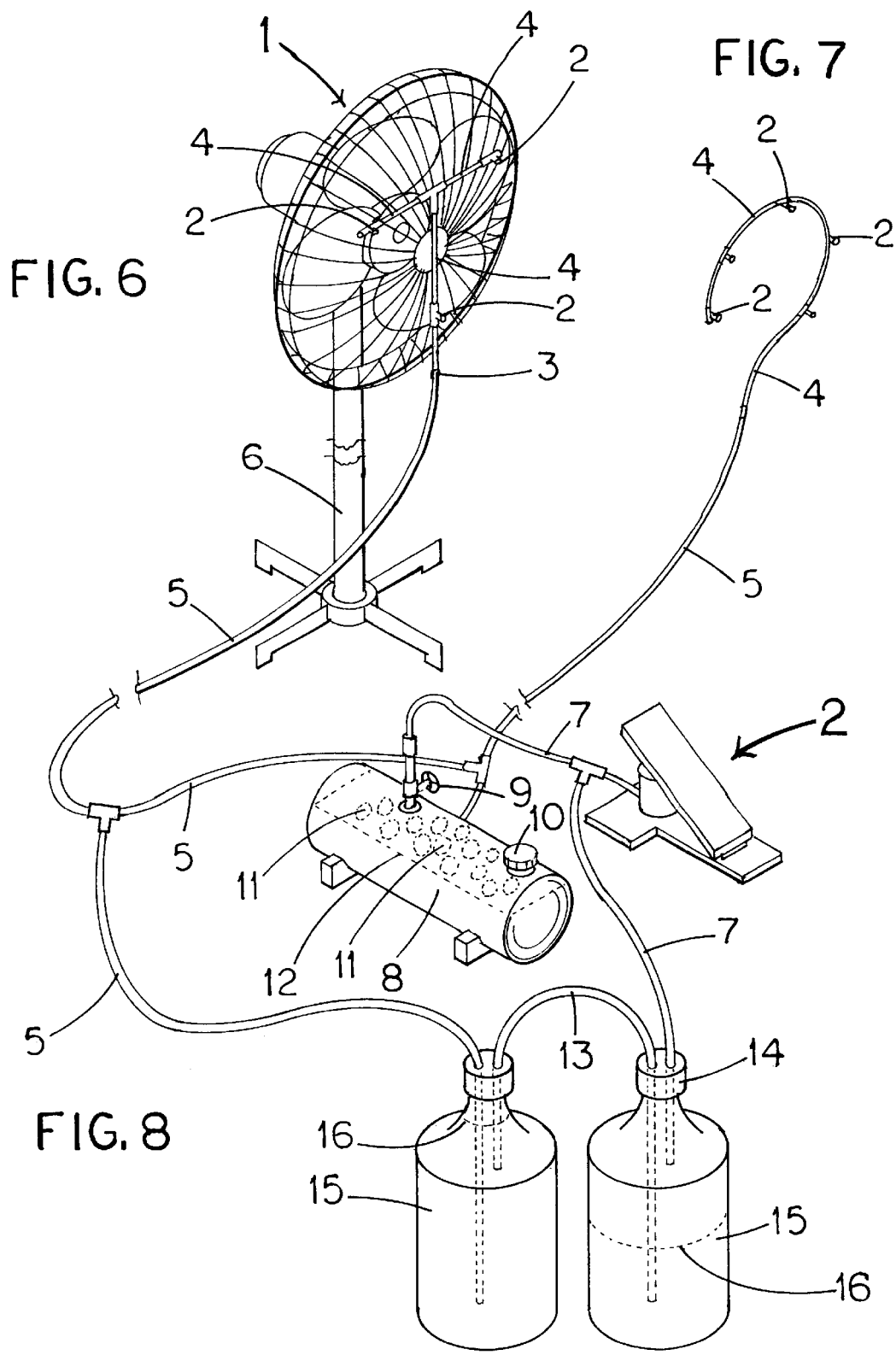

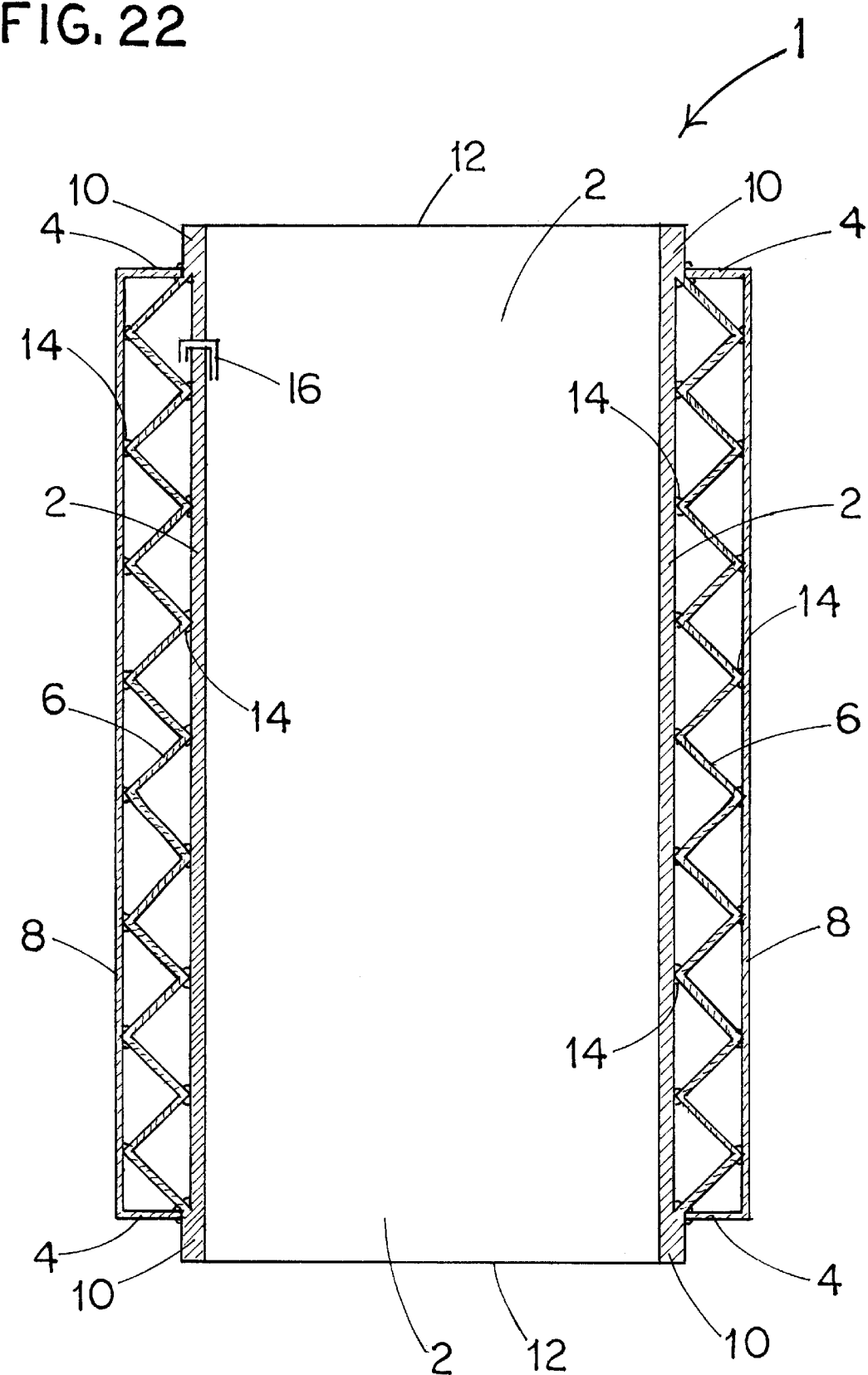

WATER-MIST BLOWER COOLING SYSTEM AND ITS NEW APPLICATIONS

1. CROSS REFERENCES

A.—This is the final application filing for the provisional application No. 60/058,062, dated Sep. 5, 1997; Foreign Filing License Feb. 11, 1998

B.—This is a Continuation-in-Part of:
 a. Appl. Ser. No. 07/811,470—Dec. 18, 1991—U.S. Pat. No. 5,507,943; attention to Claim-1, Claim-12, Claim-13, Claim-16;
 b. Appl. No. 07/255,657—Oct. 13, 1988—U.S. Pat. No. 5,056,447; attention to Configuration #17 of summary;
 c. Appl. No. 60/058,062—Sep. 5, 1997—Provisional Application; With Foreign Filing License Granted Feb. 11, 1998;—to establish Priority Date; and
 d. Appl. Ser. No. 08/999,729—date filed Dec. 23, 1997—opposite turbine.

2. There is no government assistance on this invention, hence, the rights of the inventor on this idea is full.

BACKGROUND OF THE INVENTION

1. Technical Field

This new idea deals with heat exchange processes, cooling processes, and condensation processes, using water, in lieu of FREON, as the volatile evaporative matter for the production of cold air and distillates, and to avoid using FREON which is destructive upon the ozone layer. The newly invented devices herein are designed to use evaporation of water as a means to produce cold air, which is then supplied into the living places, work places, play areas, rest areas, and into green houses or plantations. The air is cold by evaporating fine water mist spray into the air which absorbs the water vapor. By means of an open air blower, the water-air mixture is then directed or blown into the place where the cold air is needed. In cases where the wind is naturally blowing into the place where the cold air is needed, without a blower, the water is sprayed into the wind so that the wind is cold before getting into the designated or anticipated place, such as, a house, a playground, recreation area, an orchard plantation, and a residential area. There are many concomitant new applications of the new devices concurrently invented in support to the processes involved, such as, distillation of water to produce drinking water, and production of humid air to be fed into gas turbine engines, to name a few applications of the new devices. It should be noted at this point that evaporation is a cooling process of the gas mixture into which the liquid mist is mixed with, while condensation is warming up of the matter with which the condensing vapor is in contact with, hence, evaporation must be supported to the maximum. One of such support is maximizing the water surface in contact with the other matter or medium of the evaporation, and another support is creation of vacuum environment surrounding the water particles, meaning—removing the other matter that oppresses or holds the water molecules close together, thereby making the water molecules free to fly off.

2. Description of the Prior Arts

Evaporative air coolers had been invented and existing since 1937 for various purposes in the efforts to produce a cool environment around an object to be cooled, by means of evaporating water thru the air which is then supplied to the environment. The existing water cooling system comprises of the following cases:

1. Water mist is sprayed into the open air by means of nozzles that are fixedly located around a patio in a series along a pipeline outside the house without the use of a blower;
 2. Water mist is sprayed into the open air by fixedly located nozzles along the sidewalk outside shopping malls/stores and the mist is carried away by the wind regardless of where the wind is going;
 3. Water is evaporated by means of wet cloth spacedly hanging, and by means of a blower, the air is forced to pass thru in between the wet cloths in order to produce cold air which is then directed into the place where the cool air is needed.

In the case No. 1: (a). the water is wasted without effectively cooling the air because, without moving the air, the tiny water particles that are sprayed into the air just drop down on the floor of the patio without being evaporated and the floor of the patio gets wet; (b). Without a blower, only 30% of the mist evaporates into the air, and if there is wind, the mist is just carried away by the wind away from the patio. In the case No. 2, the water is wasted because the mist is just carried away by the wind to places not intended to be served with cold air. In the case No. 3, there is no water-mist spray, hence, water evaporation is very slow because there is very little amount of water surface being exposed to the air, and it will be a very bulky construction to increase the wet cloth section of the cooling system. Additionally, the evaporation clothes become depository for dry salts, dust, and bacteria.

To further identify the distinctness of my present invention, the following cited references are hereby discussed, to wit:

1. U.S. Pat. No. 5,168,722 issued Dec. 8, 1992 discloses an air cooling system by water evaporation thru a water absorbent wick in the form of an air passageway. The wick is made of water absorbent materials, such as, a pad which takes up water from the water pan base of the cooling device. What is emphasized in this patent is a wet air passage called wick, that brings water around the moving air. The wick, serving as enhancement for evaporation of water, is a very limited and ineffective water evaporator, because the water surface on the pan is only multiplied Ten times by the wick, it being that it is only a cubicle, further, the wick becomes a depository of dried salt, dust, and bacteria from the water that is moving up thru the capillaries of the wick because evaporation is a drying process for the salts. Unfortunately, this patent does not emphasize multiplication or maximizing water surface in contact with the wind to speed up evaporation. Additionally, this patent has no intention to create vacuum environment surrounding the water particles as a means to speed up evaporation of water into the air. Hence, my present invention is different and distinct from this subject patent.

2. U.S. Pat. No. 5,497,633 issued Mar. 12, 1996 discloses a water cooling system by high pressure water spray outside the air duct by nozzles at the outlet of the air duct. The real emphasis of this patent is a new design for an inflatable, collapsible, flexible air duct and flexible pavilion for easy handling and portability, but does not emphasize and further has no intention to maximize water surface in contact with the air to speed up evaporation, hence, has no intention to spray the water in the form of water mist which would by atomizing the water, hence, as presented, has no intention to use venturi nozzle atomizer or to use a spiral nozzle. In fact, as described in details for FIG. 4, line 18, page 6 of the patent, it says—"in FIG. 4, nozzles 64 at the outlet have orifices sized for producing large jets of water",—which means that the nozzles are not intentionally designed to produce atomized fine mist or not even fine sprinkles of water—that would be for the purpose of maximizing the water surface in contact with the air. Hence, this device fails to speed up evaporation.

Additionally, this patent discloses a wet porous membrane stretch across and substantially, not totally, blocking or restricting the air entrance towards the air fan and into the inflated air duct 56, hoping to evaporate the water adhering to the porous membrane. But, unfortunately, the pin holes of the membrane, through which the air passes, are very limited in quantity which fails to allow sufficient air flow that would provide maximum water-air contact.

Additionally, the air mover is only an air fan and not a turbine that would create a vacuum high enough to suck enough sufficient air through the wet membrane 60, hence, there is no intention to create a high vacuum in the chamber 56 between the wet membrane and the air fan, and hence, there is no intention to make the walls of the chamber into a highly resistant structure against implosion. It is very clear that this patent does not emphasize or has no intention to utilize vacuum as a means to enhance evaporation, because, in fact, it is emphasized that the air duct is pressurized as a means to make it stand up, which pressure reverses evaporation in the air duct. Hence, unfortunately, what has been evaporated from the wet membrane is condensed inside the pressurized air duct. It is therefore very clear that this U.S. Pat. No. 5,497,633 has no bearing to my new inventions. Hence, my new inventions are different and distinct from this patent.

3. U.S. Pat. No. 5,598,719 issued Feb. 4, 1997, has the same short comings and disadvantages as the aforementioned U.S. Pat. No. 5,497,633 because the emphasis is the new design of the structure for an outdoor rigid pavilion, hence, just the same as the preceding patent, the water is sprayed outside the air duct, except that the nozzles are now designed as atomizers but does not care to speed up evaporation in the air to the maximum as a means to efficiently cool the air, hence, the atomizer nozzles, as described, are just ordinary small diameter openings with nothing more added technology, and unfortunately, does not emphasize and has no intention to introduce high compressed air into the water nozzles or to discharge the water in the form of fine mist, that is why the clear intention of the patent is for outdoor applications only, and not for enclosures because the discharge place, or if the discharge place is an enclosure, the enclosure will get wet.

Additionally, this invention has no intention to evaporate water inside the air duct by means of vacuum environment. Further, this patent has no intention to spray water water mist directly into the open wind or to spray water directly in front of an air fan without the use of an air duct to make sure that the cold humid air is going into a definite place. Hence, my present invention is different and distinct from this patent.

4. U.S. Pat. No. 5,775,121 issued Jul. 7, 1998 discloses a refrigeration system that avoids the use of the ozone destructive FREON, and in lieu thereof, water mist is used as evaporative refrigerant. The emphasis of this patent is a new design for a heat exchanger that is why it does not care to speed up evaporation in the air, hence, it failed to emphasize and has not intention to incorporate a vacuum environment as a means to speed up evaporation of the water spray,—that is why, as shown and discussed in FIG. 12 and in the other drawings:

a. There is no sensible emphasized distance provided between the water sprayer 6 to the entrance of the heat exchanger 3, within same distance, there should be time spent by the water particles to evaporate to capture the heat from the medium air, so that the cooling gas—water-air mixture, attains maximum coolness before entering the heat exchanger 3;

b. There is no emphasis or intention of the inventor to build the heat exchanger 3 and the air duct 8e to be structurally strong against implosion;

c. The air duct 8e has a very small diameter in which case, in effect, its wall catches the remaining un-evaporated water particles which then loss opportunity to evaporate further while traveling along the air duct 8e,—a process that would further cool the cooling gas Ab. The presence of the water pan D and Da is an admission that there is no further evaporation after the air-water mixture passes the heat exchanger 3;

d. There is no incorporation of a compressor to compress the air-water mixture as a means to condense the water vapor by force in the effort to di-humidify the cooling gas;

e. Further, the introduction of fresh air OA thru the entrance pipe K indicates that there is no vacuum in air duct 8e;

f. Further, there is nothing in the whole discussion of the patent emphasizing that the air blower Fc is made strong enough to create a vacuum in air duct 8e.

It is therefore clear, that this invention failed to efficiently evaporate the water spray, much less, to cool the cooling gas. Additionally, this patent has no mention of water distillation and/or desalination as a by product and/or concomitant creations and new applications in the so much efforts to evaporate water. Hence, my present invention is different and distinct from this patent.

5. U.S. Pat. No. 5,797,274 issued Aug. 25, 1998 discloses a water spray cooling system effected by a nozzle that atomizes the liquid coolant which get out through the exit of compressed air at the nozzle. The emphasis of this patent is the invention and new application of a temperature-sensitive non-electrical device that controls the emission of atomized coolant being sprayed onto the surface of a hot body 1 to prevent undue rise of excessive temperature of the body 1, that is why it does not care or has no intention to describe why there is a need for atomization, and does not describe how atomization is done or attained by the coolant. Further, it does not care why there is a need to speed up evaporation in the air because it emphasizes that it is the hot body that evaporates the coolant. The thermocouple is already an old device, but using it to open a valve is a new application. What seems to be new is the thermal responsive chamber embedded in the hot surface and which is connected to the coolant valve by a capillary tube. The chamber and the capillary tube contains a fluid or a gas that expands with the increase in temperature. An increase in temperature of the fluid causes thermal expansion and increase in vapor pressure inside the capillary tube, and the vapor pressure opens the valve. What is emphasized by this patent is the new invention of a thermal-mechanical device that serves as an automatic activity controller. Hence, my invention is different and distinct from this patent.

In the Prior Arts a. There is no concept or intention to use an open air blower to speed up the evaporation of the water mist spray;

b. There is no concept or intention to force by open air blower the water-mist-air mixture into a designated place;

c. There is no concept or intention to spray water-mist into the natural wind at a definite place so that the resulting cold wind anticipatedly blows into the designated place where the cold wind is needed, such anticipated or designated places are houses, residential areas, playgrounds, recreation areas, shopping centers, orchard plantations, work places, green houses, and sun decks;

d. There is no concept or intention to use compressed air-atomizer-nozzle to spray water-mist into the air for the purposes of evaporating water and cooling the air;

e. There is no concept or intention to confine the water mist into a vacuumed air duct/evaporation chamber wherein an air turbine at the exhaust end of the air duct effects vacuum suction in the duct to produce cold dry air;

f. There is no concept or intention to place an air tube radiator-type assembly into a vacuum water-mist evaporation chamber to effect heat exchange in order to produce a supply of dry cold air out from the radiator and into a house or co office.

g. There is no concept or intention to make an assembly of high/tall standing pipes wherein a plurality of water-mist nozzles are connected to and around and along the length of each tall stand pipe to maximize production of water mist into the air or wind;

h. There is no concept or intention to distill water thru mist-evaporation-compression-condensation process;

Hence, the prior arts do not present similar concepts as it is now being presented in this application for patent.

SUMMARY OF THE INVENTION

This new invention is created for the following objectives and missions:

It is the $1^{st}$ mission of this invention to enable the poor man to make his own cold air with out being a victim of high technology in which he spends ¼ of his life trying to pay for the high technology. The $2^{nd}$ mission of this invention is to avoid the use of the ozone eliminator, FREON, and in lieu thereof, water is used a the volatile evaporation refrigerant as a means to produce humid cold air which is then supplied into the living places, work places, sports areas, into green houses, and into agri-plantations. Further, due to the increasing need for clean water for direct human consumption and for agriculture, and as a by-product of this evaporation activity, since water vapor is already cleaned out of salts and other minerals, it is therefore the $3^{rd}$ mission of this invention to produce distilled water and other distillates to take advantage of the concomitant new applications of the new devices concurrently invented as a result in the efforts to meet the requirements by the laws of God in the physical properties of matter to make the processes function good enough.

It is further the objectives of this invention:

a. To provide relief to the problems obstructing the commercial use of the prior arts;

b. To introduce a new technology that speeds up the evaporation of water, by multiplying the water surface exposed to the air, thru introduction of water mist into a moving air/wind or into a vacuumed chamber, by means of a misting nozzle or by means of an atomizer,—a device wherein compressed air is allowed to come out thru a venturi nozzle where water is coming out at the same time;

c. To introduce a new technology that pushes/blows water-mist-air mixture into a designated place, wherein, a misting device is attached to the front frame of an air blower, or wherein, a plurality of misting devices are set up inside of an air duct where air is being forced thru or being vacuumed by an air pump/turbine that blows the air out of the air duct and into a designated place, or wherein, a plurality of water misting devices are set to introduce mist into the natural wind—said misting devices are disposed in a place where the wind is anticipatedly blowing into a designated place.

d. To introduce a new technology for desalination of sea water by way of water mist spray and then the saturated humid air is compressed into a radiator system that is exposed to cold air or that is submerged into cold waters or that is refrigerated or frosted, or wherein, the humid compressed air is released underwater in the form of fine/tiny bubbles into a body of cold water, in order to produce distilled or drinking water;

e. To introduce a new technology for the production of dry cold air out of water mist evaporation, by way of passing the supply air thru a radiator pipe system that is inside a vacuum evaporation cold chamber;

f. To introduce a new technology for the rapid production of large quantities of cold air that is supplied to a large residential area, a large playground, a large orchard plantation, or a large green house, by way of a plurality of misting devices set in the open field to introduce water mist into the wind;

g. To introduce a new technology for force condensation of the clouds which is by way of vacuum pump sucking the clouds into an air duct and compressing it thru a cold radiator pipe system that is submerged into cold environment and releasing the compressed cloud in the form of tiny bubbles thru deep cold water;

h. To introduce a new process for distilling a liquid at low temperature, wherein, the liquid is mist sprayed inside a vacuum chamber to make it evaporate a low temperature, and then the resulting vapor is sucked by a force pump and then same vapor is compressed into a heat exchange high pressure radiator pipe assembly that is cooled or refrigerated in order to condense or liquefy the vapor by force inside the pipes;

i. To introduce a new process by which to supply cold high humidity salt free air into a gas turbine engine in order to increase the power out put of said engine in the same rate of fuel consumption, by way of cold water mist evaporation system;

j. To introduce various technologies by which to clean the cold moist air and to remove excess water mist particles from the cold air thru centrifugal devices having peripheral stilling chambers, windows, and moisture traps;

k. To introduce a new Technology by which to minimized usage of materials resistant to corrosive sea water in the construction of the vacuum evaporation chamber, wherein, low cost strong materials, such as concrete, is coated by anti-corrosion materials or protected by a high grade stainless steel or ceramics, or glass to name a few;

l. To create and introduce new designs of new devices, new machinery, new kinds of structural parts and mechanical parts made of new kinds of materials, such as glass, stainless steel, concrete, etc. protected from the action of salts, in support to the above new processes and new technologies.

The following are the basic un-amendable laws of God governing the physical properties of matter, such as water and air, among others, which support the processes and which lead to the creation of the new devices necessary to meet the requirements of the laws in order to obtain the desired maximum rewards, such as cold air, distilled water, and enjoyable life, new machinery, new devices to serve man, among other end results, to wit:

1. A vacuum environment surrounding a liquid is one major factor to speed up evaporation because the liquid molecules are not oppressed and are not held back close together, hence, the molecules are free to fly out after overcoming the surface tension between molecules;

2. To speed up evaporation, as much as possible, every molecule of the liquid must be place up front in contact with the surrounding medium or environment, such as air or a vacuum. This means that there should be no molecule behind another molecule of the liquid facing the medium of evaporation. Every molecule must be at the front line ready to fly free. Therefore, the atomizer must spray the water mist as fine as possible to the extent imaginable that only three molecules are grouped in one mist particle. This is maximizing the water surface in contact with the space upon which the liquid molecules migrate into;

3. Further, the mist must not be too crowded to prevent re-grouping or fusing together among the already misted particles as they will bump each other, and the fused mist particles become larger particles. Hence, the mist must be kept moving away from the atomizer;

4. The air into which the water mist is sprayed must be a moving wind to speed up evaporation. Otherwise, the air gets saturated immediately in humidity and the evaporation process stops, hence, the cooling process stops. By releasing the water mist into the wind, the water molecules are provided with successive free rooms in between the air molecules, into which rooms the water vaporizes;

5. As much as possible, in order to speed up evaporation, the air, serving as medium, must be dry, dehumidified, and humidity hungry air, in order to have plenty of rooms to accommodate vapor.

The air is made moisture hungry:
   a. by making the air partially vacuumed;
   b. by warming up or heating up the air;
   c. by dehumidifying the air, which is done:
      *** by compressing the humid air in a cold environment to forcibly condense its water content inside a heat exchange radiator tube assembly;
      *** by compressing the humid air and releasing the compressed humid air in a deep cold water— where the compressed humid air becomes over saturated in humidity because the spaces between the air molecules are eliminated. The air then becomes cold and less hungry, and the compressed vapor is caught or adheres to the high pressure cold water,—meaning, the high pressure water serves as condenser, vapor catcher or vapor trap and it is growing in quantity as a distilled water during the condensation process. This means that the vapor-air mixture must be compressed high enough in order to overcome the static pressure of the deep water before the air comes out thru tiny nozzles into the water in the form of tiny bubbles. The air bubbles come out of the water surface as a dehumidified cold air. The hungry cold air is then fed back and re-cycled into the vacuum evaporation chamber to pick up another new water vapor from the mist spray and get saturated, this same newly saturated air is again compressed and released as tiny bubbles in deep cold water for dehumidification. This complete cycle is a new process of distillation.

6. Additionally, under the same law as above, time is require by the water particles/mist to be able to evaporate and be dissolved as vapor into the air. To meet this requirement, the vacuum evaporation air duct is elongated or made longer to provide time for evaporation before reaching the vacuum turbine. The length of the vacuum air duct depends upon the speed or time spent of the air-water mixture in traveling from the point of the misting nozzles to the vacuum turbine. Additionally, the time for complete evaporation is directly proportional to:—a. the mist-air mixture ratio; and—b. how high is the vacuum.

To attain the foregoing objectives, the aforementioned laws must be satisfied, and as concomitant rewards, various new inventions, new designs of materials and parts, new configurations, and new processes have been created, which serve as highlights of this invention and which make this inventions different and distinct from the prior arts, and hereby applied for Proprietary Rights Protection, such as the following:

1. A new concept of blowing air thru a water mist spray towards a desired place to make the air cooler and to prevent incomplete evaporation of the mist;

2. A new concept of attaching a water hose/tube-mist-sprayer to the frames of an open air oscillating blower so that the mist sprayer goes with the left and right swinging of the air blower;

3. A new concept of constructing a self standing water pipe misting device that is provided with a plurality of misting nozzles connected around the pipe and along the length of the pipe to maximize production of water mist, and an air blower is set to blow air thru said misting device;

4. A new concept of erecting a plurality of standing misting water pipes in an array formation to maximize production of water mist into the wind that blows into a large residential community, recreation area, play ground, orchard plantation and greenhouses and work places;

5. A new concept of spraying water mist inside a vacuumed air duct, wherein the air blower is inside the exhaust end of the air duct so that there is more air going out of the duct than air going into the duct, the difference is supplied by the evaporated water mist, in order to convert the air into cold air inside the duct, it being that there is throttle valve at the inlet of the air duct to limit the air getting in;

6. A new concept of making dry cold air thru the use of water mist spray, wherein, a plurality of small air tubes are arranged and assembled into a radiator-type formation inside and along the length of the vacuumed evaporator air duct, and air is forced to pass thru the radiator air tubes by means of a main supply air pipe that is connected to all/each of the inlet of the radiator air tubes and a main output air pipe that is connected to all or each of the outlet ends of the radiator air tubes, said main output air pipe is extended to deliver dry cold air into a house or into an office;

7. A new concept of injecting water mist spray into an air duct by means of an atomizer, which is an assembly of a compressed air pipe, and a water pipe, that are joint together in a venturi tube/nozzle;

8. A new concept of releasing compressed air into the water-mist air duct to push the mist thru the duct, wherein, the compressed air is being pre-cold thru another cooling device before it is released into the air duct where the released compressed air is further cold by the water mist;

9. A new concept of using a plurality of atomizers to speed up production of water mist thru the open wind to supply cold wind to a large area, and to accumulate/collect salt left by the evaporated sea water on the misting open field;

10. A new concept of condensing the water out of the humid air thru compression of the humid air and subject the compression container into a cold environment;

11. A new concept of passing the humid air thru a cyclone centrifugal device in order to separate the dust particles of salt left out by the evaporated water and also to separate the excess water mist from the air wherein the air is already saturated with moisture;

12. A new concept of feeding the resulting clean humid air out of the cyclone centrifugal separator into a gas turbine engine in order to increase the power output of the engine due to increase intake of more matter that expands in the combustion chamber;

13. A new concept or new design for a hybrid Centrifugal Cyclone Separator wherein, a stilling chamber is created around the peripheral walls by installing a perforated inner wall a few inches inner from the main drum wall, so that the dust particles will get thru the perforations and get stilled and forced to settle down to the bottom of the stilling chamber;

14. A new process of producing drinking water, wherein, to take advantage being already a clean vapor, the cloud is sucked and compressed into and forced to condense in a high pressure radiator pipe condensation assembly that is submerged in ice cold water, or release as tiny bubbles in cold water;

15. A new structural design for a vacuum evaporation air duct, wherein, the main structure is a large concrete tunnel which accommodates a truck or a rail cart that passes thru it for maintenance purposes, said concrete is protected from the action of salt by a curtain of stainless steel sheets or plastic sheets along the inside walls of the said tunnel, said curtain having a neutral weep hole so that the space between the curtain and the tunnel is also a vacuum during the vacuuming processes,—meaning the air pressure on both sides of the curtain are equal, and wherein, a railway track and walk way is provided/constructed on floor of the curtain/tunnel;

16. A new structural design for the construction of a tall tower suction stand pipe/device to reach up to the clouds for the purpose of force liquefaction of the clouds by compression as shown by FIG. 14, said suction stand pipe being alternatively in the form of a high pressure inflated large diameter cylindrical post erected tall to reach the clouds as shown by FIG. 14A, which post carry plurality of light weight suction hoses attached hanging around said post, or said tall tower suction device is in the form of a plurality of high pressure cylindrical inflated posts fastened together around an inflated ring strut structure to form a rigid standing inflated tower, then said bundle of inflated posts is wrapped around by a light weight sheet to form a self standing suction hose, it being that there are large spaces in-between the inflated posts;

17. A new concept and design for a multistage centrifugal pump that functions as vacuum pump and compressor at the same time, wherein, the pump is a series of co-axial turbine pumps in a common drive shaft, each turbine blade attached to a spinning plate that separates each pump, and wherein, a plurality of air stilling fins/plates are axially attached to the inside walls of the air duct between turbines, and wherein, a drainage valve is provided to remove excess water at the bottom of each turbine, and which serves as the prime mover in the vacuum evaporation air duct for evaporation and compression vapor in a distillation process, per FIG. 12, part 2;

18. A new concept and design for excess water removal air duct, wherein, a spiral fin is attached spirally to the inside walls of the humid cold air delivery air duct, and wherein, a drainage valve is provided at the bottom of the air duct to drain the excess water.

There are many variations in water-mist-moving-air relationship including structures on land and structures floating/submerged in the ocean, of which the herein inventor hereby reserves all the proprietary rights and privileges for himself.

BEST MODE FOR CARRYING OUT THE INVENTION

Accordingly and pursuant to the objectives this invention, and as enumerated in the summary, various ideas has been created and many configurations of apparatus had been designed to implement these new ideas. This invention advocates to free the ordinary man from being a victim of complicated technology and to gave the poor man the chance to enjoy a better life without being milked too much by the technology people. To achieve this goal, the herein inventor must bring down cost and make it easy for the ordinary man to effect cooling system by avoiding high technology and by avoiding the use of scarce refrigerants, such as, FREON, etc., which are environmental enemies. In this invention, the new low cost method is by evaporating the abundantly available water thru fine mist spray into the natural wind, or into the artificial wind, or into a wind tunnel or wind pipe or air duct. Since the evaporation of water is a cooling process, and since water is abundant, it is but logical to evaporate as much water as possible at a high speed at low temperature without the used of heat, but instead, a vacuum chamber evaporator is used, into which, the water is sprayed in the form of a fine mist in order to create a large quantity of water surface that is exposed to the air to enhance evaporation, and an additional evaporation enhancement is introduced by vacuuming the evaporation chamber thru the use of high speed turbine that rapidly sucks the air from the chamber and blow the cold air out/into the place where the cold air is needed. It should be noted at this point that by vacuuming the evaporation chamber,—means removing the atmospheric pressure that holds back the water molecules from flying off or from evaporating. In order to give more time for the water mist to evaporate, the air duct/vacuum evaporation chamber is further elongated, so that the water mist travels a long distance to stay longer time in a vacuum atmosphere, so that the water mist is dissolved in the air before the cold air is expelled out of the air duct.

Additionally, as there will be dusts of mineral salts left out by the evaporated water mist, and as the air becomes over humidified wherein some of the water mist is not evaporated totally, then the mist-air mixture is passed thru a cyclone centrifugal separator in order to clean the air before it is feed to any place, such as a gas turbine engine. There are wide varieties of applications of this Water Misting in combination with Air Blowing Cooling System, including making cold air, making the wind cooler, extracting salt out of sea water, distillation of liquids, or making drinking water out of sea water by water mist evaporation and compressed condensation; blowing cold humid wind to stadiums, to playgrounds, to residential areas, to recreation areas, to greenhouses, to orchard plantations, to sun decks, compressing the clouds into a drinking water, etc., to name a few. In the efforts to maximize utilization and commercialization of the vacuum evaporation chamber, since it is by itself a new invention, there are available wide varieties of new apparatus and new devices concomitantly invented in support of the vaporization and condensation process, such new devices including: machinery/mechanical parts made/formed out of glass, a large/long chamber made transparent, a high/tall inflated vertical tower serving as vacuum air duct to suck the clouds, a platform made of assembled transparent glass vacuum chambers submerged/floating on the ocean serving for desalination, housing, and floating sea wall, a vacuum chamber having sub-chambers by subdivision cross walls for various applications such as a house, fishing boat/submarine and water/land transportation decorated and formed into the likeness of a large fish, and floating fence out of vertical chambers serving as sea wall, to name a few applications,—of which new ideas the user of this invention should maximize benefits from, and of which new ideas the herein inventor hereby reserves all proprietary rights and hereby applies for patent protection.

BRIEF DESCRIPTION OF THE DRAWINGS

FIG. 1—illustrates a new idea for an oscillating blower being provided with a water misting device in order to blow cold wind.

FIG. 2—illustrates a new idea for as self standing water misting pipe.

FIG. 1 and FIG. 2—together, further illustrates a new idea for a cooling system wherein wind is blown thru the water mist to make cold wind.

FIG. 3—illustrates a new design for a water-mist-blower cooling system thru an air duct vacuum evaporation chamber, and distillation device.

FIG. 6—illustrates a new design for a multi-branch water misting tube being placed to the front of a wind blower.

FIG. 7—illustrates a new design for a multi-nozzle flexible water hose and being placed to the front of a wind blower to cool the wind.

FIG. 8—illustrates a new idea of pressurized water supply, wherein any kind of water containers is injected with compressed air.

FIG. 9—further illustrates a new design for forced vapor condensation where the condensation radiator is placed inside an evaporation chamber.

FIG. 13—further illustrates a new design for a desalination system by way of a water mist distillation process.

FIG. 19 show the detail of the support foot.

FIG. 22—illustrates a new design for a drum that is strong against implosion but uses least cost of materials.

DESCRIPTION OF THE PREFERRED EMBODIMENTS

Figure 4:
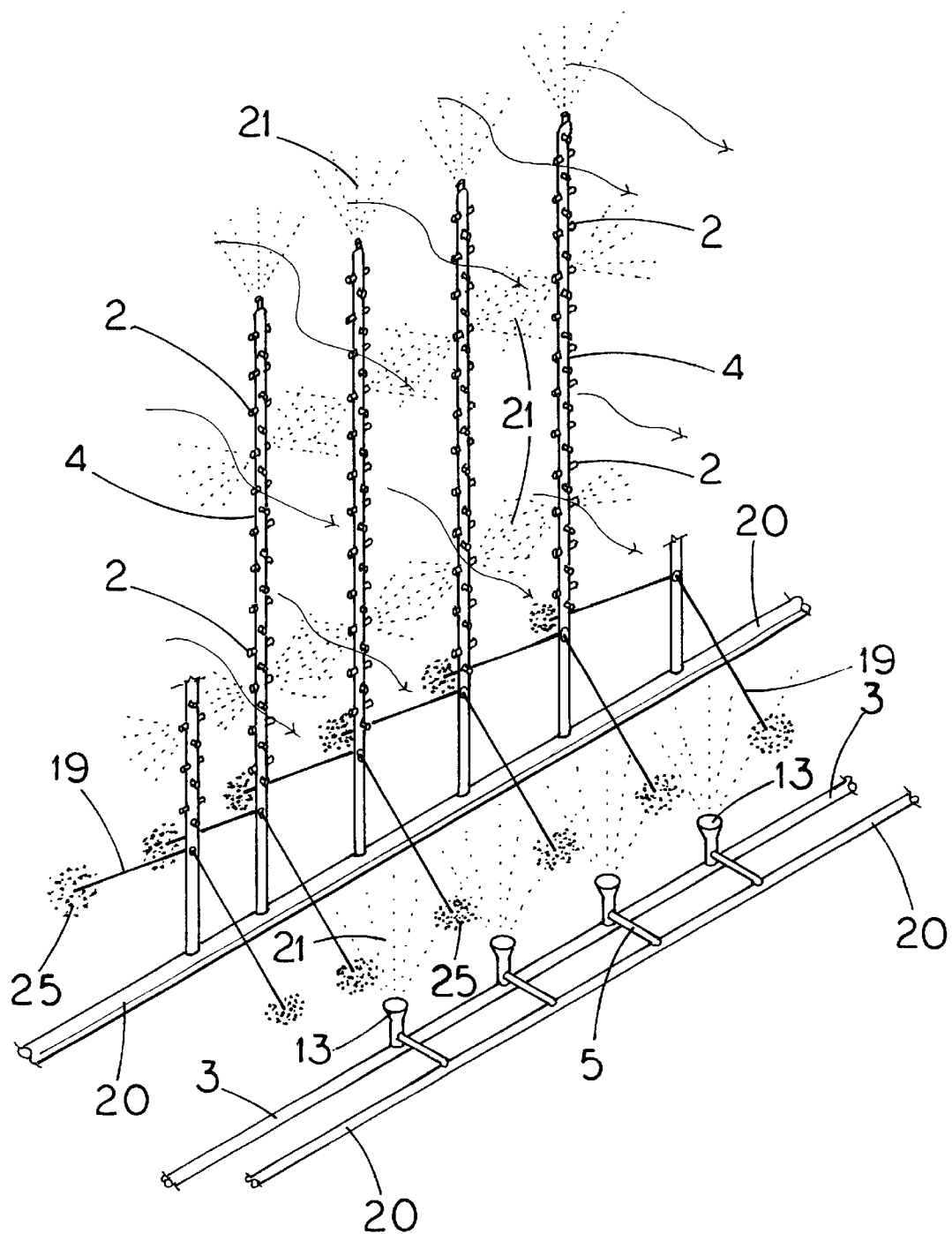
FIG. 4—illustrates a new design for plurality of standing water misting pipes and a plurality of atomizers disposed in the open wind field.
Figure 5:
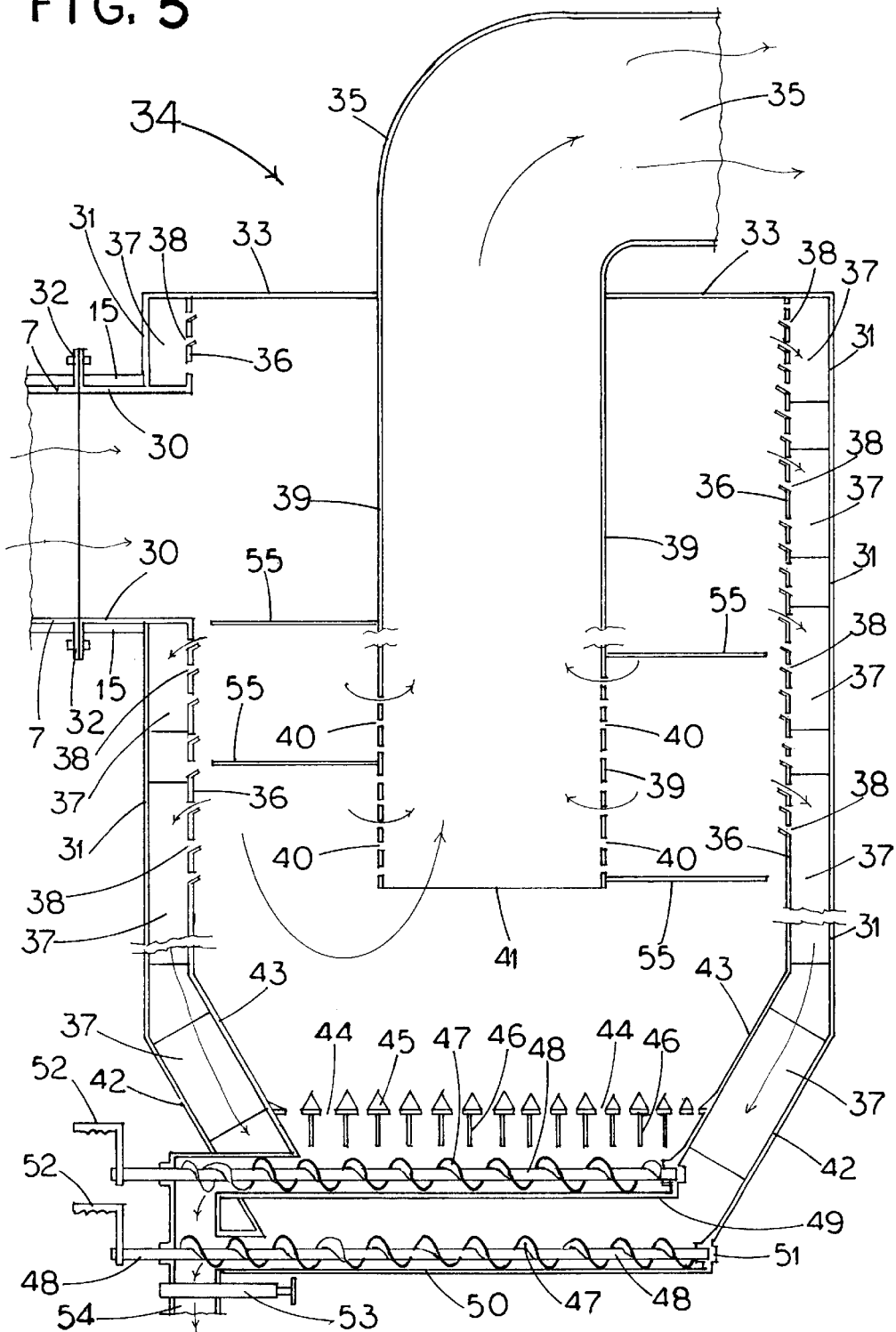
FIG. 5—illustrates a new design for a cyclone centrifugal air cleaner having stilling trap chambers to remove the unevaporated water mists.

In support to the advocacy of this invention, the following configurations, embodiments, and structural/mechanical designs are created to provide the most appropriate technology, which can be more understood by further reading the following descriptions of the figures, to wit:

FIG. 1—illustrates a new embodiment of a plurality of water-mist spray nozzles part 2 that spray the water mist 21 infront of an air blower 1 that has a blower blade 9 in order to evaporate the mist 21 and drive the cold air/wind 26 into a designated place. The plurality of misting nozzles 2 are spacedly connected to the water tube 4 which is continued and appropriately bent to create an inverted "U" water tube section 6 over the safety frame 8 of the blower blade 9, and the water tube is again continued and further bent to create a ¼ circle curved section 10 that fits with the curvature of the outer shell of the blower's motor 12. From the section 10, the water tube is extended straight to some inches down and a screw coupling connector 18 is attached to the lower end of the water tube 10. A circumferential flexible strap clamp 16 is also created to fit around the outer shell 12 and said clamp 16 is tightly fitted upon the shell 12 by a closing bolt at the bottom of the strap clamp 16. The curved section 10 of the water tube is then attached to the outside face of the strap clamp 16 at the 12 o'clock to 3 o'clock section of the clamp thru the strap-type fasteners 26. To supply water to the nozzles 2, a flexible high pressure water hose 20 is connected to the water tube 4, 6, and 10 thru the screw coupling connector 18. The water hose being flexible, allows the blower assembly 8, 9, 12 to oscillate left and right without resistance. It should be noted at this point that the misting device-blower assembly, may vary in sizes, such that the part 22 which is the support post/stand can vary in height and in quantity, from one foot high to 20 feet high depending upon the style and size of the blower 1 which can also vary in diameter from 8 inches to 20 feet diameter and the blower 1 can also be a fixed one or an oscillating blower. In cases where the blower 1 becomes a large diameter, then there is more need for a bigger quantity of the misting nozzles 2 in which case, the misting water tube 4 is in the form of a plurality of concentric circles or in the form of a plurality of radially assembled tube bars in order to accommodate a large number of the misting nozzles 2. Where there is a large number of misting nozzles 2, then the size of the water supply tube 6, 10 and the water hose 20 must also be increased. The support pad 24 can also vary in size, in style and in quantity to match the style and the size of the blower 1.

FIG. 2—illustrates a new embodiment of a water-mist-blower assembly, wherein, a misting device, in the form of a plurality of misting nozzles 2 that are spacedly connected around and along the length of a self standing water tube/pipe bar 4, is placed to stand infront of a fixed blower 1. The standing water tube/pipe bar 4 is supported by its lower base section in the form of a circularly bent/curved water tube 14 which is extended to a straight horizontal bar which ends with a screw coupling connector 18 thru which the water supply hose 20 is connected in order to supply water to the misting nozzles 2. Where the blower 1 is not oscillating to the left and to the right, there is no need to attached a misting device, parts 2 and 4, to the frames of the blower 1, but instead, if the blower 1 is fixed, then it is just the self standing misting device of FIG. 2 that is placed/erected to spray water mist 21 into the blowing wind 26 to make the construction job simple and low cost. Where the blower 1 is large, then it will be a plurality of the self standing misting device of FIG. 2 that is placed infront of the large blower 1. The quantity, height, and style of the self standing misting device, as shown in FIG. 4, that are place infront of the blowers 1, depends upon the size and quantity of the air blower 1, which can be an array of several air blower 1, in order to blow cold air 26 to abode areas, livestock areas, green areas, and places that need cold and humid air.

FIG. 3—illustrates a new embodiment of a water-mist-blower assembly, which is also used for sea water desalination to produce drinking water, wherein the water mist 21, being introduced by the misting device nozzle 2, and water tube 4, is confined in an air duct 7 into which compressed air 23 is forced in, in order to blow out the water mist 21 thru the outlet end of the air duct 7. Part 6 is the main water pipe that supplies the nozzle 2 thru tube 4. Alternatively, for purposes of more effective cooling process, the water mist 21 is rapidly evaporated by vacuuming the air duct 7 so the molecules of the water mist can fly off easily. The vacuum is effected by limiting the quantity of air that gets into the air duct 7 and the water-mist-air mixture is rapidly expelled by the blower 9 out of the air duct 7. If there is more air going out than the air getting into the air duct 7, then for sure, the difference is filled up by the evaporated water which effects the cooling process. The rapid expulsion of air from the air duct 7 is effected by making the motor 12 into a higher horsepower, and additionally, a plurality of turbine vane 17 are radially attached around the inside peripheral walls of the air duct 7 in order to reverse the rotation of the air as it approaches the blades of the blower 9 which are in opposite rotation against the inclination of the vanes 17. This is to increase the speed of the blower blade 9 in relation with the movement of the air being deflected by the blower blades 9. For more effective vacuuming which is by way of more rapid expulsion of the air out of the air duct 7, a second clockwise blower machine 9 is installed at least one-fourth (¼) inch in front of the counter-clockwise first blower, in which case, the resulting blower machine 9 becomes a 3-stage blower, in which case, for purposes of sea water desalination, the blower machine 9 becomes a multistage gas turbine vacuum-compressor machine. Further, for more rapid introduction of water mist 21 into the vacuumed air duct 7, a plurality of atomizers 13 are co installed inside the air duct, such atomizer being an assembly of a compressed air pipe 3 that is connected to an air outlet venturi tube 13 and a water supply tube 4 that is also connected to the venturi tube outlet 13 at a point after the neck of the venturi tube 13. Again for a better result in the cooling process, the compressed air 3 and the water supply 4 are pre-cold, from a separate water misting cooler, before they get into the atomizer 13, in which case, a heat insulator 15 is wrapped around the compressed air tube 3, around the water supply 4, and around the water supply 6 to prevent warming up of the air and water supply. In the same purpose, a heat insulator 15 is also wrapped around the vacuumed evaporation air duct 7 to prevent heat transfer from the outside warm air. In order to obtain cold dry air from the evaporation air duct 7, a radiator-type heat exchanger 27 is placed inside the evaporation air duct, said radiator is made of a plurality of air tubes with their inlets connected to a large supply header air duct 28 that pierced thru and into the air duct 7 at the first ¼ section of the evaporator air duct 7, and the outlets of the radiator tubes 27 are communicated with a another large outlet header air duct 29 that pierce thru and into the evaporator air duct 7 at the last ¼ section of the air duct 7, in which case, for a better heat exchange effectiveness, the evaporator air duct 7 is further elongated so that the radiator tubes 27 may be further elongated also and that more radiator tubes 27 are added into the radiator system. The large cold air outlet 29 is then communicated with a house or with an office to supply the dry cold air into an office or a house. A strap fastener holds the water supply tube 4 to the ceiling of the air duct 7. Part 11 is a flat bar that is fastened to the walls of the air duct 7 to hold the motor 12 to the center of the air duct 7. The cold air coming out of the air duct 7 is then blown out to a patio, or into a house in which case the windows of the house must be open to exhaust the humid air. Another important application of this humid air supplier is to feed the humid air into a gas turbine engine in order to have more matter that expands in the combustion chamber, in which case, the blower 9 is already the turbine compressor of the gas turbine engine. Another application of the radiator 27 inside the cooling evaporator chamber is to be used as condensation radiator tubes for distillates such as the unburned fumes from a trash incinerator to collect sulfur, gums, and tars, and also for condensation of water vapor coming out from the vacuumed air duct 7 in order to produce drinking water out of the sea water,—which is actually a desalination process, to name a few. In a case where this machine is used for desalination, the large compressed air inlet 23 is removed and the front end of chamber 7 is totally closed, while the rear end of the air duct/chamber 7 is totally connected/communicated to the air duct 28 in order to compressed and condense all the water vapor being pushed out by the turbine machine 9. Further, in order to condense all the water vapors, the outlet air duct 29 is connected/ communicated to a fine air bubble outlet system that is submerged under ice cold distilled water in order to release the water vapor in the form of fine air bubbles so that the ice cold distilled water will catch the water vapor. Then, what ever left uncondensed, is clean compressed air which is then separated from the water by a float valve and then directed and recycled to exit at the atomizer nozzle 13. Further, the compressed air being supplied to the atomizer nozzle 13 thru the tube 3 comes from the multistage gas turbine compressor 9, in order to keep recycling the air being used to blow at the atomizer nozzle 13 to avoid introducing new dirty air from outside the chamber 7. There are various new applications for this vacuum chamber evaporator cooling system, including ocean structures wherein the compressor 9 and chamber 7 are made of glass serving as floating sea wall, of which new ideas, the herein inventor hereby reserves all the rights.

FIG. 4—illustrates a new embodiment of a plurality of standing high pressure water pipes 4 in an array formation, having a plurality of misting nozzles 2 at the top, around and along the length of each standing pipe 4 in order to introduce water mist 21 rapidly into the wind 26 for purposes of making the wind into a cold wind. The base of each standing pipe 4, serving as water inlet, are spacedly communicated to a main water supply pipe 20 that is laid on the ground transverse to the wind. A guy wire/rope 19 is attached each side of each of the standing misting pipe 4 and anchored to the ground 25 in order to hold the pipe 4 upright. Additionally, where the water pressure is low, an array of a plurality of atomizers 13 are assembled on the ground to rapidly introduce water mist into the wind 26, comprising: a plurality of venturi nozzles 13 spacedly connected/communicated with and along the length of a plurality of compressed air pipes 3, a water supply tube 5 being communicated to the venturi nozzle 13, and a main water supply pipe 20 to which the other end of the water tube 5 is communicated, said main water pipe 20 being laid on the ground parallel to and alongside with the compressed air pipe 3. Several of the standing pipe 4 water misting assembly and several of the atomizer water misting assembly may be installed in an open field to spray water mist into the wind 26 in such locations that the wind will anticipatedly blow towards a playground, a recreation area, a stadium, a residential area, an orchard plantation area, a greenhouse area, a job site area, into a work place/building and into livestock areas. There are many alternative applications for this multiple misting assembly in the open wind, including salt making out of sea water by spraying salt water on the beach on top of a wide plastic sheet laid on the beach, by using the water-wave energy under U.S. Pat. No. 5,507,943 to pressurize water/air into the misting pipe 4, which new ideas, proprietary rights are hereby reserved/applied for by the herein inventor.

FIG. 5—illustrates a new embodiment for an air cleaner device in the form of a Centrifugal Cyclone separator 34, which is an integral part of FIG. 3 as viewed thru Section 5—5 of FIG. 3, and thin which, the water-mist-air mixture from the air duct 7 is passed thru for purposes of cleaning the air of its salt dust and excess water mist flowing out with the air. The Cyclone 34 is intercommunicated and connected to the air duct 7 thru the coupling pipe-lip flange 32 of the inlet pipe 30. Again for sure, the heat insulator 15 is also wrapped around the cyclone 34 to prevent the cold air from warming up from the outside warm air. As evaporation of the water takes place, there will be minerals and impurities being separated from the water mists in the form of fine dust particles of salts, calcium, etc., that do not dissolve into the air, but this salt particles, being very minute particles, including the surplus water mist, will be floating and flowing with the air/wind to where ever the wind goes, hence, there is a need to clean the cold air before it is finally delivered to the customer which is the house, office, work places, and play areas. The usual filter system does not meet the requirement of a wet air because the filter will soon get clogged up with the salt and also get wet with the surplus water mist, but the centrifugal cyclone 34 can clean the wet air easily without a filter element to be changed so often. In this invention, the centrifugal cyclone separator has been re-designed to become more efficient in collecting dusts particles. Part 31 is the main cylindrical drum body, which is covered at the top by a flat plate 33 that has a center hole, and which is covered by a tapered/frustum at the bottom. Part 35 is the air outlet pipe that passed thru and attached to the center hole of the top cover plate 33. The outlet pipe 35 is extended by the open bottom pipe 39 into and downward to the lower ¼ point of the drum 31. The pipe 39 serves as the intake section of the outlet pipe 35. The lower ⅓ section of the pipe 39 is perforated with air inlet holes 40 to distribute the air movement and to eliminate rushing air flow at the bottom mouth 41, so that the settling dust at the bottom wall 43 will not flow upward with the air. An inner wall lining drum 36 having perforations 38 is provided and attached by a spacer plate 37 to the inner face of the drum 31 in order to create a stilling chamber in which the dust is forced to settle down to lower basement 50. The spacer plate 37, being widefaced that is perpendicular to the flow of the air, serves to stop the air movement and to hold the inner drum 36 a few inches from the main, drum 31. The inner drum 36 has a plurality of windows 38 all around to serve as trap entrance of dust and surplus water mist in order to get the dust out of the circulating air sooner or faster. The tapered or frustum drum 43 is a downward extension of the inner drum 36 to hold the floor 49 to a good distance below the lip 41 of the air outlet pipe 39. To create another, stilling chamber, a perforated horizontal floor 45 is attached to the wall 43 at a distance above the floor 49. On the floor 45, a plurality of trap windows 44 are provided to serve as entrance for the dust that settle down to the bottom of the cyclone. A plurality of vertical wideface plates 46 are attached to the bottom of the floor 45 to stop the movements of air at the basement chamber below the floor 45 in order to force the dust to settle down on the floor 49. The tapered drum 42 is a downward extension of the drum 31 to hold the bottom floor 50 which create the lower basement floor that accumulate the settling dusts. An auger type conveyer cleanout 47 is installed on each floor to get the dust out of the basement floors 49 & 50. The auger blades 47 are attached to and driven by the crank shaft 48 that is held by the bearing 51 and also being turned by the crank arm 52. The extracted dusts fall down thru the outlet pipe 54 after opening the valve 53. It should be noted at this point that the effectiveness of the centrifugal cyclone 34 depends how wide is the space between the wall 36 to the outlet pipe 39 and the space between the floor 45 to the lip 41 of the outlet pipe 39; hence there is a need to increase the diameters of both drums in order to widen as much as possible the space between the pipe 39 to the wall 36, and also widen the distance between the pipe lip 41 to the floor 45. There are many applications for this centrifugal cyclone air cleaner, including its being used as air cleaner in the intake manifold of the car or truck. With the assurance of the cyclone cleaner, the mouth piece of the intake manifold of a car or truck may be faced directly into the wind that approach, the car to increase air pressure that goes into the combustion chamber in order to increase the power output of the car's engine. This cyclone separator is also needed in the intake manifold of a gas turbine engine to clean the air intake of the engine, the air intake needs to be humidified in order to increase the power out put of the engine. The efficiency of the cyclone in collecting dust depends also upon how evenly the air is circulated in the cyclone. Hence, to insure ever circulation of air around the cyclone, it is best to provide a wide spiral/screw fin around the outlet pipe 39 to be followed by the air going around the trap windows 38 before it gets into the intake lip 41.

FIG. 6—illustrates a new embodiment for an alternative water mist air cooling blower system, wherein, a water tubing device 4 is formed into a multi-branch tube which is attached to the front safety protection framing of an air blower device 1 so that the misting tube rides with the left/right swinging of the blower 1 and a plurality of water misting nozzles 2, pointing away from said air blower 1, are functionally connected/communicated to said water tubing 4 so that the high pressure water in said water tubing 4 gets sprayed at a direction going away from said air blower 1. The air blower 1 is mounted on a self standing post 6 in order to blow and distribute the cold air more efficiently. A flexible water supply hose 5 is connected and communicated to the water tubing 4 by the coupling connector 3. The water supply hose 5 is then connected/communicated to a water supply faucet, then open the water faucet and run the air blower in order to produce a wind that contains water mist. Due to the fineness of the water particles flying with the wind, the water evaporates instantly thereby absorbing great quantities of heat out from the carrier wind, thereby, the wind becomes cool instantly.

FIG. 7—illustrates a new embodiment for a water misting system, wherein, a plurality of water misting nozzles 2 are functionally connected/communicated to a flexible water tubing 4, and then the water tubing 4 is attached circling around to the front safety protection framing of the air blower 1, which in effect, replaces the multi-branch water tubing to form of a water misting device 4 in FIG. 6. This circling water misting tubing is made long enough so that it is made into a multi-circle in a concentric formation and then attached to the front of a large air blower or in front of an array of multi-blowers.

FIG. 8—illustrates a new embodiment for a high pressure water supply system, wherein, the water tank 8 is filled up with water up to the level 12 and the remaining space above the water inside the tank 8 is filled up with Dry Ice 11 by passing the dry ice thru the tank's mouth 10 and then place the cover air tight,—in order to pressurize the water inside the tank 8. The high pressure water created inside the tank 8 is then supplied to the water misting device 4 thru the inter-communicating water hose 5. The second advantage of having a dry ice 11 in the water tank 8 is that—ice-cold water mist comes out from the misting nozzles 2, in which case the wind becomes even cooler. In the absence of available Dry Ice, the compressed air source 2 is used to inject/introduce pressurizing agent or compressed air into the water tank 8 thru the inter-communicating air hose 7, and then the compressed air is trapped inside the water tank 8 by closing the air gate 9. This high pressure water tank 8 system has been created to be used in places where the pressure of the water supply is low, and therefore, it is necessary to step up the water pressure before the water gets thru the water misting nozzles 2 in order to produce a very fine mist water spray for the sole purpose of enhancing evaporation of water in the wind. There are many ways and alternatives by which to produce high pressure water supply to the misting nozzles 2 including a bottle of water/water tank being hanged to the top of the tree to produce an elevated water, and a series of bottled water 15 into which compressed air is introduced, said battles showing the water level 16 inside the bottle 15, which are interconnected by air hoses 7, 13, and 5 thru the air tight cover 14, of which ideas are hereby applied for proprietary rights.

Figure 9:
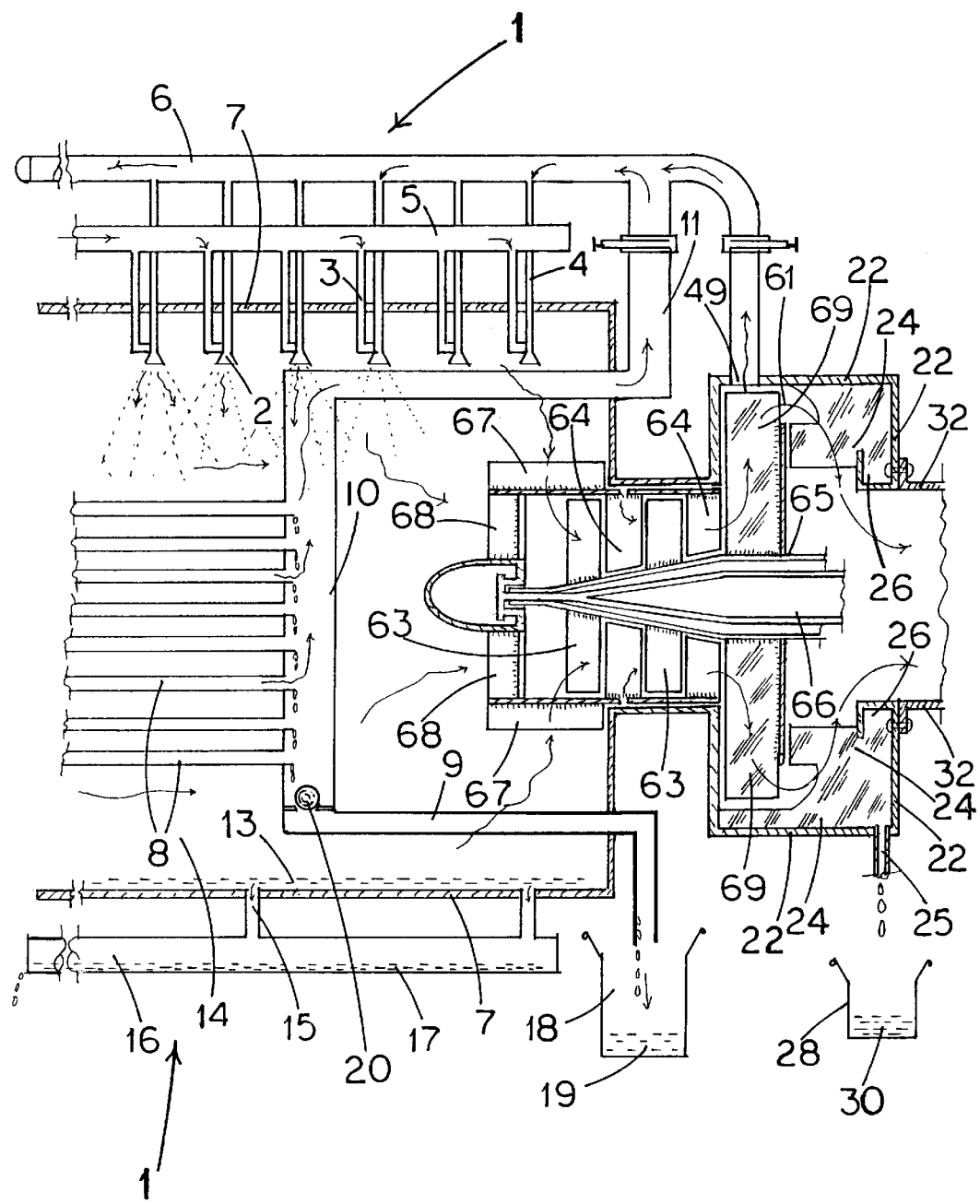
FIG. 9—illustrates a new design for supplying salt free humid air into a gas turbine engine to increase its power output.

FIG. 9—illustrates a new embodiment for a water mist air blower cooling system, and alternatively for water distillation/desalination system, wherein, a vacuumized evaporation chamber /air cooling system 1 is supplied with water mist thru a plurality of water atomizer nozzles 2 which is supplied with water thru the water tube 3 and also supplied with compressed air thru air tube 4, both water and air coming out of the nozzle 2. The main water supply pipe 5 supplies water to the water tube 3 while the main air pipe 6 supplies compressed air to the air tube 4. The vacuumized air duct 7 is made strong against implosion to withstand the outside atmospheric pressure in order to form the vacuum evaporation chamber 14. This evaporation chamber 14 is made large enough to provide distance/chance for the water mist to evaporate and same chamber 14 is made spacious enough to be able to accommodate the condensation radiator 8 in which a high pressure water vapor, and due to cold temperature surroundings brought about by rapid evaporation of water mist in the vacuum chamber 14, and then the resulting condensed water drops down thru header pipe 10 and actuates the float valve 20 by its own buoyant power or by a sensor. The water then drops onto the container 18 thru the water drain pipe 9 after being released by the float valve 20, and accumulates as drinking water 19. It should be noted that the radiator condenser 8 may also be supplied by highly humid air coming from the clean vapor pipe 32. The excess water mist, that did not evaporate or not carried away by the wind inside the air duct 7, drops down at the bottom of the air duct 7 to form the excess water 13 which drains down thru the outlet pipe 15 and get stored into the recycle pipe 16 in the form of a stored water 17. The uncondensed water vapor from the radiator 8 is collected by the header pipe 10, and by way of the vapor's own pressure, it is directed by the air pipe 11 to get into the compressed air supply 6 and being used to atomized water thru the blades 67 and 68 and by the turbine blades 64 all of which rotate counterclockwise as driven by the inner pipe drive shaft 66. The suction process from the chamber 14 is made more effective by the incorporation of the clockwise turbine blades 63 in opposite rotation against and interphased with the aforesaid turbine blades 64. The suction process and the compression process upon the water mist/vapor mixture is made final by the large diameter centrifugal blades 69 acting at the tail end of the turbine pump 63 and 64. Both the centrifugal blades 69 and the turbine blades 63 are driven clockwise by the outer pipe drive shaft 65. The outer tips of the centrifugal blades 69 produce compressed air which gets out thru the outlet 49 and gets into the air supply pipe 6 to run the atomizers 2. Most of the compressed air/watermist/water vapor mixture at the outer tips of the centrifugal blades 69 are forced to get out thru the outlet 61, and the centrifugal force acting upon said wet mixture is stopped by the instilling plates 24 that are radially attached to the inside walls of the compressor housing shell 22, hence, the wet compressed air is forced to move toward the axial center of the housing shell 22. The excess unevaporated water mist is catched and collected by the collection ring gutter 26, also collected by the circular/cylindrical confining inner walls of shell 22, and also collected by the instilling plate 24, hence, the cold air entering the air duct 32 is cleaned out of water mist. By means of gravity, the water collected by the catch gutter 26 automatically drops down to the tank 28 thru the outlet 25 that is limited by an electronically operated float valve, to form the stored water 30. The oppositely rotating pipe drive shafts 65 and 66 are each driven by separate pulleys that rotate oppositely against each other or are driven by oppositely rotating gas turbines wherein the air duct 32 is already the combustion chamber of the gas turbine engine.—This type of gas turbine engine has been claimed in the U.S. patent application Ser. No. 08/999,729 now pending. The humid cold air in the Air duct 32, if not used for the gas turbine engine, is then directed into a place where cold air is needed.

For purposes of water desalination, a plurality of said centrifugal pump 69 are assembled co-axially in an array of multistage formation and intercommunicated by the air duct 32 thru the common drive shaft 65 and provided with the instilling plates 24 in order to step up the vacuum and the compression of the water vapor which is then directed back to enter the condensation radiator 8 to produce the drinking water 19. The un-condensed water vapor exits from the radiator 8 thru the header pipe 10 and gets re-cycled thru the misting nozzle 2 until it finally gets back into the condensation radiator 8.

IT SHOULD BE NOTED AT THIS POINT, THAT, AS THE WATER VAPOR IS COMPRESSED, IT BECOMES HOT, HENCE, THE RADIATOR 8 IS EXTENSIVELY EXTENDED OUTSIDE THE FRONT END OF THE VACUUM AIR DUCT 7, SO THAT A MAJOR PORTION OF THE RADIATOR 8 IS EXPOSED TO ANOTHER SEPARATE SET OF WATER MIST AIR BLOWER COOLING SYSTEM TO REMOVE THE HEAT CONTENT OF THE COMPRESSED WATER VAPOR AND TO ENHANCE CONDENSATION INSIDE THE RADIATOR 8 AS IT GETS INSIDE THE VACUUM CHAMBER 14.

Figure 10:
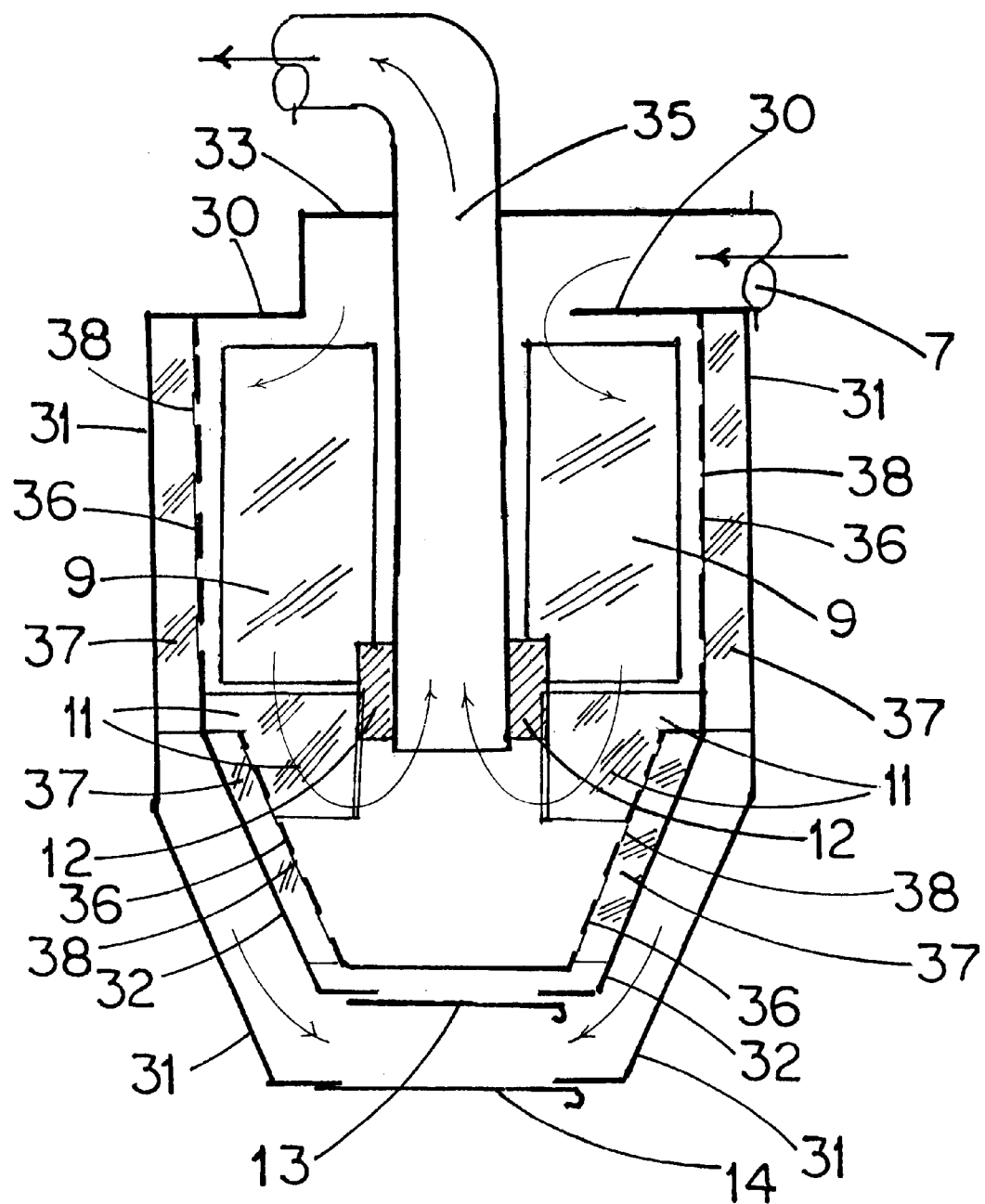
FIG. 10—illustrates a new design for a centrifugal pump which functions as a cyclone centrifugal particle separator at the same time.

FIG. 10—illustrates a new embodiment for a cyclone-type water-mist separator to dry the cold wind that is mixed with water mist, and at the same time serves as a centrifugal air pump, wherein, a plurality of wideface centrifugal blades 9 are radially attached to and rotationaly driven by the ring-type electric motor 12 that is attached to and around the lower section of the air outlet duct 35. The cylindrical wall 31 is the main outer shell of the separator device. The outer shell 31 is extended down to the bottom in the form of a frustum with a waste disposal sliding door 14. With perforation windows 38, the inner cylindrical wall 36 is installed co-axially with the cylindrical wall 31 and attached to the outer wall 31 by means of the instilling/spacer plates 37 thereby creating a stilling chamber in between the outer shell 31 and the inner wall 36 into which, by way of centrifugal force, the excess water mist is collected and settled down to the bottom waste door 14. The upper inner wall 36 is extended down to the bottom without perforations in the form of the bottom frustum shell 32 creating a waste chamber below the upper stilling chamber. To create a lower stilling chamber, the perforated frustum shell 36 is installed co-axially with and attached to the bottom frustum shell 32 by spacer/stilling plates 37, and the created second level bottom waste chamber is provided with waste disposal door 13. The motor 12 and the lower section of the exit air duct 35 are supported by a plurality of radial plate stilling walls 11 which attached the motor 12 to the upper inner wall 36. The upper outer drum shell 31 and the perforated inner drum shell 36 are held together at the top by the top cover plate 30 which is provided with a central air entrance circular hole formed around the outlet air duct 35. The air scrawl case 33 is placed around the outlet air duct 35 and covering the central air entrance circular hole of the cover plate 30. The air inlet air duct 7 is horizontally communicated eccentrically to the scrawl case 33 at the left of the air outlet air duct 35 which should be in accordance with the clockwise revolution of the centrifugal blades 9. Due to the centrifugal action of the revolving blades 9, a centrifugal force is created acting upon the molecule of the air and upon the molecules of the water mist, thereby pressing the water mist and the air against the perforation windows 38, and at the same time, due to the movements of the air towards the walls 36, the central space around the outlet air duct 35 is vacated, thereby creating a vacuum around the air duct 35. The vacuum created at the center sucks the air from the scrawl case 33 thru the center hole of the cover plate 30. Due to the stilling power of the radial vertical plates 11, the moving air loses its centrifugal force, and it is forced to move downward by the air pressure created at the outer tips of the centrifugal blades 9, hence, the air is forced to exit out thru the open bottom of air duct 35. The excess water mist particles are trapped into and get settled inside the stilling chamber between the outer wall 31 and the inner wall 36.

IT SHOULD BE NOTED AT THIS POINT THAT THIS CYCLONE-CENTRIFUGAL PUMP IS ALSO USED TO CLEAN DUSTY AIR BY MAKING THE DRUM 31 LARGER IN DIAMETER.

Figure 11:
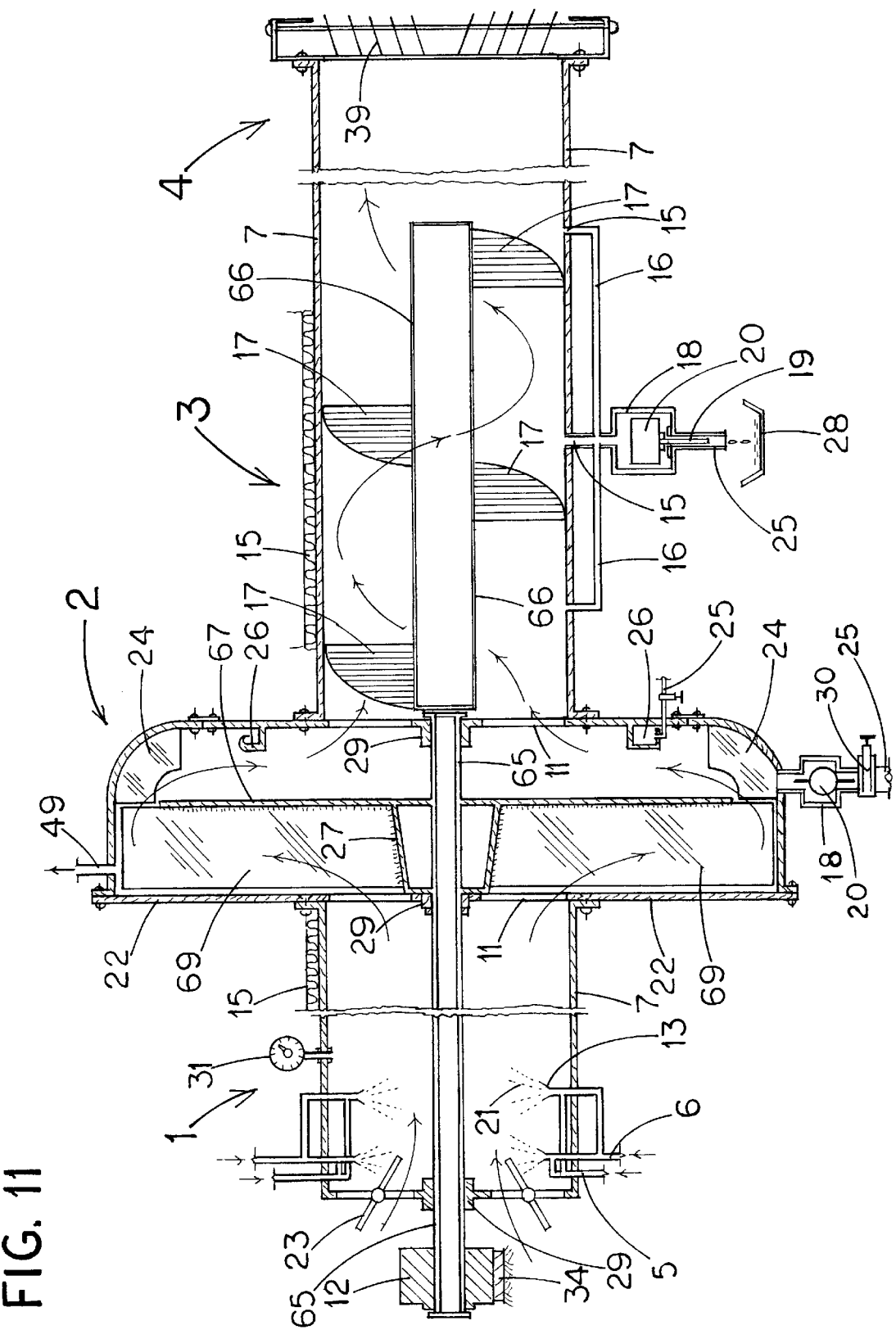
FIG. 11—illustrates a new design to make cold dry air by way of a moisture collecting centrifugal pump and a centrifugal air duct.

FIG. 11—illustrates a new embodiment for an air conditioning unit that produce cold air free of water mist to be supplied into a house, an office, or into a green house or what ever room that is open at the other end, for purposes of cooling the room. This is most applicable in tropical climates or desert places because the cold air being supplied is a humid air. This cooling machine consists of: the section 1 which is a vacuum chamber evaporator made of the drum 7 and in which the water is evaporated by mist spray in order to cool the air in said chamber; the section 2 which is a centrifugal air pump which vacuumizes the evaporator chamber 1 and which removes excess water mist from the air as it expels the air thru its outlet; the section 3 which is a centrifugal air duct to further clean the air out of excess water mist; and the delivery air duct 4 having a dispersal mouth piece. Sitting on a support footing 34 is the motor 12 which, by way of the pipe shaft 65, drives the centrifugal blade 69 to suck the air out from the evaporator chamber 1 and further expel the air into the spiral air duct 3. The vacuum sensor 31 governs the operation of the throttle 23 so that there will be a steady vacuum pressure inside the evaporation chamber 1. To produce the mist 21 inside the chamber 1, compressed air is supplied by the air pipe 11 and the air is released thru the nozzle 13, and at the same time during this process, water is released thru the nozzle 13 by the water pipe 5. The collected water by the centrifugal pump 2 drops down to the water tank 18 and by the float valve 20, the water is automatically released thru the outlet pipe 25 if the gate valve 30 is left opened. Some of the water collected by the gutter 26 are also released thru the outlet pipe 25 that is directed connected to said gutter 26. The center bearing 29 holds the pipe drive shaft 65 on center with the chamber 1. Plate 22 serves as the housing scrawl shell of the centrifugal pump 2, a plurality of the windows 11 serve as air passage from chamber 1 into pump 2 thru the shell 22 and also as passage window from air pump 2 to the air duct 3. Part 27 is a frustum drum at the base of the centrifugal blade 69. To make a centrifugal action of the air passing thru the centrifugal air duct 3, a smaller drum 66 that is provided with spiral fins 17 is inserted into the center of the air duct 7. The water collected by the walls of the centrifugal air duct drops down thru the exit pipe 15, thru the inter-collector pipe 16, down thru the water tank 18, and the water is released by action of the float valve 20. The waste water is then collected into the tank 28 after dropping down thru the exit pipe 25. Finally, the clean cold air is delivered by the pipe air duct 7 thru the dispersal mouth piece 39. The compressed air outlet pipe 49 supplies compressed air to the nozzle 13.

Figure 12:
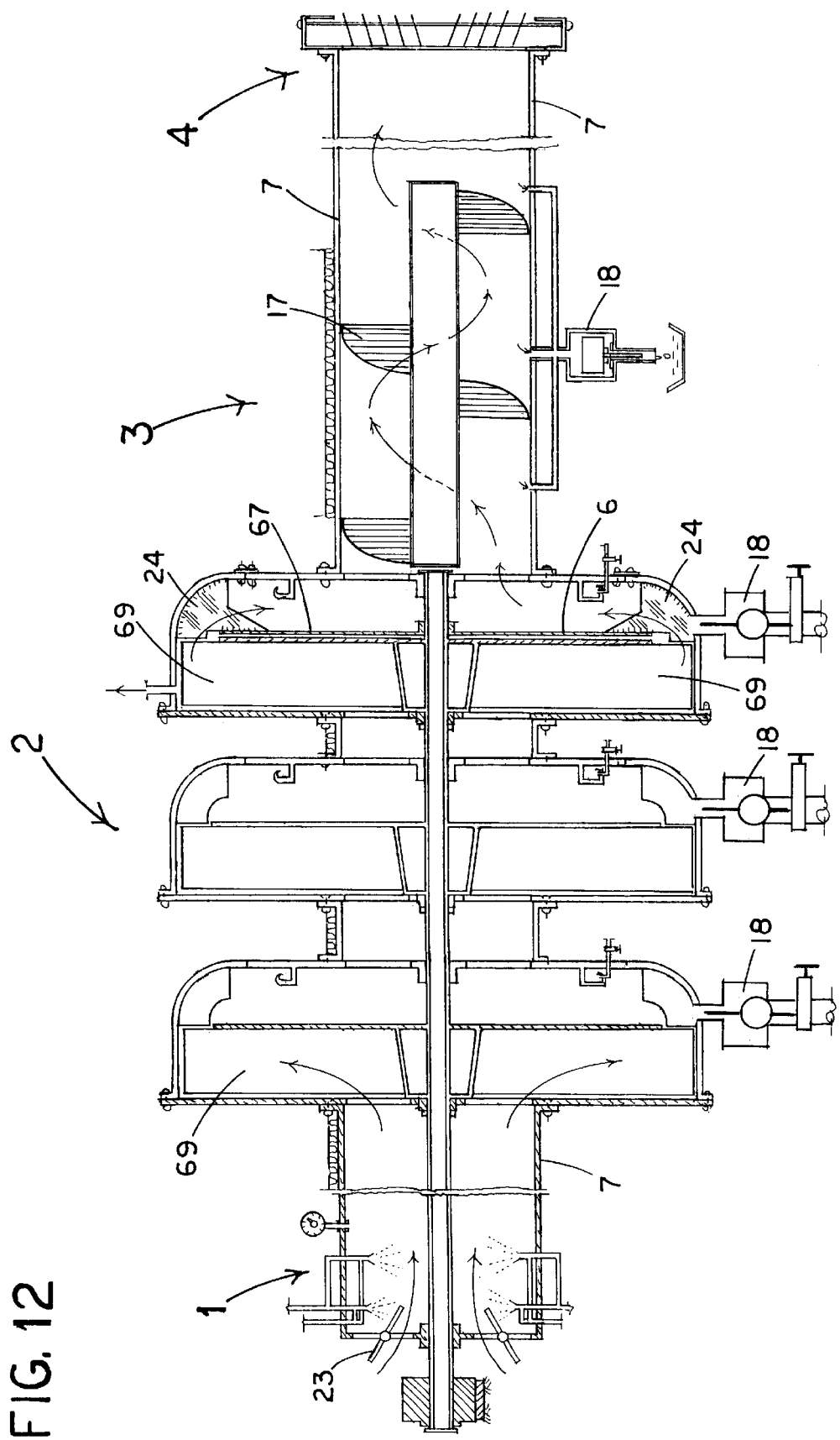
FIG. 12—illustrates a new design for a high vacuum evaporation chamber by way of multistage moisture clean centrifugal pump and air duct.

FIG. 12—illustrates the same air conditioning unit of FIG. 11 but with additional centrifugal air pumps which are intercommunicated with the first pump in a series in order to make a multistage air pump 2 and in order to increase the effectiveness of the vacuuming process upon the chamber 1 and to speed up the production cold air supply. One special feature of this design is that last stage of the pump 2, the plate 67 is fixed, detached from the centrifugal blade 69 and does not go with the revolution of the blade 69—in order to or so that the plate 67 will bear all the air pressure difference from its front to its rear, while the rest of the preceding stages of the pump 2, the centrifugal blade 69 is welded to the plate 67 and revolve together in order to minimize leakage of compressed air backflow. As shown in the figure, each of the pumps in section 2 is a collector of excess water that did not dissolve into the air, hence, each pump has a collector/storage tank 18 to take hold of the collected water. Additionally, the vacuum evaporator air duct 7 may be further elongated for some length in order to provide more travel distance for the water mist to have time for complete evaporation.

Figure 13:
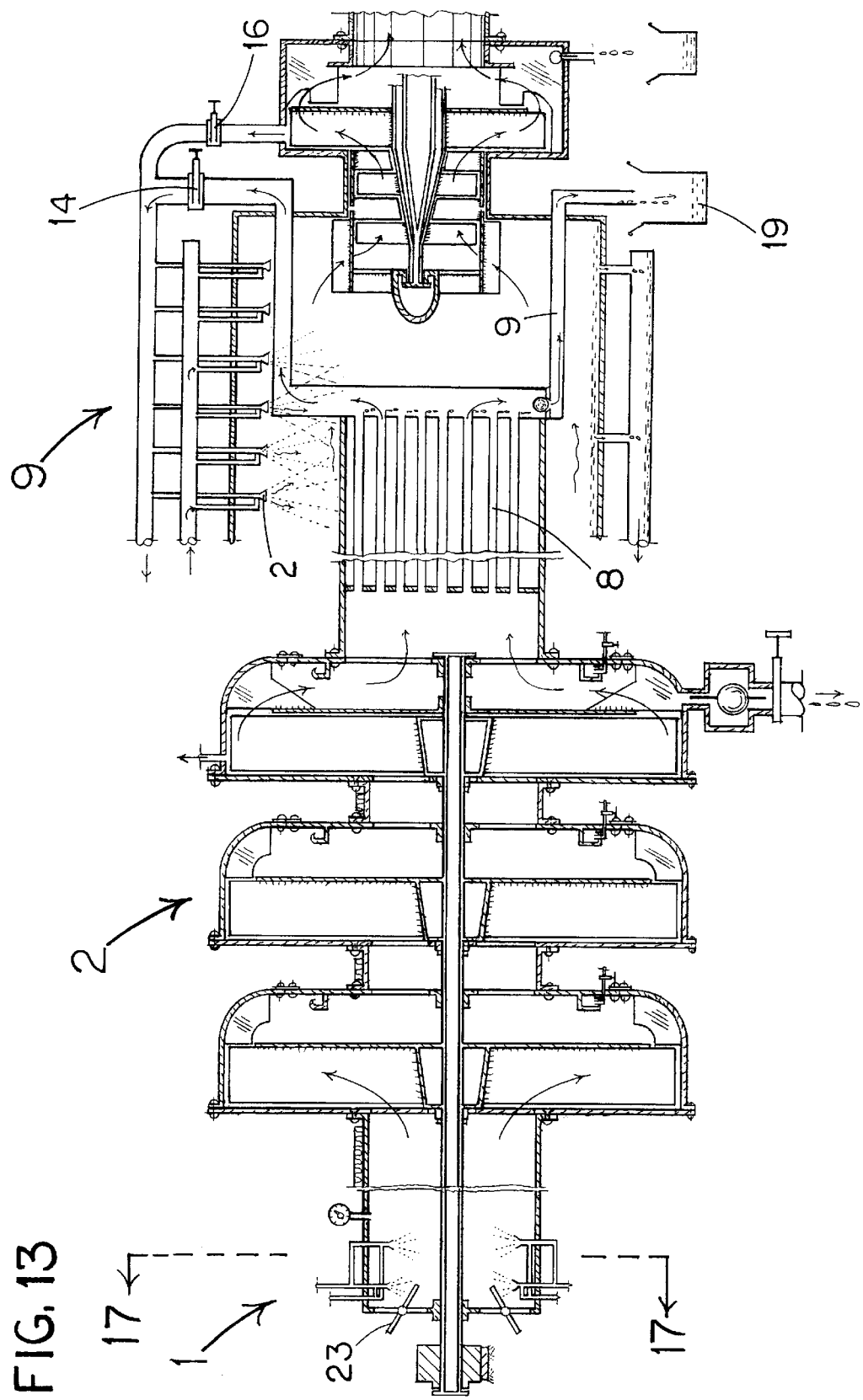
FIG. 13—illustrates a new design for a liquid distillation system that produce high pressure vapor which is supplied to a cool condenser.

FIG. 13—illustrates a new embodiment for a distillation machine using the evaporator section 1 and the multistage vac/compressor section 2 of FIG. 12 in combination with a water mist type air cooling unit/desalination unit 1 of FIG. 9. For the purpose of distilling any liquid, including alcohol, oil, organic mater, top water, and sea water for desalination, the throttle 23 is permanently closed so that the only gas being compressed is the vapor from the material being distilled. By way of the multistage pump section 2, the vapor is sucked from the vacuum evaporator 1 by the pump section 2 and then compressed same vapor by the same pump section 2 into the high pressure condensation radiator 8 that is subjected to cold surroundings—such as the water mist evaporation chamber of section 9,—to facilitate condensation of the compressed vapor. The high compression in the radiator 8 is attained by limiting the release outlet of the gate valve 14 in section 9. The gate valve 16 regulates the passage of compressed air being supplied to nozzl purposes of desalination, the evaporation chamber of section 9 is also further elongated to provide more time for the water mist to evaporate, and sea water is mist prayed thru the nozzle 2 of section 9. The humid air is then sucked and compressed by the multistage pump unit of section 9, and then feed the compressed vapor into the condensation radiator 8. It should be noted that, for desalination purposes, there is not additional air coming from the outside atmosphere that come into play in the misting process. The first compressed air used at the atomizer nozzle 2 is the same compressed air being recycled over and over to pass thru the nozzle 2. This recycling of the air is made possible by the regulating action of the gate valves 14 and 16. The distilled water is then collected by the tank 19 after draining down thru pipe 9.

Figure 14:
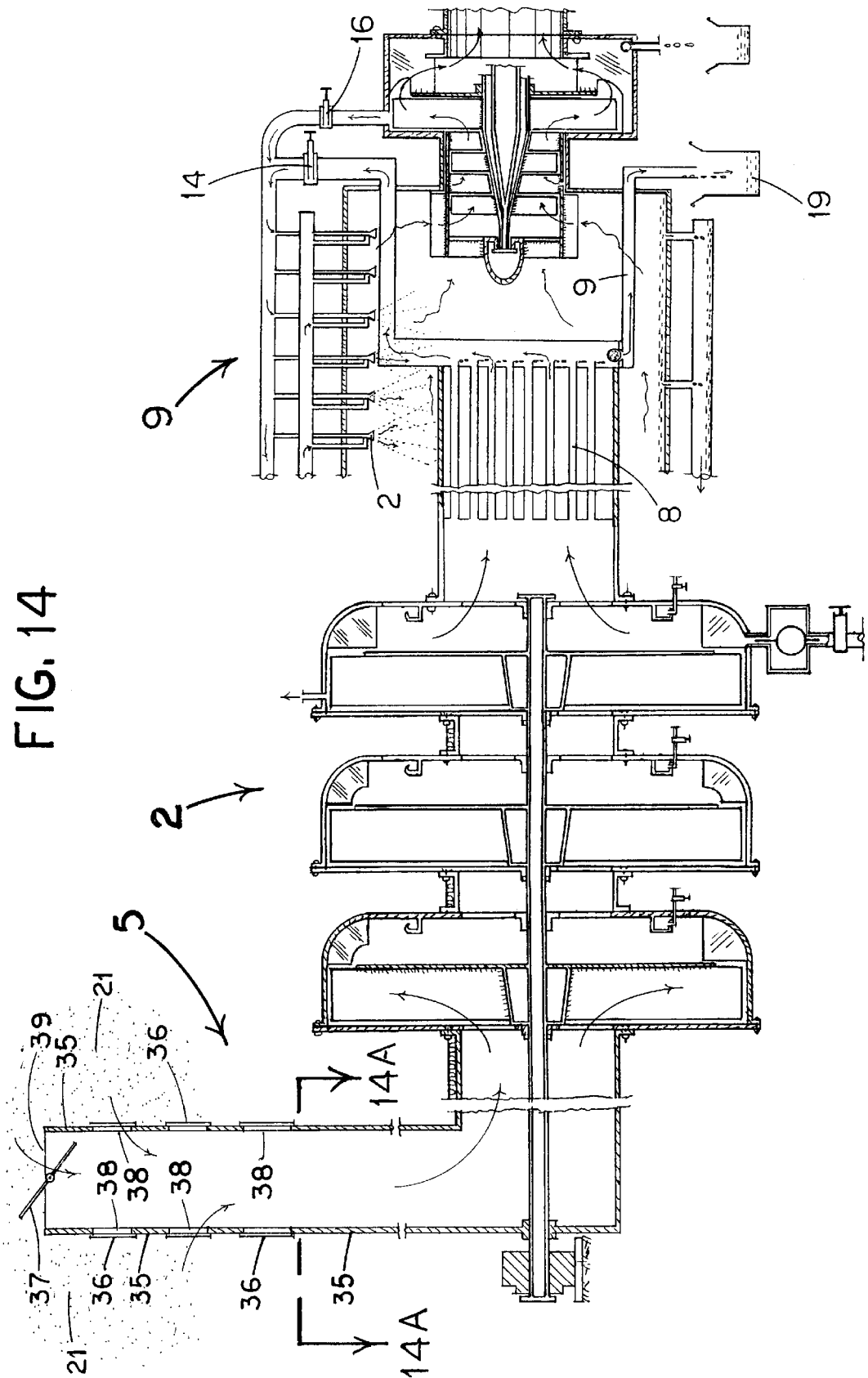
FIG. 14—illustrates a new design for collecting, compressing and condensing the clouds into a drinking water by multistage vac/compressor.

FIG. 14—illustrates a new embodiment by which the clouds 21 are sucked down thru a high altitude vacuumized intake tower trunk section 5 by a multi-stage vac/compressor pump 2, and ram the clouds/vapor into the high pressure radiator condenser 8,—for purposes of forced condensation of the clouds and being collected into a drinking water without waiting for the rain. This configuration is the same machine as shown in FIG. 13, except for the construction of the tall suction tower trunk 5 which replaced the vacuum evaporation chamber section 1, because what is being condensed in this machine now is the ready made salt-free vapor by the clouds. This cloud condensation machine may be built on top of the mountain in order to minimize the construction of the tall tower trunk 5. Depending upon the atmospheric pressure, the clouds 21 may be passing below the top in-take window 39, hence, the throttle valve 37 should be closed, and the upper side windows 38 should also be closed by the window cover 36, while the lower side windows should be opened. If the clouds 21 are passing up to the top of the trunk 5, the top window 39 and the upper side windows should be opened and the lower side window should be closed by sliding the window covers 36. The main structure 35 of the trunk may be made of a large pipe or may be made of a large diameter inflated post and a plurality of vertical suction hoses being hanged around the sides of said inflated large post.

Figure 14A:
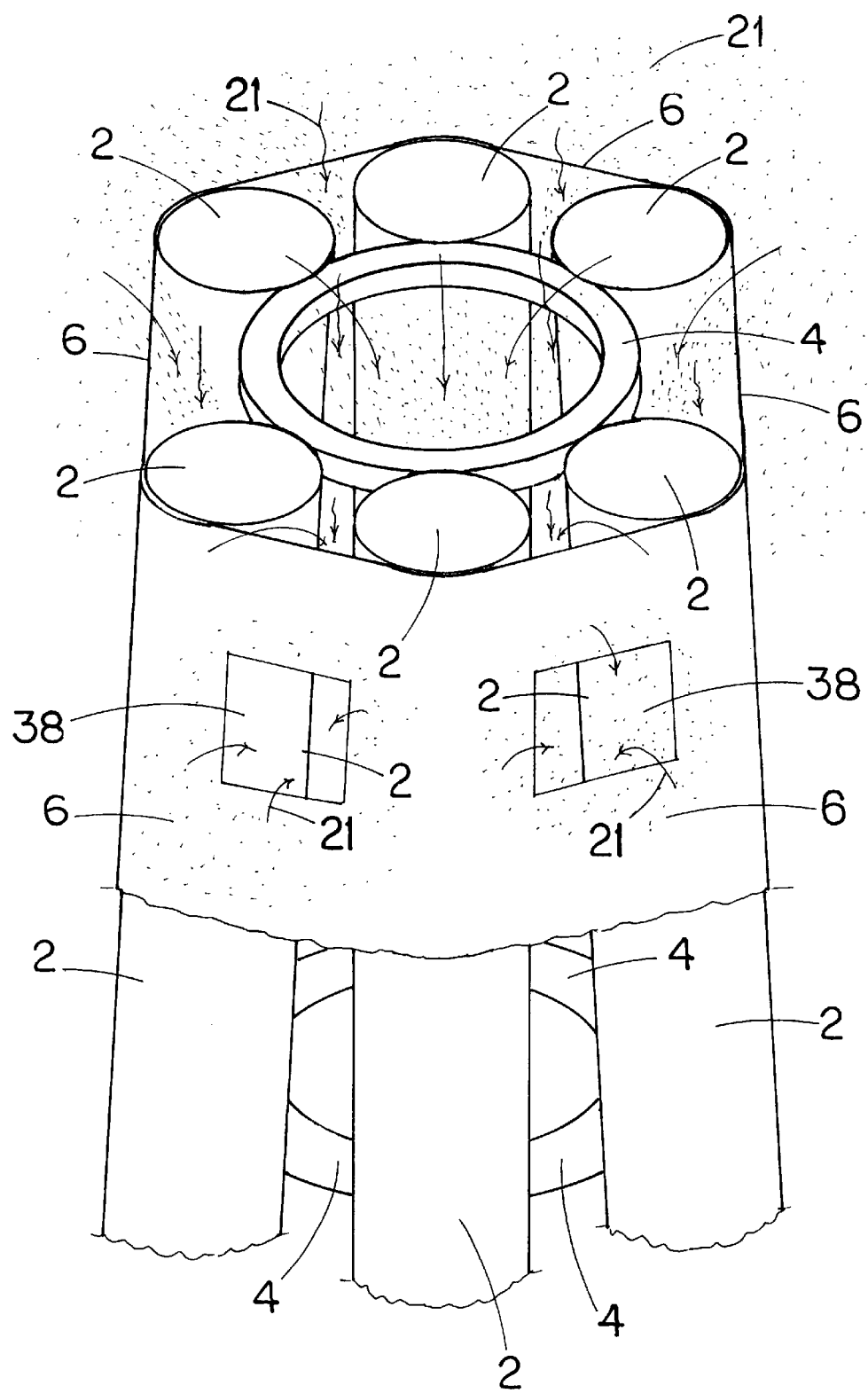
FIG. 14A—illustrates one of the variable details of Section 14A of FIG. 14 which is a new design for an inflatable cloud collecting tall tower.

FIG. 14A—illustrates a new embodiment by which to create a new structural design for a tall/high tower inflatable suction trunk 35 to reach up to the clouds in order to suck or to collect the clouds. The plurality of vertical inflated posts 2 are spacedly attached around a plurality of vertically spaced inflated rings 4 and an air tight sheet 6 is wrapped around the whole bundle of posts 2 to form the trunk 35. The windows 38 are cut out on and around the sheet 6 at various levels to provide entrance windows for the clouds 21 being sucked into the trunk 35. The spaces, created in-between the posts 2 and the spaces created by the enclosure of the sheet 6,—serve as the vertical passage of the cloud 21 in going down to the compressor machine on the ground. In the process of erecting the tower trunk 35, the posts 2 are inflated at low pressure just enough to strut the wrap sheet 6 when assembled. Then the sheet 6 is wrapped around the post assembly and the spaces created by sheet 6 are inflated with hot air so that the whole assembled trunk 35 will float up in sky. If the hot air is not enough to float/lift the trunk 35, then a plurality of hot air balloons is used to lift the top/one end of the tower trunk 35 while its base end will be anchored to the ground,—in order to erect the tower trunk 35. While the tower trunk 35 is still being lifted erect by the hot air balloons, the principal posts 2 are further inflated to the final required pressure.

Figure 15:
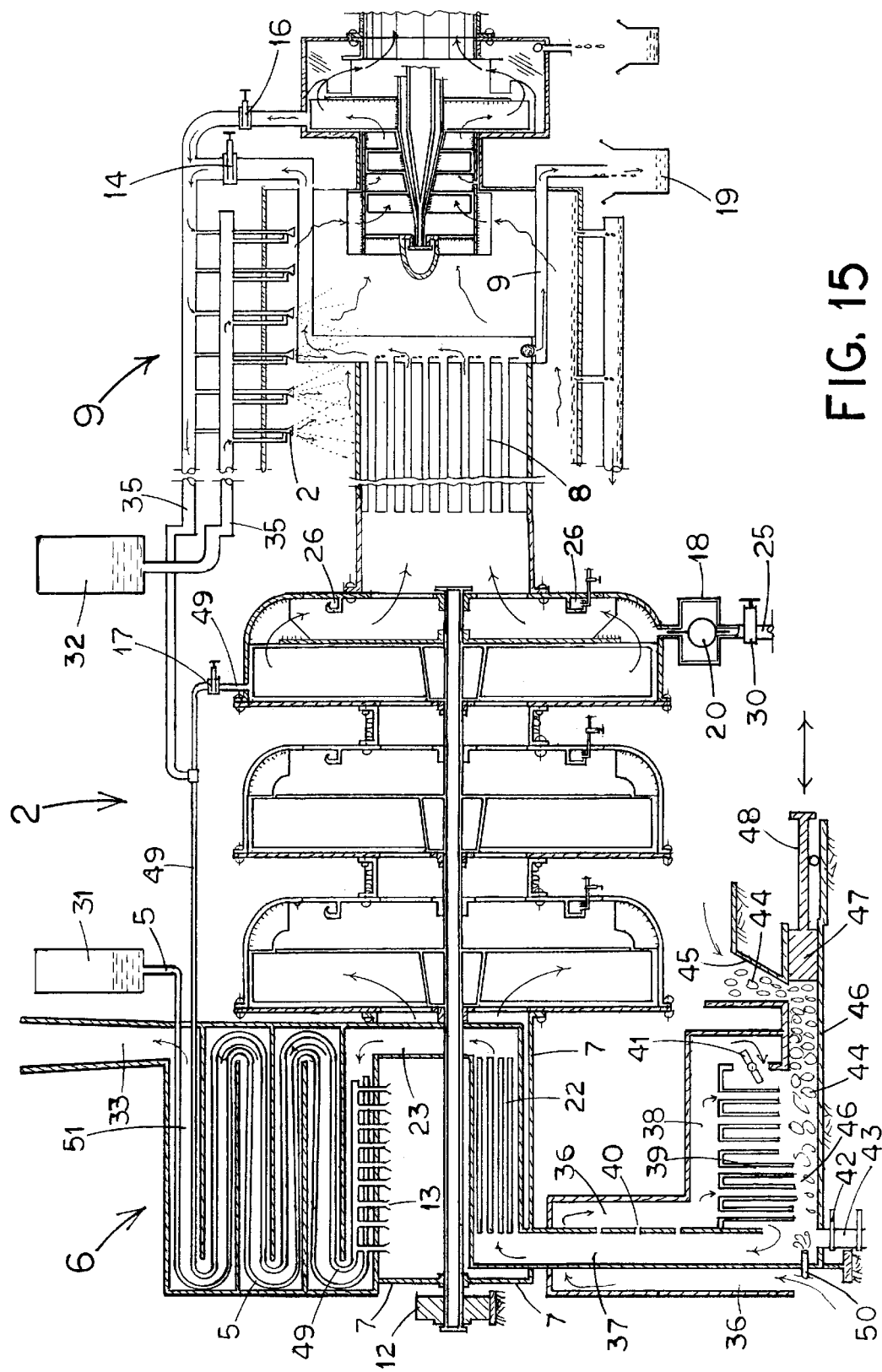
FIG. 15—illustrates a new design for a misting distillation system wherein the vac.-chamber and the air/liquid supply is heated up by trash burner.

FIG. 15—illustrates a new embodiment for a distillation machine by the same process as in FIG. 13, which is the same apparatus as shown in FIG. 13, except that there is now a heating system 6 in this FIG. 15 by which to heat up the water and the compressed air before being sprayed by the atomizer nozzle 13 into the evaporation chamber 7. The heater is any conventional heating system, such as electrical heater, or a natural gas burner 50 thru tubes 22 getting thru the evaporation chamber 7 to provide heat in the chamber 7 and also to provide heat to the multilevel pre-heating radiator 51 which is a zigzag multilevel chamber thru which the water pipe 5 and compressed air pipe 49 pass thru in coil form before being connected to the atomizer 13. As a second alternative, by using trash,—such as crude oil, asphalt, waste organic materials, and coal,—as fuel, the smokeless burner 46 is designed to supply heat to help in the evaporation of the water being distilled. The smokeless trash burner is comprised of: the chamber 46 that serves as container in which the trash 44 is burned; the bin 45 serving to receive and to pour the trash 44 into the chamber 46; the piston 47 being right below the bin 45 pushes the trash 44 into the burning chamber 46 thereby forming a stack pile of trash 44 to prevent the entrance of cold air from the bin 45; the torch 50 that ignites the trash 44 and then turned down to a small flame after the trash 44 is self burning; the pre-heating air in-take manifold 36 to conduct the fresh air up and around the hot chimney 37 to make the fresh air supply very hot and the attic 38 above the combustion chamber 46 further heat up the air supply; the nipple nozzles 39 further heat up the air supply while conducting it and distributing it directly onto the top of the trash 44 in order to bring the oxygen supply nearest to the burning trash 44 to attain complete oxidation by burning the trash from the top; the throttle 41 regulates the air supply so that most the air supply will pass thru the nozzles 39; the ash collector pipe 43 that serves to trap the ash by opening the gate valve 42; the hot chimney 37 being provided with perforation holes 40 on its side facing the downward section of the intake manifold 36 so that only the pre-heated air can get into the hot chimney in order to further completely oxidize the gas fumes that had escaped the burning nozzles 39; the radiator 22 that take hot air from the chimney 37 and to distribute heat inside the evaporator chamber 7; the header 23 that takes the hot air from the radiator 22 and passes it on to the multilevel pre-heating radiator 51 into which the water supply pipe and compressed air supply pipe are coiled around to get pre-heated; and the exhaust chimney 33 to throw out the waste hot air. It should be noted at this point that: 1. In order to attain smokeless trash burning, the burning process must start from the top of the trash instead to burning the trash from the bottom which effects distillation of the trash; 2. Due to the high elevation of the chimney 33, the hot air in the chimney, being much lighter than the cold surrounding air, produces a vacuum effect upon the whole hot air passages, hence, the nozzle 39 will be blowing air supply strongly onto the trash fuel 44. As a third alternative, more natural gas is released by the torch 50 to burn a large flame under the nozzles 39 thereby maintaining the required temperature inside evaporation chamber. As a fourth alternative, hot geothermal steam from the volcano is connected to the pipe 43 and the gate valve 42 opened in order to supply heat into the evaporation chamber thru the chimney 37. As a fifth alternative, the exhaust tail pipe of a fuel burning engine is connected to the pipe 43 in order to supply heat into the evaporation chamber in order to take benefits from the waste heat from the engine.

Figure 16:
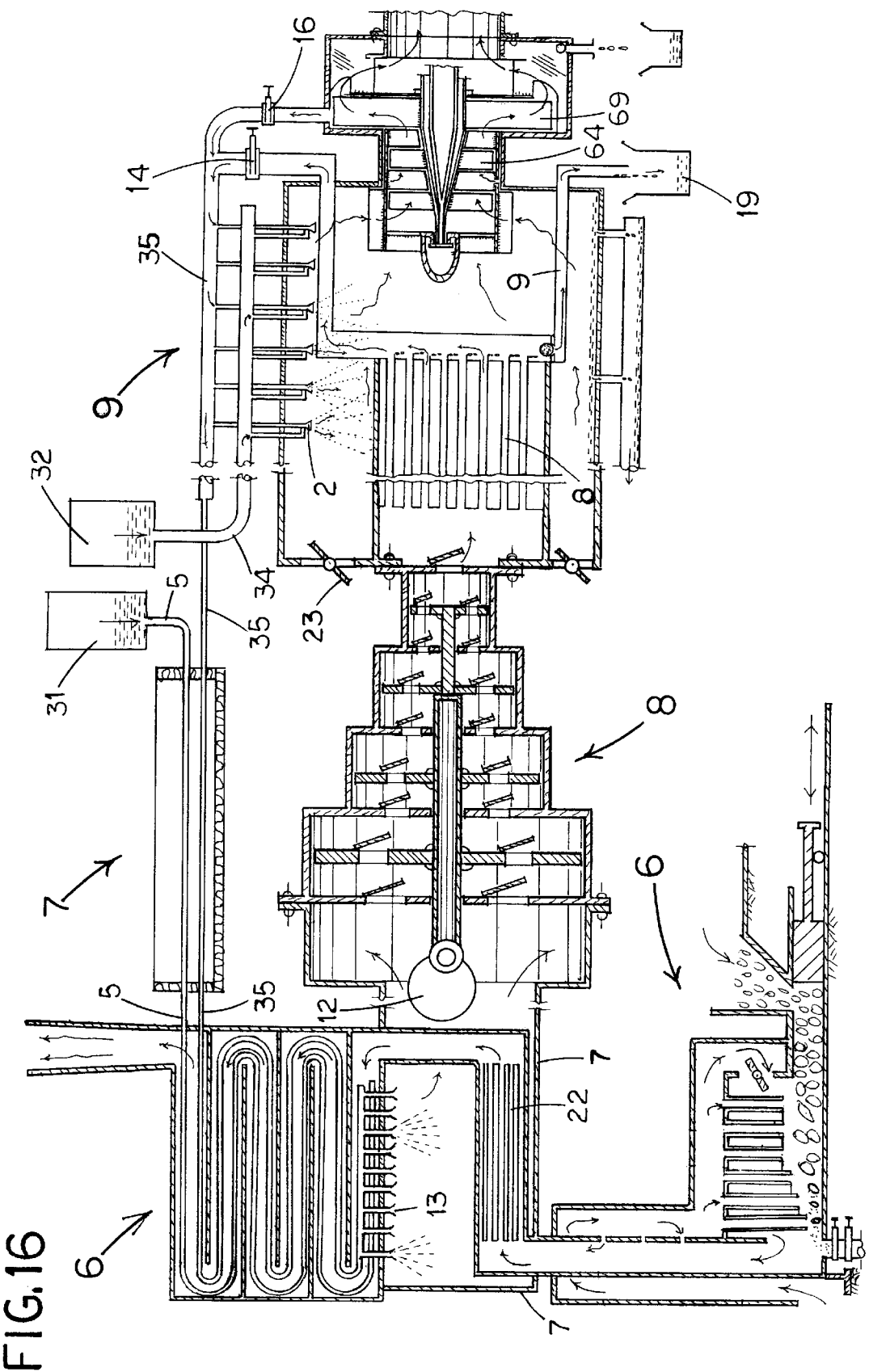
FIG. 16—illustrates a new design for a distillation system wherein a solar heater and a piston-type multistage vac/compressor is used in FIG. 15.

FIG. 16—illustrates a new embodiment for a new design for a desalination device which is practically the same apparatus principle and purposes as the previous FIG. 13 and FIG. 15 and as had been discussed very well in FIG. 13, except for some changes, such as, a new design for a piston type multistage van/compressor pump section 8 now had replaced the centrifugal pump section 2 of FIG. 15, and the solar trap heating system section 7 is in place in addition to the trash burning heating system section 6 in FIG. 15, and additionally, there is now the throttle 23 for the evaporation vacuum chamber in section 9, in which case, section 9 is now also a distillation machine. The herewith Piston type Multistage air pump as indicated in this FIG. 16 as Section 8 has been approved as claim-1 in the U.S. Pat. No. 5,094,595 dated Mar. 10, 1992, hence does not have to be discussed any more, but its function is to vacuum the chamber 7 and to pressurize the condensation radiator 8, for purposes of forced evaporation and forced condensation, and in this case, this vac/compressor pump is being driven by the electric motor 12 that works in a vacuum environment, said pump being made of glass, ceramics and or hard plastics to be resistant against acid/salt action. The solar trap heating system, indicated herein as Section 7, consisting of a heat insulated s floor and side wall with the top cover of a transparent multilayer sheets of roofs with air spaces between sheets, has been claimed in the U.S. Pat. No. 5,507,943 dated Apr. 16, 1996, hence, no need to describe it very well, but its function in this case is to pre-heat the water in pipe 5 and to pre-heat the compressed air in pipe 35, which pipes are also passing thru inside the fuel burning hot radiator 6 to further heat up the water pipe 5 and the compressed air pipe 35,—before finally coming out to spray water/vapor thru the nozzle 13 into the chamber 7. The tank 31 supplies water thru pipe 5 into the evaporator chamber 7, while the tank 32 supplies water thru pipe 34 into the evaporator chamber of section 9. The compressed air supplied by section 9 thru gate valves 14 and 16, thru pipe 35 which serves compressed air into the atomizer nozzle 2 of section 9 and also serves compressed air into the atomizer nozzle 13 of section 6. The clean salt free humid air produced from section 9, after passing thru the multistage turbine/centrifugal pumps 64 and 69, is then directed into the combustion chamber of an oppositely rotating gas turbine engine which drives the pumps 64 and 69 in addition to driving an electric generator.

Figure 17:
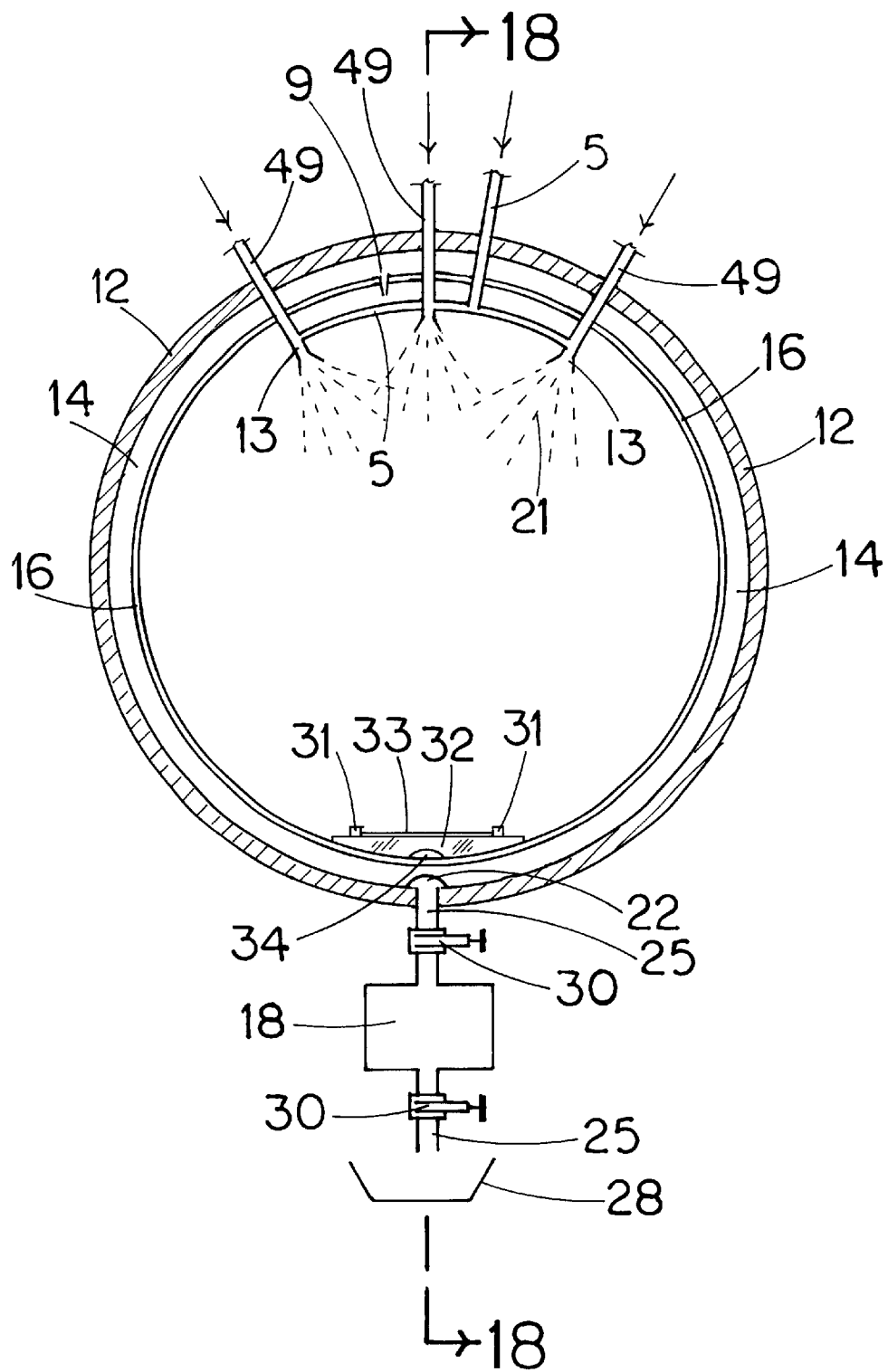
FIG. 17—illustrates a new design for a large vacuum chamber misting evaporator made up of low cost arc structure but protected by a curtain.

FIG. 17—illustrates a new embodiment for a new design for a large scale vacuum evaporation chamber, to be used as evaporation chambers in FIG. 3, FIG. 12, in FIG. 13, in FIG. 15 and in FIG. 16, comprising: a large structural pipe 12 that is strong against implosion, which may be made of concrete, wood, glass, steel, stainless steel, or plastics; a structural rib 14 made of same materials as the pipe 12—serving as an arc strut attached to and to reinforce pipe 12 against implosion; a lining or curtain 16 made of materials resistant to acid or salt action, such as, stainless steel, plastics, or glass, etc.,—which is attached to the ribs 14,—the purpose of which is to keep the structures 12 and 14 stay away from corrosion and to keep the water vapor stay clean; a plurality of misting atomizer nozzles 13 installed inside the chamber thru a plurality of air pipes 49 and water pipes 5 that are inserted thru holes piercing the main structural pipe 12 and curtain sheet 16 at the top section of the chamber in order to spray mist 21 from the ceiling of the chamber; a plurality of weep holes thru and along the ceiling of the curtain sheet 16 to equalize pressure at the back of the curtain 16 with the pressure inside the chamber to protect the curtain sheet 16 from being crushed; the rib 14 is provided with chamfer at the bottom to produce a space passage hole 22 to enable condensates to travel or flow on the floor of the main structural pipe 12 until it feeds and drops into the drain pipe 25 and to accumulate into the waste tank 18 which is also a vacuum tank; the upper gate valve 30 and the lower gate valve 30 are provided so that while the upper valve is closed, the lower valve can be opened in order to drain down the liquid from tank 18 into the open pan 28; the railway tract 31 and the walking platform 33 both resting on the support tie crossbeams 32 being provided for use by maintenance crew ridding on a rail cart or just walking on the platform 33; the chamfer 34 on the rail crossbeams 32 is provided to allow liquids to flow/drain along the floor of the curtain 16. To prevent salt action on the main structures 12 and 14, the chamber is pressurized with compressed air and then distilled water is back flowed thru the drain pipe 25 into the back of the curtain 16 until ½ full, from to time, in order to dissolve all possible corrosive materials that accidentally got into the space behind the curtain sheet 16.

Figure 18:
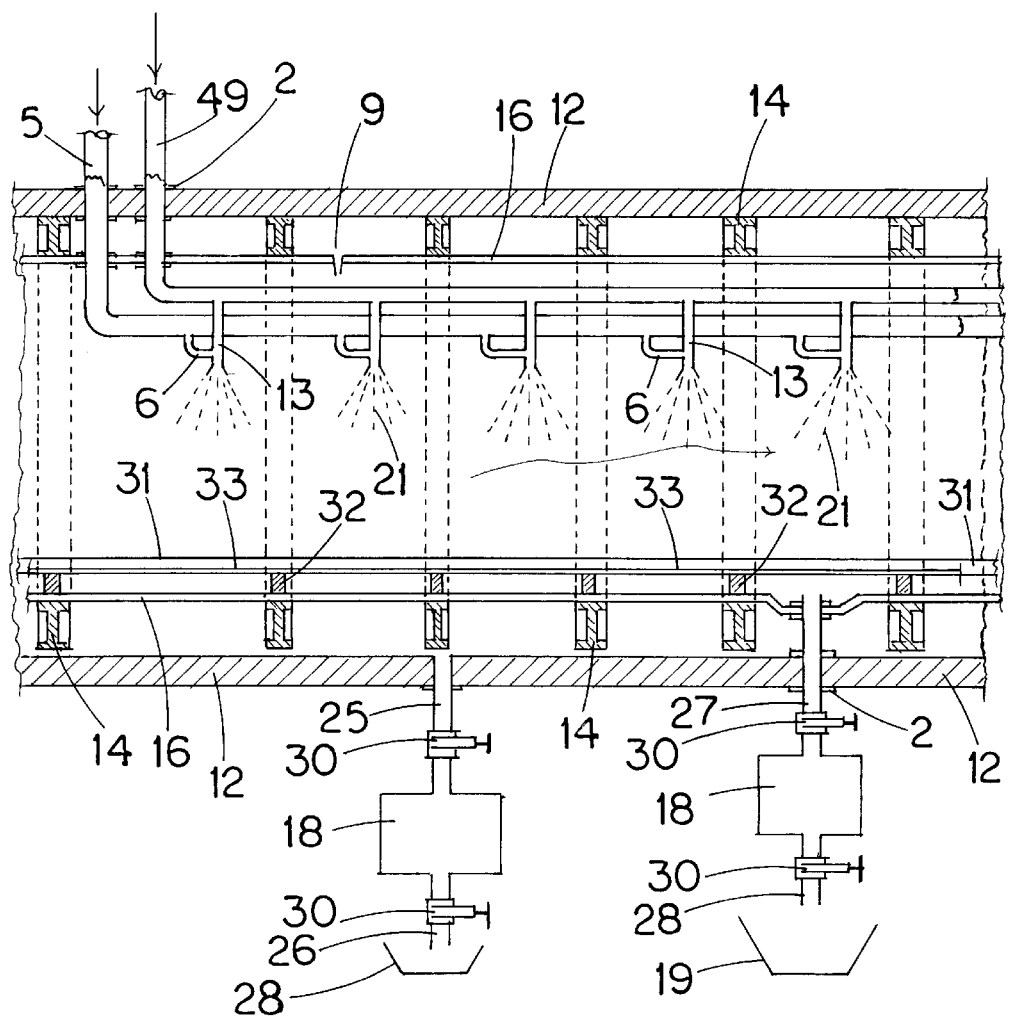
FIG. 18—illustrates a detail of the Section-18 in FIG. 17 showing a new low cost structural design for the vacuum chamber evaporator.

FIG. 18—illustrates a new embodiment for a new design for a vacuum evaporation chamber, which shows the detail view of the cross-section 18 of the preceding FIG. 17, comprising: the longitudinal section view of the main structural pipe 12; the cross-section view of the structural arc rib 14 attached to, around and across to reinforce the main pipe 12; the longitudinal section view of the curtain sheet 16 attached to the rib 14; the weep hole 9 on the curtain sheet 16; the compressed air supply pipe 49 piercing the ceiling of the main pipe 12 and also piercing the ceiling of the curtain sheet 16, and bent to hang a long way along the ceiling of the curtain 16 with a plurality of downward branches to supply a plurality of atomizer nozzles 13; the water supply pipe 5 also piercing thru the ceiling of the main pipe 12 and thru the ceiling of the curtain 16, said water pipe 5 also hangs a long way along the ceiling of the curtain 16 and parallel to the air pipe 49, and which also have branches 6 connected to and to supply the nozzle 13 with water in order to spray waster mist 21 into the vacuum evaporator chamber; a longitudinal view of the rail tract 31 and a longitudinal section view of the walk platform 33 both connected to and resting on the railway ties 32 which in turn rest/connected to the floor of the curtain sheet 16 which in turn rests on and is connected to the rib 14; the drain pipe 27 piercing the floor of the curtain sheet 16 and also piercing the floor of the main pipe 12 to drain excess water from the floor of the curtain sheet 16 and to store the water to the tank 18 thru the upper and lower gate valves 30 to finally drop the water to the pan 19; the drain pipe 25 piercing the floor of the main pipe 12 to drain the excess water from the floor of the main pipe 12 and to store the water to corresponding tank 18 thru the upper and lower gate valves 30 to finally drop down the waste water into the waste pan 28 thru the pipe 26; and the vacuum sealers 2 provided and clamped around the pipes piercing the main pipe 12 and around the pipes piercing the curtain sheet 16 in order to prevent entrance of outside air into the vacuum chamber. This evaporation chamber should be built into a spacious large diameter pipe or into a large tunnel in order to provide enough travel distance and enough time for the water mist to evaporate or dissolve into the air before touching the floor or walls of the chamber. This chamber has the potential to be built into a long large one mile pipe in which a construction/maintenance truck is driven into to ease up the job of the maintenance crew, and a plurality of the this long pipe chamber are laid side-by-side on the ground or laid floating on the ocean in order to desalinate a large quantity of drinking water, see part 15—FIG. 1 of U.S. Pat. No. 5,507,943.

Figure 19:
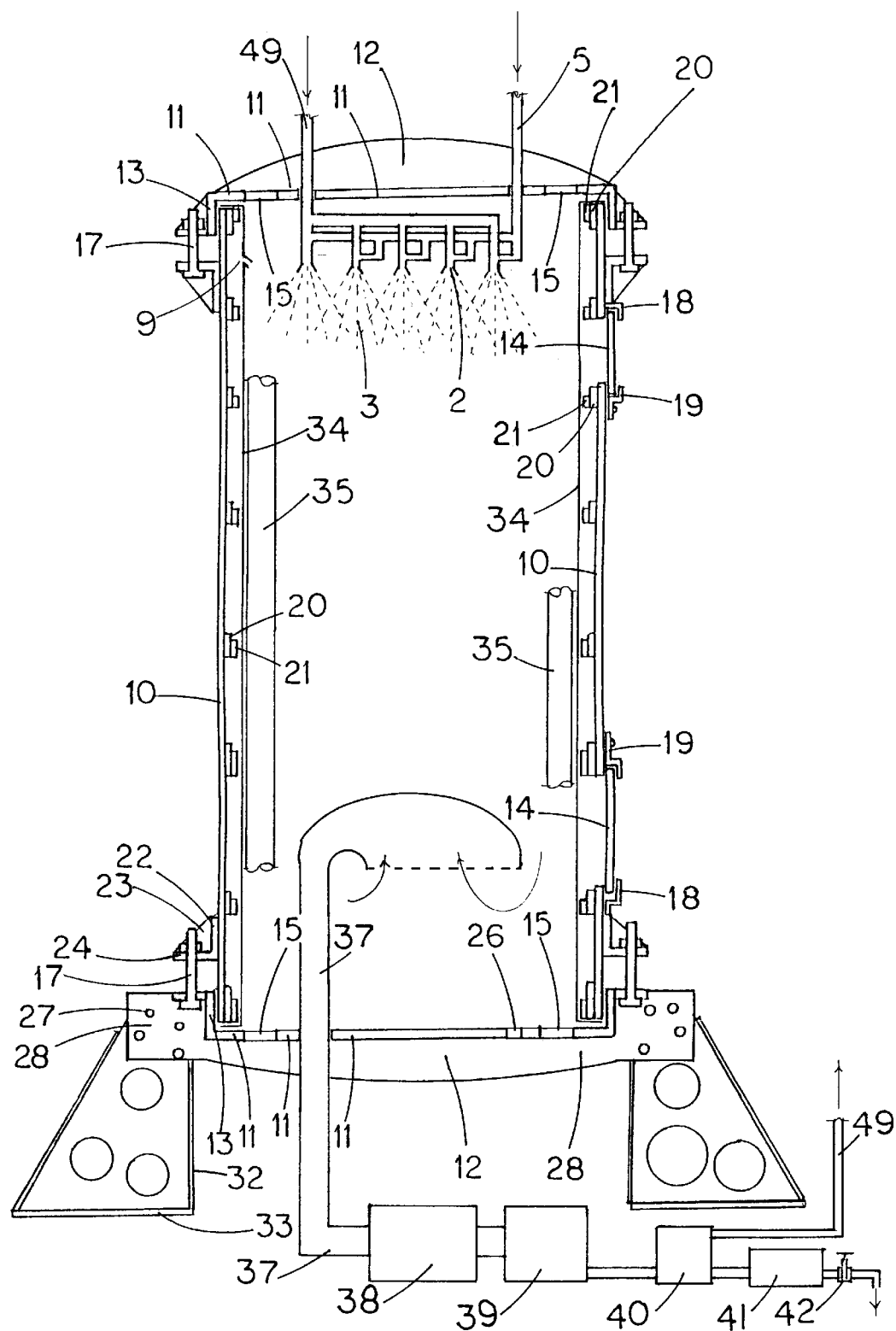
FIG. 19—illustrates a new design for a potable size misting vac-chamber distillation system having an inner liner acid resistant curtain.

FIG. 19—illustrates a new embodiment and a new design for a small scale distillation machine using the same principle of the water mist vacuum evaporation chamber, which may be adapted for house hold use and aboard ship use for distillation or desalination purposes. To prevent contamination of the distilled water or any distillate, and to make this machine resistant to the action of acids or salt water, the whole apparatus, including the vac/compressor pump, should be made of glass, or plastics or plexiglas, ceramics, or stainless steel. The main body drum 10 and its top and bottom cover 11 may alternatively be made of concrete, or lumber or riprapped stones/bricks, provided there is the curtain sheet/wall 34, having a pressure equalizer weep hole 9, that is resistant to acid or salt action. In this case, this distillation device is comprised of: the drum 10 having internal ribs 20 and 21 welded to drum 10, also made up of materials resistant to the action of acid and salt, to serve as reinforcement against implosion; the four support posts 29 at one end to dispose the drum 10 in erect posture, and which can be installed in the garage or outside the house, or in the boat, or on the beach; the glass windows 14 which are attached to the outside face of the drum 10 by the "Z" bar frame 18 welded to the drum 10, in which frame, the glass 14 and its air seal is slided into; the "Z" bar 19 being removably attached to the drum 10 by a screw to lock the glass plate in place; the acid/salt resistant curtain sheet 34 with the pressure equalizer weep hole 9, made up of stainless steel, plastics or Plexiglas, glass, and/or ceramics, the ends lips of which are folded over to the top and bottom lips of the drum 10, said curtain being in the form of a large drum so that its outside wall barely touches the face of the ribs 21; the top cover plate 11 having holes 15, having a rim 13 that is being clipped over to the lips of the drum 10 by the adjustable wing-nut bolts 17 which are anchored to the drum 10 by brackets; the compressed air supply pipe 49 which pierced the top cover plate 11, and which branches into a plurality of atomizer nozzles 2 into and inside the chamber; the liquid supplier pipe 5 which pieced the top cover plate 11 and which branches into plurality of tubes that are connected and communicated to the atomizer nozzles 2 in order to spray the mist 3 into the vacuum evaporator chamber; the bottom cover plate 11 likewise having the holes 15 for the heater pipes 35 to pass thru and a hole 26 thru which the excess unevaporated liquid or brine will drop down thru a collector pipe, and having a rim 13 that is provided with brackets 22, 23, and 24 for purposes of holding the lock bolt 17 which fastens the cover plate 11 to the bottom lips of the drum 10 by way of the other brackets welded on to the sides of the trunk 10; the stiffener bar plate 12 welded to the outer face of each top cover plate 11 and the bottom cover plate 11 to make said cover plates resistant against implosion; the gusset plates 28 with connector holes 27 which is an outward extension of the stiffener 12; the support plate posts 29 having connector holes 27 by which said post is connected to the gusset plate 28, said post being made light weight by cutting off the large holes 30, said plate posts being made stiff by welding the plate bars 31, 32, and 33 on its edges; the vapor suction mouth 36 communicated to the suction pipe 37 which is communicated to the vac/compressor pump 38 which in turn is communicated by a pipe to the high pressure vapor cold radiator-type condenser 39 which is subsequently communicated to and delivers the distillate by a pipe to the high pressure cold air-liquid separator 40 which is in turn connected to and delivers the high pressure distillate by pipe to the high pressure storage tank 41, said air-liquid separator 40 being also communicated by the pipe 49 to the same air supply pipe 49 at the top cover plate 11 in order to blow compressed air thru the nozzles 2; the gate valve 42 being provided to release the distillate or drinking water; and the plurality of heater pipes 35 piercing thru the hole 15 of the bottom cover plate 11 into the vacuum chamber 10 and out of same chamber thru the hole 15 of the top cover plate 11 to bring heat energy to speed up the evaporation process inside the vacuum chamber, said heater pipe 35 may get heat energy from electricity, or from any fuel burning engine, from nuclear power plants, from solar heat collectors, from the hot water in the garage of the house, or from trash incinerators. Note: that since the radiator condenser 39 needs cold matter to get in touch with, the condenser pipes may be placed inside the cold water supply pipe that is buried underground to heat up the water supply before it gets into the water heater at the garage or before it gets into the kitchen and into the washing machines.

Figure 20:
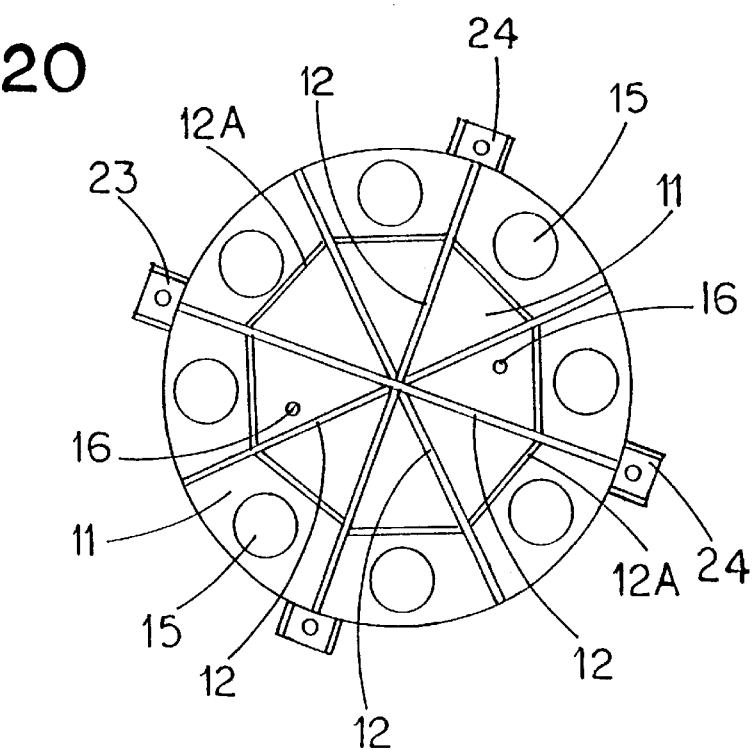
FIG. 20—illustrates an implosion resistant top cover for the drum in FIG. 19.

FIG. 20—illustrates a top view of the top cover plate 11 of the vacuum drum 10 of FIG. 19, showing: the circular plate 11; the eight equally spaced holes 15 thru which the eight heater pipes 35 pierced the said cover plate 11; the holes 16 thru which the liquid supply pipe 5 and the compressed air supply pipe 49 of FIG. 19 pierced the top plate 11; the stiffener plate bars 12A welded crisscrossing on top of the cover plate 11 to make said plate 11 strong against implosion; the additional flat bars welded in an octagonal formation on top of said plate 11 to further stiffen the cover plate 11; and the bracket 24 that holds the lock bolt 17 of FIG. 19 on to the drum 10.

Figure 21:
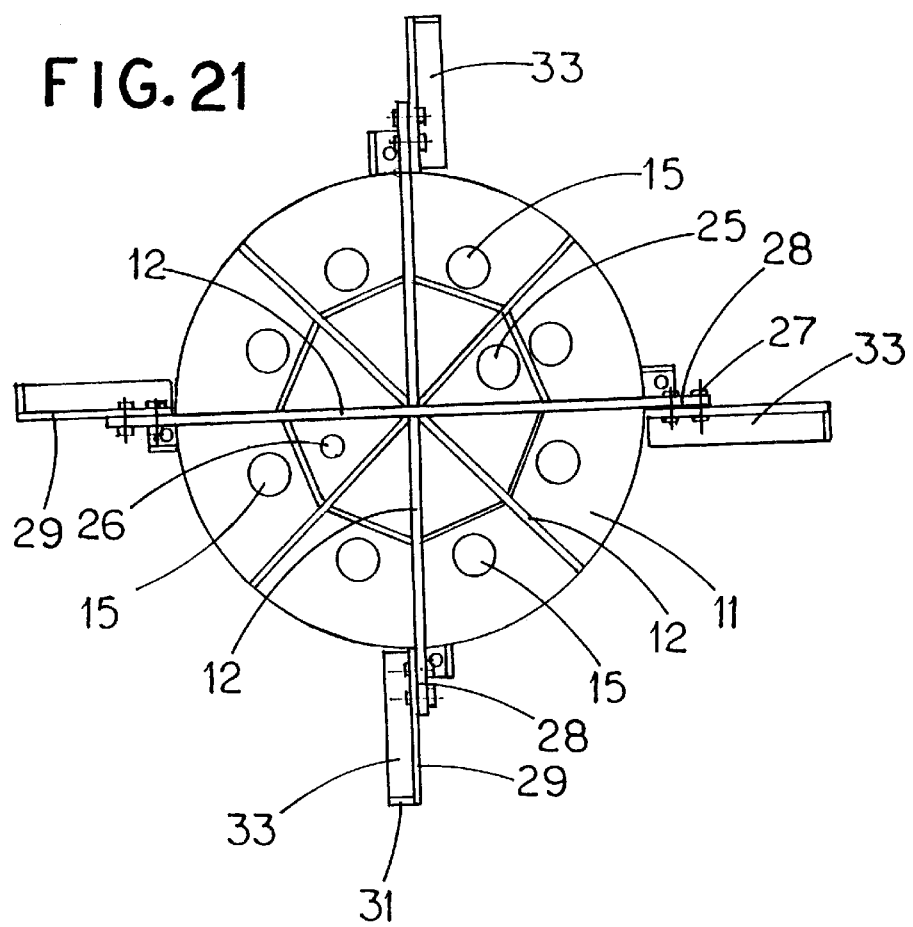
FIG. 21—illustrates an implosion resistant bottom cover for the drum in A.

FIG. 21—illustrates a bottom view of the bottom cover plate 11 of FIG. 19, comprising: the plate 11 having eight holes 15 thru which the eight heater pipes 35 of FIG. 19 pierced the bottom plate 11 in getting into the chamber 10; the hole 25 thru which the suction pipe 37 pierced the bottom cover plate 11 in getting into the chamber 10; the hole 26 thru which the unevaporated liquid or brine drops down thru a collector pipe; the stiffener flat bars 12 welded crisscrossing on the bottom face of the bottom cover plate 11; the gusset plate 28 being an extension of the stiffener bar 12, said gusset having holes 27 by which it is bolted to the support posts 29 the bottom end of which being welded to the flat foot 33; and the flat bar 31 welded to the outer edge of the plate posts 29 to make said post stiff.

FIG. 22—illustrates a new embodiment and a new structural design for a light low cost vacuum evaporation chamber 1, which may be disposed erect or disposed laid horizontal long pipeline, adaptable for use as evaporation chamber in FIG. 3, FIG. 9, FIG. 13, FIG. 15, FIG. 16, FIG. 17, FIG. 18, and FIG. 19 in desalination of sea water, comprising: an inner curtain cylindrical wall 2 having a weep hole 16 that balances the pressure between inside the chamber 2 and the outside of the chamber 2, in which case, though chamber 2 is a vacuum, it does not carry any pressure from the outside atmosphere even if there is a leak from the corrugated wall 6 or from the cylindrical outside wall 8 hence does not have to be strong, said curtain wall 2 may be made of any acid/salt resistant materials, such as, plastics sheets, plastic panels, plexiglas, stainless steel, aluminum alloys, glass, ceramics, etc., which are readily available in the market; a main air barrier cylindrical structural wall 8, which may be made up of cheaper materials such as rolled steel plate, galvanized iron sheets, aluminum alloys, concrete, composite fiberglass, wood, chrome plated metal sheets, plastics sheets, plexiglas sheets, and stainless steel sheets; a main structural corrugated arc wall 6 that serves as strut frame to prevent collapse of the outer wall 8 due to implosion, which may be in the form of a molded plastics, or a plurality of stacked ring sheets that are alternately reversed with each other and glued/welded together at the edges to form a circular column, the outer crest of each corrugation being attached by bolts, screws, or by glue weld 14 to the inner face of wall 8, which may be done by the process of electroplating, in order to function as a truss structure, said corrugated cylinder 6 may also be attached to the outer face of the inner curtain wall 2 by means of the fastener 14 to make the walls of the chamber more rigid against bending and against implosion; a thick cylindrical wall 10 to make the lip 12 of the chamber rigid, and which is made even more rigid by the structural flat ring 4 interconnecting the ends of the outer cylinder 8 to the lip structure 10 by means of glue or by weld.

There are many available new configurations into which the vacuum evaporation chamber and its accompanying machinery may be made in order to make the chamber work and to maximize utilization of the chambers, including floating structures, floating sea wall, floating platforms, submerged platforms, underwater pipe houses by having sub-chambers and subdivision cross walls in the vacuum evaporation chambers, underwater transportation, and underwater fishing submarines, and chambers made into the likeness of a large fish on wheels and as a boat, of which new ideas, the herein inventor reserves all proprietary rights and hereby apply for protection by Letters Patent.

What I claim as new, for which protection by a Letters Patent is applied for, are as follows:

1. A spray-mist-evaporation-blower/air-pump-condensation system, that speeds up evaporation of liquids, and speeds up condensation of vapors, for various applications including production of cold and humid air that is supplied into a place, and/or feed into an engine, and production of potable water out of the sea water or out of water vapor, to name a few, wherein, water is sprayed in the form of fine mist by a plurality of atomizer nozzles to maximize water surface exposed to the environment;

wherein, the fine mist is enclosed by a structurally strong against implosion air duct serving as vacuum evaporation chamber made resistant to the action of salt and heat insulated, the air duct made variably horizontal or vertical;

wherein, the vacuum air duct, appurtenant components, and supporting structures, are made of glass and other materials resistant to salt action in a new structural; design so as to minimize materials by having braces, truss reinforcements, inflated structures and parts, interior curtains with weep holes, among others;

wherein, the vacuum air duct is variably made adaptable to be assembled on land, floating on water, standing in the air, and submerged underwater for various additional functions and new applications such as, floating platform, floating sea wall, and underwater chamber/house, to name a few;

wherein, moving air or wind is introduced at the inlet thru the evaporation air duct to prevent saturation of humidity inside the chamber and to move the air-water mixture as cold air out of the air duct;

wherein, the air duct evaporation chamber is vacuumed to further speed up evaporation of the mist inside the air duct/chamber and to maximize cooling efficiency upon the air-water mixture;

wherein, the evaporation vacuum chamber/duct is made sufficiently long to provide enough time for the water mist to evaporate completely while traveling along the length of the chamber;

wherein, to provide high efficiency in spraying water mist, a plurality of venturi nozzles run by compressed air exhausting through the nozzle and used to spray mist inside the entrance section of the evaporation air duct;

wherein, a high pressure multi-tube heat exchange cooling radiator is placed inside and alone the length of the evaporation chamber to maximize cooling of a separate source dry fresh air passing through the radiator, the resulting cold dry air being supplied to a house or an office;

wherein, alternatively, after the vapor is cleaned by a cyclone cleaner, the high pressure water vapor coming from the cyclone cleaner is passed through the heat exchange cooling radiator tubes or cold plates to effect condensation of vapor into water;

wherein, an air cleaning multistage centrifugal pump/gas turbine/blower, having an inlet communicated to the exhaust end of the evaporation chamber/air duct is used to vacuum the evaporation air duct and used to compress the resulting cold air-water mixture be rapid expulsion of vapor at its outlet end;

wherein, an air throttle gate is provided at the inlet of the evaporation chamber to limit the entrance of air getting into the chamber to maintain the desired level of vacuum inside the evaporation chamber;

wherein, the outlet end of the gas turbine is communicated to the inlet of a centrifugal cyclone dust separator as an integral part of this evaporator/cooling device, in order to remove all excess water particles and dusts of salts from the cold air-water mixture before the cold air is finally supplied to a house or office;

wherein, the outlet of the centrifugal cyclone dust separator is communicated to the inlet of a gas turbine engine thereby feeding the resulting clean cold air-water mixture to the engine to increase the power output of the engine;

wherein, alternatively, the clean cold air-water mixture from the outlet of the cyclone separator is released in the form of high pressure fine tiny bubbles through a deep cold drinking water to condense excess humidity and added to the drinking water;

wherein, the dehumidified air coming out of the drinking water is recycled to blow water mist through the venturi nozzle atomizers inside the evaporation chamber to make sure the atomizing air is clean; and wherein, air supply direct from the atmosphere is pre-cleaned by releasing compressed air in the form of fine tiny bubbles under water before it is fed into a cooling radiator;

comprising:

an air duct made of glass and/or other materials resistant to acid/salt action, and resistant against implosion, serving as an evaporation vacuum chamber, having an inlet end, a first ¼ section, a first ¼ point, a last ¼ point, a last ¼ section, a first half section, a ceiling, a floor and an outlet end, the chamber made spacious a with sufficient length to provide evaporation time for the mist;

a connector lip provided to each inlet and outlet end of the chamber; a front cover plate, having air throttle gates, attached by bolts to the inlet connector lip of the chamber;

the vacuum air duct and its supporting structures having braces, trusses, struts, interior curtains with weep holes, inflated heat insulators and inflated structures in a new structural design and configuration so as to minimize construction materials, a main pressurized air supply duct piercing thru, and attached to, the front cover plate of the chamber, having an air outlet mouth serving as blower to push out the mist forward thru the evaporation chamber; [( see part 23 of FIG. 3, & last line of page 14 and line 1 of page 15 in the description of FIG. 3 )]

a high pressure liquid header pipe piercing the cover plate and attached to the ceiling of, and within the first half section of, the chamber, and across the outlet mouth of the main air supply duct; [(see part 4 of FIG. 3)]

a plurality of high pressure tube nipples, each having an inlet spacedly connected to the liquid header pipe, and an outlet pointed downward;

a high pressure misting/atomizer nozzle functionally connected to the outlet of each nipple, to supply mists downward into the chamber;

a main liquid supply pipe/hose communicated to the liquid header pipe;

a plurality of atomizers attached/installed on the chamber's floor, within the first half section of, and to supply mist upward into, the chamber;

a couple of a liquid tube and a compressed air tube piercing the floor of the chamber and functionally connected to each atomizer;

a heat insulator/shelter wrapped around said liquid supply pipe;

a heat insulator wrapped around or covering the chamber/air duct;

an air cleaning multistage centrifugal air pump-vacuum/blower device, having an inlet and an outlet connector lips, connected to the outlet end connector lip of the evaporation vacuumed chamber;

a clean compressed air inlet header pipe, having an inlet and having an outlet section that pierced thru the first ¼ point of, and having branches into, the chamber;

a cold compressed air outlet header pipe, having an inlet section that pierced thru the last ¼ point of, and having branches into, the chamber, and having an outlet end communicated to cool a house/office;

a plurality of cooling radiator compressed air tubes spacedly arranged inside of, and parallel to, the chamber, and spacedly connected to, and inter-communicating, the clean compressed air inlet header pipe branches with the branches of the cold air outlet header pipe;

a closed water tank, having:—a top,—a bottom side, a compressed air inlet header pipe piercing the bottom side of, and branching inside, the tank,—a clean air outlet header pipe communicated to, and piercing thru the top of, the tank,—a water supply inlet pipe communicated with and supplying clean water into the water tank,—and, a dirty water low level outlet pipe communicated with the water tank;

a header pipe connector inter-communicating the air inlet of the cooling radiator with the clean air outlet header pipe of the water tank;

a plurality of perforated tubes spacedly connected to and communicated with the branches of the air header pipe inside the water tank, and submerged underwater in the water tank releasing tiny bubbles of air into the bottom of the water, for purposes of cleaning the air and to pressurize the air before being released into the water;

an air duct communicated with the outlet header pipe of the cooling radiator, the other end of which communicated with a house air duct, to supply dry cold air into the house or an office/work building;

a water pipe communicated with the dirty water outlet of the water tank, the other end of which communicated with a plurality of water atomizer nozzles that spray water upon another high pressure condensation radiator tube assembly inside another vacuum evaporation chamber;

a centrifugal cyclone air cleaner, having an inlet and an outlet connector lips, with its inlet lip connected to the outlet connector lip of the vacuum pump; the cyclone air cleaner, being a new hybrid design, specially having a peripheral instilling chamber that is enclosed by and in between an outer vertical main drum body and by a perforated inner vertical drum wall;

a main discharge air duct, in the form of a centrifugal-air-cleaning pipe having an internal helix/corkscrew wide face fin, connected to the outlet lip of the cyclone air cleaner, while another end of which connected to an air intake:—of an air conditioning system of a building,—of an abode place,—of a work place,—of an engine to multiply its power output,—of a high pressure condensation radiator tube assembly, and,—of a high pressure cold drinking water tank for condensation.

2. A spray-mist-evaporation-blower/air-pump system, that produce cold humid air in accordance with claim 1, including a new design for an air cooling system, wherein, for the same purpose of using an air blower to push and speed up evaporation of water mist in the wind in order to produce cold humid air passing thru a definite path as in claim 1, a plurality of water misting tube-nozzle device are attached to a front frame of an air blower, so that the water-misting device goes freely with the left and right oscillation of air blower, and water mists out thru the nozzles and evaporates into the wind being pushed out by the air blower to make the wind cooler, comprising:

at least one air blower, run by any kind of motor, mounted on a free swing support stand, having a protection shell mounted around the motor, having an assembly of blower blades mechanically connected by a drive shaft to the motor, and having a front safety protection frame mounted around the blower blades;

a resilient strap clamp tightly fitting around the motor's shell, the clamp being forcibly pressed/slided thru to hold on to the motor's shell;

a water tube having a quarter arc bent section attached to the strap clamp by a couple of strap connectors;

the water tube extended upward, bent over the protection frame, and bent down to the front of the air blower where the tube makes branches;

a plurality of water misting nozzles, facing away from the blower, spaccdly connected/communicated to the water tube and to the branches of the water tube at the front of the blower;

the water tube being extended downward from the motor shell, with a coupling water-valve connector being provided at the bottom end of the tube; and a high pressure flexible water hose being communicated with said tube thru the coupling, and the output cold air being blown to an abode, to a greenhouse, to a livestock area, and to a recreation area.

3. A spray-mist-evaporation-blower/air-pump system, that produces cold and humid air in accordance with claim 1, including a new design for an air cooling system, wherein, for the same purpose of using an air blower to push and speed up evaporation of water mist in order to produce cold humid air passing thru a definite path as in claim 1, a self standing water misting device, in the form of a plurality of misting nozzles connected to a self standing water pipe erected in front of an air blower that directs the wind into a house/building thru its windows and thru its doors, or into a greenhouse, or to livestock area.

4. A spray-mist-evaporation-blower/air-pump system, that produce cold and humid air in accordance with claim 1, including a new design for an air cooling system, wherein, for the same purpose of using a moving air/wind to speed up evaporation of water mist in the wind in order to produce cold humid air passing thru a definite path as in claim 1, a plurality of tall water misting devices in multiple array are erected for the purpose of maximizing water mist being introduced into the blowing wind in an open field/space, comprising:

a plurality of tall water misting high pressure pipes erected in a multiple array formation, standing on the ground or in an open field/space that needs cold and humid air;

a plurality of water misting nozzles functionally connected to and around the sides of the high pressure water misting tall pipes to produce water mist;

a plurality of water misting atomizer nozzles arranged in a multiple array formation in same open field to additionally introduce more water mist upward;

a main high pressure water supply pipe having multiple branches spacedly laid on the a ground across the wind;

each standing misting tall water pipe connected to a branch of the main water pipe;

each water misting atomizer nozzle connected to a branch of the main water pipe;

a high pressure compressed air pipe with multiple branches laid on the ground;

each atomizer nozzle communicated to a branch of the air pipe; and a plurality of guy wires/ropes anchored to the ground and attached to each tall misting pipe to hold the tall pipes at an erect posture against the wind.

5. A spray-mist-evaporation blower/air-pump system, that produce cold humid air in accordance with claim 1, including a new design for an evaporator air duct, wherein, for the same purpose of taking advantage of the effectiveness of a vacuum evaporation chamber, a vacuumed air duct and a vacuumed cyclone air cleaner are assembled together in series as in claim 1, comprising:

an evaporation vacuumed chamber/air duct having a limited air inlet and a wide air outlet;

a unit of centrifugal cyclone air cleaner, having an air outlet, and with an air inlet connected and communicated to the air outlet of the vacuumed evaporation chamber/air duct;

a unit of vacuuming air turbine/air pump machine, having its air inlet connected/communicated to the outlet of the cyclone air cleaner, such that the cyclone air cleaner also serves as an additional vacuum evaporation chamber.

6. A spray-mist-evaporation-blower-air-pump system, that produce cold humid air in accordance with claim 1 or claim 5, including a new design for a new hybrid high efficiency Centrifugal Cyclone Separator air cleaner, wherein, for the same purpose of taking advantage of the effectiveness of a vacuumed chamber to speed up evaporation by water mist, a Centrifugal Cyclone Separator air cleaner is improved and made to serve as vacuumed evaporation chamber as in claim 1, comprising:

a cylindrical drum-type outer main body disposed at a vertical posture, having an open top, an open bottom lip, an upper ¼ section, an upper ¼ point, a middle ½ section, a lower ¼ section, a lower ¼ point, a lower section, and an air inlet window through its upper ¼ section;

a circular top cover plate, having a center hole, attached to cover the open top of the drum;

a vertical air outlet pipe, having an outside wall, an upper section, and a lower section,—attached to and piercing the center hole of the top cover plate, and extended downward with an open bottom to the level of the lower section of the main drum body;

the air outlet pipe having perforations at its lower section to distribute air inlet;

a smaller inner drum of the same shape as and having the same parts as the main drum body, additionally having a plurality of windows around, and centrally placed inside the main drum body, and centrally attached to the top cover plate, in order to create a stilling/settling chamber in between the main drum body and the inner drum;

an air inlet window opened at the upper ¼ section of the inner drum, the air inlet window being aligned with the air inlet window of the main drum body;

an air inlet portal duct, having an inlet lip connector, an outlet lip connector, outside walls, and having an inner side outlet lip;

the portal duct eccentrically pierced thru the air inlet window of the outer main drum body, and further eccentrically pierced thru the air inlet window of the inner drum;

the outlet lip of the portal duct air tightly connected to the inner drum inlet window;

the outside walls of the portal duct air tightly connected to the outer drum inlet window;

an extension of the inner side outlet lip of the portal duck being attached to the outside wall of the upper section of the vertical air outlet pipe;

an inner frustum drum wall extension, having a lower lip, with an upper lip attached to the open bottom lip of the inner drum;

a horizontal clean out upper basement floor plate attached to the lower lip of the inner frustum drum, and having a clean out conveyor device;

a horizontal perforated floor, in the form of a crossgrillwork of wide-face vertical plates, attached to the inner frustum wall and to the upper floor plate to create a bottom instilling/settling chamber above said upper basement floor;

an outer frustum drum wall, with a lower lip attached to the bottom lip of the main drum body, and extended down below said upper basement floor;

a horizontal clean out lower basement floor plate attached to the lower lip of the outer frustum drum wall;

a clean out device, in the form of various kinds, including but not limited to an auger, vacuum, a conveyor, and water flash, installed and connected in the upper and in the lower basement floors;

a bottom drop off/discharge pipe with a gate valve to collect the dirt from the clean out devices and to ease up disposition of dirt to a disposal container;

a water actuated valve being provided at the bottom discharge pipe to drop off water; and a wide-face spiral fin placed inside the cyclone air cleaner, attached around the central vertical air outlet pipe, to guide the air to move laminarly along a spiral path.

7. A spray-mist-evaporation-blower/air-pump system, that produce clean humid air in accordance with claim 1 or claim 6, including a new design for a car/truck engine, wherein, for the same purpose of taking advantage of the effectiveness of the hybrid cyclone air cleaner as in claim 1, the mouth of the car's/truck's air intake manifold is set out up front to face and collect the wind, even when it is raining, thru a wide-mouth ram up front in order to supercharge the engine, and wherein, the air intake manifold is communicated to the air inlet of a Hybrid Centrifugal Cyclone Air Cleaner which in turn is communicated to supply clean air to the engine's air intake, as in claim 1 or 6, in order to clean the intake air before it gets into the engine, and wherein, for the same purpose of taking advantage of the effectiveness of humid air in increasing the power output of an engine, as in claim 1, water is mist sprayed to said up front mouth of the air intake manifold to provide clean humid air to the engine when there is no rain shower.

8. A spray-mist-evaporation-blower/air-pump system, that produce clean humid air in accordance with claim 1 or claim 6, including a new design for a gas turbine engine, wherein, for the same purpose of taking advantage of the effectiveness of the hybrid cyclone air cleaner and to take benefits from the advantages of a humid air getting into an engine as in claim 1, a Hybrid Centrifugal Cyclone Air Cleaner is connected to supply clean air to the air intake manifold of the engine, the compressor of the gas turbine engine being the one vacuuming the cyclone air cleaner, and wherein, water is mist sprayed upon the air intake of the cyclone air cleaner, in order to feed the engine with cold humid air, free from salts, minerals, dirt, and water droplets, in order to multiply the power output of the engine.

9. A spray-mist-evaporation-blower-air-pump system, that produce cold dry air in accordance with claim 1, including a new design for a multistage cooling system, wherein, for the same purpose of taking advantage of the effectiveness of a vacuumed chamber to speed up evaporation/cooling process by water mist, the pre-cold air being feed into a vacuumed evaporation air duct comes from a cooling radiator that is inside of another vacuumed evaporation air duct, and that the pre-cold air being feed into a final radiator that is inside a final vacuumed evaporation air duct comes from a radiator that is inside another vacuumed evaporation air duct, and wherein, the cold dry air coming out of the final radiator is feed into a house/office, and into a refrigerator.

10. A spray-mist-evaporation blower/air-pump system, that produce cold humid air in accordance with claim 1, including a new design for an air cooling system, wherein, for the same purpose of taking advantage of the effectiveness evaporating water to speed up cooling process by water mist thru the wind which is confined in a definite path, a plurality of water atomizers are used to spray water mist inside an air duct and a pre-cold compressed air is feed into the main inlet of said air duct in order to push the water-mist-air mixture thru the duct, and the outlet of said air duct being communicated with the place where the cold air is needed.

11. A spray-mist-evaporation-blower/air-pump-condensation system, that speeds up the evaporation of water in accordance with claim 1 or claim 4, including a new design for a salt making and for a water desalination system;

wherein, for the same purpose of taking advantage of the effectiveness of the water mist-blower system in evaporating water thru the wind by misting water in front of an array of multiple blowers as in claim 1, a plurality of standing misting pipes are erected in a multiple array formation together with a multiple array formation of water atomizer;

wherein salt water is mist sprayed thru this system, in order to evaporate the salt water and collect the salt;

wherein, the resulting humid air is enclosed by a high altitude tower inflated light weight balloon structural post frames, curtains and tents to form clouds within said enclosure in order to condense the vapor into a drinking water;

wherein, the major part of the air being used to blow the water mists comes from within said enclosure;

wherein, an inflated light weigh vacuum air duct, consisting of spacedly bundled inflated posts, is erected tall inside the enclosure with its intake mouth extended near to the ceiling of the enclosure to suck the clean vapor/clouds and communicated to deliver the vapor into the air duct system of claim 1 for condensation; and wherein, further, cold condensation plates/tubes are installed inside the enclosure.

12. A spray-mist-evaporation-blower/air pump system, that speeds up the evaporation of water in accordance with claim 1 or claim 5, including a new design for salt making and water desalination system, wherein, for the same purpose of using and taking advantage of the vacuumed chamber to speed up water evaporation by water mist as in claim 1, by means of water atomizer, sea water is mist sprayed into a vacuumed evaporation air duct, and the resulting humid air coming out of the cyclone separator is compressed into a plurality of radiator tubes that are submerged in a cold environment in order to condense the moisture content of the air, and the resulting condensed water stored into a drinking water.

13. A spray-mist-evaporation-blower/air-pump-condensation system, in accordance with claim 1, including a new apparatus for collecting humid air from the clouds and condensing the same into potable water, wherein, in order to take advantage of the God given already cold clean vapor, and for the same purpose of taking advantage of the effectiveness of the vacuum air duct for cooling process, and to take advantage of the effectiveness of compression in condensing vapor, as in claim 1, the apparatus of claim 1 is further improved by incorporating—a high altitude tower wall used to stop the clouds, and to contain the cold thick clouds which are sucked by the vacuum air duct and supplied to an office building or supplied into a high pressure condenser, wherein, the high tower wall comprising: a strong light skin/cloth is made into a large elongated hose and filled up with compressed air or light gas in order for it to stand and serve as light weight post/structural member, the inside of which being sprayed with plastic film to become air sealed; a plurality of the inflated elongated light post structures are bundled together side-by-side and erected on mountain tops to form a high altitude tower wall, or tower enclosure, or tent,—to the level of the clouds,—in order to stop and to accumulate the clouds for forced condensation, if not to produce rain;

wherein, a tall/high tower inflated suction trunk serving as vacuum air duct made of strong fiber sheets is erected within the enclosure on the mountain top to suck the clouds and communicated to deliver the clouds to the vacuum air duct of claim 1; and wherein, the tall inflated suction trunk comprising: a plurality of high pressure light gas inflated post/structural members; a plurality of high pressure inflated structural rings having outside periphery and spacedly arranged co-axially; each inflated post spacedly attached to the outside periphery of each ring and perpendicular to each ring thereby forming a large cylinder, the hole of the rings serving as one central hole of the resulting cylindrical assembly; and a non-porous sheet is wrapped around the cylindrical assembly to form a large air duct, the spaces between the posts, the spaces enclosed by the sheet serve as vapor passages along the resulting inflated air duct, and wherein, water is mist sprayed at the top of the trunk when there are no clouds, to give enough time for the water particles to evaporate while dropping downward inside the trunk, and the truck serves as a vacuumed air duct.

14. A spray-mist-evaporation-blower/air-pump system, that produce cold humid air in accordance with claim 1 or claim 6 including a new design for a gas turbine engine, wherein, to take advantage of using the effectiveness of the vacuumed chamber to speed up the evaporation by water mist in the production of humid air that feeds into an engine, the vacuumed evaporation chamber is assembled in a series with the air intake of an engine by directly connecting and communicating an assembled line of said air duct with said hybrid cyclone air cleaner to the air intake of said gas turbine engine, the turbine compressor pump of said engine is the one vacuuming the evaporation air-duct-cyclone assembly.

15. A spray-mist-evaporation-blower/air-pump-condensation system, in accordance with claim 1, including a new design for a distillation-condensation device, wherein, water vapor, oil vapor, acid vapor, the gas fumes/vapor of burning organic matters, the smoke from incinerators, barbecue fumes, and sulfur vapors are passed thru the multi-tube radiator that is inside the vacuumed air duct evaporation chamber, in order to cool and condense said vapors and to collect the distillates.

16. A spray-mist-evaporation-blower/air-pump-condensation system, that produce humid air in accordance with claim 1, including a new design for a distillation and a water desalination device;

wherein, for the same purpose of using and taking advantage of the effectiveness of the vacuumed chamber to speed up evaporation of the water mist, the vacuumed evaporation air duct system of claim 1 is further improved by incorporating a multi-tube external heating radiator inside a solar trap under the sun, thru which the salt water is heated up before being sprayed into the vacuum air duct; said solar trap being as per claim 1 and claim 13 of U.S. Pat. No. 5,507,943; said radiator being further extended into a fuel burning oven to superheat the salt water, the water outlet of the heating radiator communicated to the misting nozzles;

and wherein further, hot air is being forced thru the multi-tube radiator inside the vacuumed evaporation air duct to enhance evaporation of the water mist being sprayed into the evaporation air duct, and wherein further, the resulting high humidity air coming out of the air duct is being highly compressed at the back of or after the vacuum pump and being released in the form of fine/tiny bubbles thru pressurized distilled cold water in a container that has controlled air/water outlet, and wherein further, the excess/surplus air after condensation is forced to pass thru another multi-tube radiator inside the compressed vapor container at the back of the vacuum pump to pickup heat and being re-used/recycled to continue spraying water mist thru said atomizers into the evaporation air duct so that there is no humid air being expelled out of the system, and a salt extractor being provided at the bottom of the air duct.

17. A spray-mist-evaporation-blower/air-pump-condensation system, that produces humid air and distillates in accordance with claim 1, including a new design for a new distillation device/system or process, wherein, for the same purpose of using and taking advantage of the effectiveness of the vacuumed chamber to speed up evaporation by water mist, the liquid being distilled is pressurized in pipes, then pre-heated in a first multi-tube radiator, then by misting nozzles and atomizers the liquid is mist sprayed into a vacuumed internally heated air duct where the liquid is evaporated, then the resulting hot humid air is sucked from the air duct by a vacuum pump which compresses the hot humid air into a second multi-tube radiator the tubes of which pass inside the tubes of the first multi-tube radiator where the heat is transferred back to the first multi-tube radiator to pre-heat the liquid passing thru the first radiator and to condense the hot humid air, then the un-condensed excess hot humid air which is still high pressure is released in the form of fine/tiny bubbles passing thru multiple standing cold pipes containing the already distilled pressurized cold liquid to further condense vapors still mixed with the compressed air, then the un-condensed compressed air is re-channeled/recycled and forced thru heated compressed air tubes inside the compressed section of the air duct and being used to blow air thru the atomizers at the starting section of the vacuumed air duct, so that there is no additional air coming from outside atmosphere to participate in the process.

18. A spray-mist-evaporation-blower/air-pump system, that produce cold humid air in accordance with claim 1, including a pressurized water container added and connected to the water pipe to supply high pressure water to misting nozzles which are disposed in front of a blower to speed up evaporation thru the wind comprising:

a plurality of pressurized bottles and pressurized tanks serving as water containers to produce high pressure water supply;

a plurality of flexible water hoses connected to and intercommunicating the pressurized water containers;

a compressed air source connected to and intercommunicated, by means of air hoses, with said water containers;

a tubing having a plurality of branches and having an inlet coupling connector;

a plurality of misting nozzles connected to the branches of the tubing;

a flexible water hose connected to and intercommunicating the misting tube-nozzles device with the pressurized water containers, and the misting-tubing-nozzle device attached to a support structure in front of the blower.

19. A spray-mist-evaporation-blower/air-pump system, that produce cold humid air in accordance with claim 1, including a new design for a misting device that is disposed in front of an air blower to speed up evaporation and cooling process thru the wind, comprising:

a tubing, having an inlet connector for liquids and having a multiple of misting branches, directly attached to a front safety framing of an air blower;

a plurality of misting nozzles functionally connected to said tube branches; and a flexible supply hose directly connected to said water inlet connector.

20. A spray-mist-evaporation-blower/air-pump system, that produce cold humid air in accordance with claim 1 or claim 19, including a new design for a misting device that is disposed in front of an air blower to speed up evaporation and cooling process thru the wind, said device being made up of a flexible tubing having multiple misting nozzles connected to it, and said device being coiled into a multi-concentric circles and attached to a framing in front of a blower.

21. A spray-mist-evaporation-blower/air-pump system, that produce cold humid air, in accordance with claim 1, including a new process means for pressurizing a closed tank/container/pipe/inflatable having an intake mouth with an air tight cap, said process means includes a plurality of chunks of Dry Ice or solidified/liquefied air being placed inside said tank thru said intake mouth and then said mouth being air tightly covered with said cap; some use of this pressurized inflatable being, but not limited to, for producing high pressure water connected to misting devices, and for use as light structural members like a boat/platform/roof/post.

22. A spray-mist-evaporation-blower/air-pump-condensation system, that produce cold humid air, in accordance with claim 1, including a new design for a water desalination system, wherein, to further improve the apparatus of claim 1, and for the same purpose of using and taking advantage of the effectiveness of the vacuumed chamber to speed up the evaporation of water mist, an oppositely rotating multistage turbine vacuum pump and a centrifugal multistage axial flow compressor pump are mechanically interconnected/communicated in a series with the outlet of the vacuumed air duct of claim 1 in order to attain high compression of the vapor, each stage of the centrifugal pump having anti-centrifugal instilling fins and excess water catch gutters inside its outlet chamber.

23. A spray-mist-evaporation-blower/air-pump-condensation system, in accordance with claim 1 or claim 6, including a new design for a hybrid cyclone centrifugal separator/air cleaner that also functions as a centrifugal pump to vacuum the evaporation chamber of claim 1, wherein, for the same purpose of using and taking advantage of the effectiveness of the vacuumed chamber to speed up evaporation of water mist, a hybrid cyclone centrifugal air cleaner is provided with central centrifugal blades to pump air, and is functionally connected/communicated to the outlet of the vacuumed chamber to serve as vacuum pump for the evaporation chamber of claim 1, comprising:

a cylindrical drum-type outer main body disposed in a vertical axis, having frustum lower drum extension, and having a circular top cover plate with a center circular window;

a bottom cover plate with an exit door provided to the lower frustum drum;

a cylindrical inner drum with an open top, having inner walls, having a lower section, having a frustum bottom drum extension with a bottom cover plate with an exit door, having a plurality of windows/perforations on its side walls, and centrally placed inside the outer drum, with its open top attached to the top cover plate of the outer drum;

a circular air portal in the form of a large upside down cap with open lips, having a top circular window and having an inlet portal connector, the lip of which being air tightly attached to the center circular window of the top cover plate;

a plurality of vertical plate spacer bars radially inserted evenly spaced around in between, and interconnecting the outer drum body and the inner drum, to create a good instilling space dust settling chamber between the two drums;

a vertical outlet air duct, having a lower section, inserted thru, and attached to, the top circular window of the cap, the bottom end of which being attached by a plurality of radial connector plates to the inside walls of the lower section of the inner drum;

a drum-type motor attached to and around, and co-axial with, the lower section of outlet air duct;

a plurality of wideface centrifugal blades radially/functionally attached to and driven by the drum-type motor;

a plurality of instilling wideface plates spacedly, radially, and vertically attached to the inner walls of the inner drum, and disposed immediately below the centrifugal blades;

an additional smaller perforated frustum drum, having a bottom floor, centrally attached, by a plurality of radial vertical plate spacer bars, to the bottom cover of the inner drum to create additional stilling chambers below the bottom end of the outlet air duct; and the outlet connector lip of the evaporation air duct attached by bolts to the inlet portal connector of the air portal.

24. A spray-mist-evaporation-blower/air-pump system, that produce cold humid clean air, in accordance with claim 1, wherein, for the same purpose of maximizing effectiveness and utilization of the vacuumed chamber—air-cleaning air duct system, the apparatus of claim 1 is further improved by using a newly designed multi-stage air cleaning centrifugal pump, in lieu of a gas turbine pump/air blower, having an inlet functionally connected/communicated to the outlet of the evaporation chamber serving as a vacuum pump for the evaporation chamber of claim 1 and serving to push out/compress the cold air thru its outlet, comprising:

at least one or a plurality of axial flow centrifugal pumps co-axially arranged in a series, acting as one unit, wherein air axially enters and exits from pump to pump;

each pump having a scrawl shell/case enclosing a chamber;

the scrawl shell consisting a front and a rear circular plate wall interconnected by a peripheral outer drum wall;

the front circular plate having a center air passage circular window serving as air inlet of the pump, and having an outer peripheral connector edge attached to the drum;

the rear circular plate wall having a center air passage window serving as outlet for the pump;

each rear circular plate having an inside face;

each drum having a top section and a rear bottom section;

a center axial clearing hole centrally attached by radial flat bars to the air window of each front and each rear circular plate wall;

each peripheral drum wall having an inside face, and having a frustum rear extension drum with an inside face;

each rear extension frustum drum attached to the outer peripheral connector edge of each rear circular plate wall;

an air outlet pipe communicated to the last pump's chamber, piercing the top section of, and attached to, the drum wall;

a waste water outlet pipe communicated to the chamber, piercing the rear bottom section of, and attached to, each drum wall, and having an automatic water release float valve;

a ring-type water catch gutter attached to the inside wall face of the rear circular plate;

a short air duct centrally and co-axially intercommunicating the outlet of the preceding pump to the inlet of the next succeeding pump, and so on;

a pipe drive shaft, having an outside face, having a front end mechanically/functionally attached to a motor set outside the front end of the vacuum air duct, made long enough and extended to pass thru the central axis of the vacuum evaporation air duct, being extended to pass thru and fit with each front center bearing of each pump, and further being extended to pass thru and fit with each rear center bearing of each pump, driving all the pumps as one unit;

a cap attached to and covering the each end of the pipe drive shaft;

the vacuum evaporation air duct having a front end with a throttle air inlet valve, and a front center axial bearing hole fitted to functionally hold on to the end section of the drive shaft;

an inner frustum drum having a front end axially attached by a circular plate of same diameter to and around the outside face of the pipe drive shaft and bumped to the front bearing hole of each front circular plate wall, and having an outside face, and a rear end;

a plurality of wide-face impeller centrifugal blades having a rear edge, placed inside and within the first half section of the scrawl case/pump chamber, each having an inner end radially/spacedly attached to and around the outside face of each inner frustum drum, each having a front edge barely clear off the front circular plate wall, each having a outer end barely clear off the drum wall;

a plurality of stator anti-centrifugal plates/fins spacedly attached to the inside face of each peripheral drum wall and to the inside face of each frustum peripheral drum wall, and barely clear off the outer and rear edges of the centrifugal impeller blades;

the stator plates having front ends made slant against the motion of the centrifugal blades, same plates made curved to be parallel to the drive shaft to stop the air from revolving;

a circular plate driven by the drive shaft, having a center hole attached to the outside face of the drive shaft, same plate shorter than the centrifugal blades to provide air exit at the outer end section of the blades, and same plate attached to the rear edge of, and to serve as means to drive, the centrifugal blades;

a waste water outlet pipe, having an automatic water release float valve, piercing each rear circular plate wall and connected/communicated to the ring-type water catch gutter; and a newly designed and newly invented centrifugal-air-cleaning delivery air duct, comprising:

an inside wall, a bottom;

an air inlet communicated to the outlet of the last air pump of the multistage centrifugal air pump;

a wide-face spiral/helix fin/corkscrew attached to a central axial framing pipe disposed into the air duct, the wide-face fin further attached to the inside walls of the air duct;

a plurality of waste water outlet pipes that pierced the bottom of same air duct, the water outlet pipes provided with an automatic water release float valve, and an outlet communicated to a house/office, for the same purpose of improving the effectiveness of the evaporation-air-cleaning air duct system of claim 1 in removing excess water from the cold humid air.

25. A spray-mist-evaporation-blower/air-pump-condensation system, that produce cold humid air and distilled water in accordance with claim 1, including a new device for forced condensation of the clouds, wherein the vapor air duct of claim 1 is further improved by adding a high elevation suction trunk that supply vapor/clouds into the vacuum air duct of claim 1, for the same purpose of maximizing utilization and taking advantage of the effectiveness of the condensation apparatus of claim 1, and to take advantage of the already clean vapor/clouds, in which case the clouds are compressed inside radiator tubes placed inside the cold vacuumed evaporation air duct in order to produce distilled water out of the clouds, comprising:

- a cloud gathering device in the form of a multi-window erected tower suction trunk serving as cloud/vapor air duct, having an open top and side windows with controlled throttle valves serving as cloud inlet, and having a bottom air outlet communicated to the air inlet of the vacuum air duct of claim 1, the suction trunk laid on mountain slopes or erected on mountain tops, the windows being in various levels/elevations and individually controlled for selective elevation of openings corresponding to the actual cloud location;
- a vacuum/compressor pump, having an outlet, and an inlet connected/communicated with the air outlet of the vacuum air duct;
- a high pressure multi-tube radiator condensation assembly/condenser enclosed by the cold vacuum air duct, having an outlet header pipe, and having an inlet header pipe communicated with the outlet of the compressor pump;
- a plurality of water atomizers attached to a ceiling of the vacuumed air duct;
- an upward branch of the condenser outlet header pipe separating compressed air from the distilled water and extended to supply compressed air thru the atomizer nozzles;
- a downward branch of the condenser outlet to conduct distilled water thru an automatic release float valve into a storage tank.

26. A spray-mist-evaporation-blower/air-pump-condensation system, that produce cold humid air and distilled water in accordance with claim 1, wherein, for the same purpose of maximizing utilization and taking advantage of the compressed vapor-water-tank-tiny-bubbles assembly to speed up condensation as in claim 1, the apparatus of claim 1 is further improved and made adaptable to an effort of gathering the already made clean vapor/clouds, by incorporating a new device to the apparatus of claim 1 in the form of a light weight inflatable tower trunk that gathers the clouds and feeds vapor, thru the vacuum air duct, to a vacuum/compressor pump which feeds compressed vapor to a perforated multiple tube that release tiny bubbles of vapor underwater, comprising:

- a plurality of light weight inflated vertical posts spacedly attached around outside a plurality of vertically and co-axially spaced inflated horizontal rings, the resulting bundle of posts serving as a framing structure;
- the rings spacedly attached to the posts in a vertical array formation thereby creating a large downward passage for the air/clouds thru the rings;
- a light weight sheet wrapped around outside the bundle of posts to create enclosures of large air passages in between posts, thereby creating a large tower suction trunk having a bottom outlet connector;
- a vacuum/compressor pump, having an outlet connector, and having an inlet connected/communicated to the bottom outlet of the trunk via the vacuum air duct;
- a plurality of cut-out windows spacedly created around said wrap sheet at various levels, serving as inlet for the clouds, each windows having a controlled cover for selective opening and/or shut off;
- a pressurized water tank, mostly filled up with clean drinking water, having: a water inlet and a water outlet controlled by automatic release float valve; a top pressure controlled air outlet; a bottom air inlet header pipe communicated with the outlet of the compressor pump and having underwater branches inside the tank;
- a plurality of underwater perforated air tubes spacedly communicated with the underwater branches of the bottom air inlet header pipe, serving as means to release tiny bubbles of the compressed clouds under the water, each tube having a closed end;
- a multi-tube cooling radiator underwater assembly inside the tank, having an air inlet thru one side of, and an air outlet thru the opposite side of, the water tank, and cold air being passed thru said underwater cooling radiator to cool the water; and
- a drinking water supply pipe connected to the water outlet of the tank.

27. A spray-mist-evaporation-blower/air-pump system, that produce vapor and distilled water out of vapor/clouds, in accordance with claim 1, including a new design for converting vapor or humid air or the clouds into drinking water, to take benefits from the effectiveness of the enhanced evaporation and condensation system as in claim 1, comprising: a plurality of multiple vertical wide-face cold plates or sheets arranged into a multi-level roof in a humid environment or to the levels of the clouds, serving as condensation plates assembly; a plurality of cooling tube coils attached on each plate/sheet, and a water gutter attached to edge of each plate/sheet to collect distilled water.

28. A spray-mist-evaporation-blower/air-pump condensation system, that produce vapor and distilled water, in accordance with claim 1,

- wherein, for maximum utilization, the desalination apparatus of claim 1 is further improved to form a new design for a vacuum evaporation chamber for evaporating sea water, and further serving as an ocean platform floater and as ocean wave-energy converter/breaker, having a top floor made of various kinds serving as a playground, an air port, a solar trap, a residential land and agricultural land;
- wherein, for the same purpose of using taking/advantage of the effectiveness of the vacuum chamber in combination with water mist to speed up evaporation as in claim 1, the chamber of claim 1 is further improved and made spacious and elongated to provide evaporation time for the water mist;
- wherein, to take advantage of the structural strength of the chamber, a plurality of these elongated chambers are assembled side-by-side as first layer, and an upper layer of same kind crossing the first layer, and the resulting stiff platform is floated on the ocean, serving as vacuum evaporation chamber as in claim 1;
- wherein, a solar trap in the form of a multi-layer transparent roof flat roof is attached to cover the platform to warm the chambers by sunlight, the roof made strong to serve as playground;
- wherein, each chamber is subdivided by cross walls for safety and to provide a habitable sub-chamber dwelling place or a home underwater with an air supply system; and wherein, each chamber comprising:

a hard main arc action structural vacuum container, having: inside walls, ceiling, one end closed, a vapor outlet, and floor, serving as vacuum evaporation chamber;

each vacuum container made strong against implosion, and made up of various strong materials and forms, some of which being an underground tunnel, masonry duct, wood barrel, transparent glass pipe/drum, concrete ducts, and metallic/plastic pipes, to name a few;

a plurality of framing spacedly attached to the inside walls of the main vacuum container;

a curtain sheet resistant to salt/acid action, having: a ceiling, a floor, an inside face, an outside face;— attached to the framing, covering the ceiling, the inside walls and the floor of the vacuum container;

a few breathing sheltered air holes punched along the ceiling of the curtain to equalize pressure from the outside face to the inside face of the curtain;

a main water supply pipeline and a main compressed air pipeline, connected to and piercing the vacuum container and the curtain sheet;

the water pipe and the air pipe being extended along the length of, and attached to and below the ceiling of, the curtain;

a plurality of atomizer nozzles spacedly communicated with the water pipe and to the air pipe;

a plurality of railroad ties connected/laid on the floor of the curtain sheet;

a couple of rail tract beams laid on the rail ties to form a railway along the vacuum evaporation chamber for easy maintenance;

a low level waste water outlet device, having automatic release float valve, connected to and piercing the floor of the structural vacuum container and the floor of the curtain;

a low level waste water outlet device, having automatic release float valve, connected to and piercing the floor of the structural vacuum container;

a vacuum/compressor pump, connected to and communicated with the vapor outlet of the evaporation chamber, and having an outlet communicated to the inlet of the multiple radiator condensation tube assembly placed inside the evaporation chamber, the condensation tubes having an outlet header pipe;

a cold water tank containing multiple branches of perforated tubes at its bottom section, the perforated tubes having an inlet header pipe piercing one side of the tank and communicated with the outlet of the radiator condensation tube assembly;

each perforated tubes serving as means to release the compressed vapor in the form of tiny bubbles underwater to speed up further condensation.

29. A spray-mist-evaporation-blower/air-pump-condensation system, that produce vapor and distilled water, in accordance with claim 1, including a new design for a desalination system being used in households, in work/office places, on floating transportation, in camping, on floating stations, and as a portable distillation device, wherein, for the same purpose of using and taking advantage of the effectiveness of the a vacuum chamber in combination with water mist to speed up evaporation, and further taking advantage of vapor compression to speed up condensation as in claim 1, the vacuum chamber is made household size and portable, comprising:

a structural vacuum drum strong against implosion disposed at erect posture, having: an outside face, an inside face, an upper/lower end section, a top lip, and a bottom lip, serving as evaporation chamber;

a plurality of reinforcing structural ring ribs spacedly attached to the inside face of the vacuum drum;

at least one window, having a movable transparent cover, cut out thru the drum;

a curtain thin sheet, resistant to salt/acid action, shaped into a form that suit to serve as lining around the inside face of the drum, in a less diameter than the ring ribs, and having collar lips at both ends to fit/rest upon the top/bottom lips of said drum;

at least one sheltered weep air hole punched or provided on said curtain;

a plurality of lock bolt ears attached to the upper/lower end sections of, and outside walls of, the drum;

a cover plate, made strong against implosion, having a cylindrical rim, and attached to and being pressed upon each top/bottom lips of the drum and pressed upon the collar lips of the curtain;

a circular seal sheet placed and sandwiching the curtain collar lips between the cover plates and the drum lips;

a plurality of lock bolt ears, each having a catch notch/hole, correspondingly attached to the cylindrical rim of the cover plate, in pairs with the lock ears of the drum;

a wing knot lock bolt pivotally attached to each lock ear of the drum, and being connected to each corresponding lock ear of the cover plate thru each notch;

a plurality of misting nozzles and/or atomizer nozzles, piercing inward thru and attached to the top/bottom cover plate, to introduce water mist into the evaporation chamber, the bottom nozzles being well above the bottom cover plate;

a couple of compressed air and water supply pipe functionally connected to the atomizer nozzles;

at least a couple of foot-post assembly oppositely attached to the rim of the bottom cover plate, to make a room for outlet devices under the drum;

a vapor outlet pipe, piercing thru and attached to the top/bottom cover plate, having sheltered multiple vapor inlet windows and a wide sheltered inlet mouth, and being extended out of the drum with a vapor outlet;

a vacuum/compressor pump, having an outlet connector, its inlet connected/communicated to the outlet of the vapor outlet pipe;

a high pressure condensation radiator tube/pipe assembly, having a bottom header pipe outlet piercing out thru the bottom cover plate, and having a top inlet header pipe piercing thru the top cover plate and communicated to the outlet of the compressor pump, the condensation radiator assembly placed and made in contact with cold matter—one of which is the vapor inside the vacuum evaporation chamber;

a float valve-type air-water separator device, having an air outlet, a water outlet, and having an inlet communicated to the outlet of the condensation radiator;

a compressed air pipe, having one end communicated to the air outlet of the air/water separator, and another end communicated to the air supply pipe of the atomizer nozzles;

a high pressure potable water tank, having an outlet connector, and having an inlet communicated to the water outlet of the air-water separator;

a water outlet faucet having an inlet connected to the outlet of the high pressure potable water tank;

an automatic waste water/brine expulsion device, having:
a float valve floating on the brine above the bottom cover plate, wherein the bottom section of the vacuum chamber serves as a brine storage tank, having a brine/water outlet pipe communicated with the float valve and piercing down thru the bottom cover plate—serving as drainage for excess water/brine from the drum; and a salt/top water high pressure tank with its outlet communicated with the water supply pipes of the atomizer nozzles.

30. A spray-mist-evaporation-blower/air-pump-condensation system in accordance with claim 1 or claim 29, including a new design for a portable distillation device having a heating system placed inside the vacuum evaporation drum of claim 29, wherein, for the same purpose of taking advantage of the effectiveness of the vacuumed chamber in combination with water mist to speed up evaporation as in claim 1, the vacuumed evaporation chamber is further improved by adding a plurality of heating pipes inside the vacuumed chamber, spacedly piercing and connected to the top and to the bottom cover plates of the vacuum drum, having a top outlet and a bottom inlet, a heat supply medium/device of various kinds—some of which being an electric heating element, and hot air/water from fuel burning engines/engine exhaust pipes/incinerators/volcano/solar to name a few,—being passed thru or being placed inside the heating pipes.

31. A spray-mist-evaporation-blower/air-pump condensation system, that produce humid air and distilled water, in accordance with claim 1, wherein, the desalination apparatus of claim 1 is further improve and the chamber is built floating on water to form a new design for an ocean floating platform serving as a desalination apparatus having a water outlet, and at the same time serving to solve the problems of, and utilizing the energy of the ocean waves, wherein, to maximize utilization, the vacuumed evaporation chamber of claim 1 is further improved to be much longer, larger, structurally stronger, and subdivided into sub-chambers by cross wall for safety against leaks, and made able to carry a floor made of various kinds corresponding to various purposes, some of which are, for an airport, for a residential/industrial land, for natural energy converter and a floor for agricultural activity over and under the ocean;

wherein, some of the sub-chambers are made into residential houses and offices; and wherein, a plurality of the vacuumed chambers are assembled side-by-side into a one layer floating platform on the ocean, comprising:

a plurality of elongated structural vacuum-misting-evaporation-condensation chamber, assembled closely together side-by-side, and laid floating across the waves on the ocean serving as means to produce fresh water supply;

each chamber made of transparent glass and/or salt resistant materials, and made long enough to span at least five water wave lengths;

each chamber subdivided into sub-chambers by internal cross walls to provide safety and underwater dwelling places;

each sub-chamber having air/water inlet and vapor outlet;

each chamber closed at one end, the other end being partially open and provided with energy converters positioned facing the ocean waves;

each energy converter, some of which being floating pipe oscillators, and air trap chambers wherein the air is trapped and compressed by the water waves getting inside the partially open end of the floating pipe chambers, simulating a blow-hole, serving to drive air/water pumps, vacuum/compression pumps, misting devices, and condensation radiators, inter-connected to function in the desalination process, and further, the energy converters made to drive electric generators;

a plurality of structural stiff beams, having an inverted "U" cross section, laid across on the floating evaporation chambers, serving as fastening bars interconnecting the chambers closely, the beams closely assembled together side-by-side forming and serving as a flat floor and to make the whole platform stiff;

each structural stiff floor beam made of various kinds of materials, some of which being transparent glass to make the floor into a solar absorbent or into a solar trap deck to warm up the evaporation chambers by solar heat;

a layer of fertile soil laid on some parts of the floor for agricultural purposes;

a plurality of water pipes laid on the soil, communicated to the water outlet of the desalination apparatus to supply irrigation water to the agri-floor;

an up ward perimeter wall, facing the water waves, constructed on the platform to stop the sea water from getting over on the platform;

a down ward perimeter underwater wall, facing the water waves, attached to the peripheral edges of the floating platform, serving as a stiff resistor apron made strong to prevent the water waves from getting under the platform; and a plurality of oppositely rotating wideface blade/sail type windmills erected on the ocean floating platform to produce additional energy, see claim 1 and claim 18 of U.S. Pat. No. 5,507,943, Application Ser. No. 811,470, Filed Dec. 18, 1991.

32. A spray-mist-evaporation-blower/air-pump-condensation system, that produce humid air and distilled water, in accordance with claim 1, wherein, the desalination vacuum chambers system of claim 1 is further improved by building the chambers underwater as well as floating on water to form a new design for a floating desalination ocean platform to functionally perform as a distillation apparatus in combination with seafood production purposes;

wherein, for the same purpose of maximizing utilization, among other distillation components, a plurality of the vacuumed evaporation chambers of claim 1 are closely assembled into a large floating platform assembly;

wherein, an underwater anti-oscillation platform is rigidly attached by vertical posts well below the floating platform forming a basement floor made of closely assembled vacuum chambers serving to stabilize the floating platform against the action of the water waves in addition to being vacuum evaporation chambers; and wherein, the chambers are subdivided into sub-chambers by cross walls for safety against leaks and some of the sub-chambers used as dwelling places and offices, the whole floating platform, comprising:

a plurality of transparent floating structural vacuum evaporation chambers closely assembled side-by-side by a stiff transparent floor on top of the chambers making the whole floating platform transparent,—to allow sunlight to pass through;

a second deck, in the form of a horizontal closely assembled side-by-side pipes serving as vacuum evaporation chambers, disposed underwater below the floating transparent platform, the underwater deck suspended by tie, struts, posts/bars/ropes spacedly attached to the floating chambers;

the underwater deck serving as an anti-oscillation resistor against the action of the waves upon the floating platform;

a layer of fertile soil, contained in open boxes, deposited on said underwater deck in order to make an underwater agricultural farm;

a plurality of various species of underwater plants planted on the underwater farm,—to grow an underwater forest below the transparent platform;

a floating enclosure water pond for fish culture attached to a side of the floating platform facing away from the water waves; and a plurality of various species of fishes being introduced to live in the forest,—in order to attract various larger species of fishes to stay around the platform,—in order to attract tourist to visit the platform and enjoy catching large fishes.

33. A spray-mist-evaporation-blower/air-pump-condensation system, that produce humid air and distilled water, in accordance with claim 1, wherein, to minimize materials of construction, the vacuum evaporation chamber of claim 1 is further improved to form a new structure for a light weight vacuum evaporation chamber strong against implosion without using salt resistant materials for its main arch action structure, by providing structural interior ribs, interior salt protection curtains in the chamber, and exterior salt protection impervious sheets outside the chamber, wherein, the distillation apparatus of claim 1 is further improved by building each chamber in an erect posture and the misting atomizer nozzles are attached to the highest interior section of each chamber, each chamber made tall enough to provide enough time for the water particles to evaporate while dropping downward in a normal speed in the vacuumed chamber; and wherein, to maximize utilization of the vacuum evaporation chamber of claim 1, the distillation apparatus of claim 1 is further improve to form a new structure that also serve as a floating sea wall, wherein, a plurality of the vertical evaporation chamber are assembled closely side-by-side thru a horizontal frame to form a fence-like wall disposed floating and anchored by kite sling ropes/rods spacedly attached to rocks on the ocean floor to stop the water waves, and to produce a safe harbor; and wherein, some of the chambers are provide with floor, windows, and doors facing away from the water waves to serve as habitable dwelling houses;

the new distillation apparatus comprising:

a plurality of outer drum/pipe, each drum having a top end and a bottom end, a highest/lowest section, an inside and an outside face, end lips, and made of durable and impervious hard materials;

a plurality of impervious protective sheets, durable against salt action, wrapped around or painted on the outside face of each outer drum, a gel coat to mention one paint;

a plurality of arch action rib rings, of various styles—one of which is a combination of stacked frustums of drum cones, oppositely attached to one another, and the stacked ribs attached to the inside face of the outer drum, forming a corrugated interior wall;

an inner drum, serving as curtain wall/sheet resistant to salt/acid action, attached to the ribs, the ends of which correspondingly attached to the end lips of the outer drum;

a weep air hole, in the form of an inverted "U" tube piercing the curtain, provided to equalize pressure on both sides of the curtain;

a cover plate, made strong against implosion, having inlets and outlets, attached to each end of the outer drum, and a plurality of misting devices attached to the highest interior section of each chamber;

a vacuum/compressor pump having an outlet, and having an inlet communicated with the lowest section of each chamber;

a condensation-tube-radiator inside each chamber, having an inlet communicated to the outlet of the compressor; and each radiator having an outlet communicated with the inlet of the clean drinking water tank which has tiny bubble releasing perforated tubes as in claim 1.

34. A spray-mist-evaporation-blower/air-pump-condensation system, that produce humid air and distilled water, in accordance with claim 1, wherein, to minimized cost of construction, there being abundant glass sand around the world as a cheap material resistant to the corrosive action of salt, various acids, and volcanic steam, the distillation apparatus of claim 1 is further improved, by using glass serving as a material for various constructions, and fabrications, in which case, the vacuum evaporation chamber, the vacuum/compressor pumps, the heat exchange radiators, the water tanks, the tubes/pipes, pipe fittings/connectors, drive gears, drive pulleys, drive shafts, turbine blades, mechanical bearings, mechanical valves, posts, footing piles, tension ropes, structural supports, and other components for the complete construction of the apparatus of claim 1 are made/formed out of glass, thereby creating a new use and a new application for glass for the various needs of man;

wherein, the glass vacuum evaporation chambers of claim 1 are assembled in the form of floating structures serving as footings for habitation buildings erected floating out on the ocean;

wherein, in trying to harness volcanic heat energy to heat up water for evaporation in the chambers of claim 1, the pipes and fittings inserted into a geothermal well to conduct volcanic steam are made/formed out of glass;

wherein, in trying to harness solar energy to heat up water for evaporation in the chambers of claim 1, the roofs and structures of houses, habitable buildings power plants, factories, and chemical plants are made/form out of glass in the efforts to form solar traps in the buildings and to form heat insulators in the buildings; and wherein, in the efforts to use a durable material, various building structural parts, water pipes, water tanks, sewer/brine pipes, sewer pumps, pumps for chemicals, and mechanical parts, to meet the needs of man, are made/formed out of glass, in efforts to protect the distilled water in the production and distribution facilities.

35. The distillation system/apparatus of claim 1, further improved including a new condensation system for producing distilled water out of the vapor/fog/clouds, wherein, a plurality of cold plates and tube coils are spacedly assemble into the air supported by structures in a passage of the vapor/fog/clouds so that the vapor condenses freely upon touching the plates, a water gutter is attached to the bottom of each plate, and a pipe line interconnects all gutters collecting all the water into a container, and wherein, to speed up condensation, the plates are improve by attaching cold refrigerating tube coils to each plate.

36. The desalination/distillation apparatus of claim 1,
wherein, to maximize utilization of the vacuum evaporation chamber of claim 1, the chamber is further improved by making it: out of glass, longer, larger in diameter, submerged/floated on the ocean, and subdivided into sub-chambers by cross walls so that some of the sub-chambers have alternative uses/functions aside from being an evaporation chamber, some uses are: a residential house, a potable water tank, a sea water tank, a compressed air tank, an oxygen tank, a fuel tank, a machinery chamber, an engine room, a pressurized landing porch, and aquarium for live fish, to name a few, the sub-chambers intercommunicated by lock doors on the cross walls and further intercommunicated by pipes;
wherein, both ends of the chamber is made pointed and an underwater directional propeller is mechanically/functionally connected to an engine inside the engine room at one end of the chamber, so that the chamber serves as a mobile home, and also serves as an underwater submarine transportation for: people, live fish, potable water, fuel, and other merchandise, to name a few cargo;
wherein, an air pump is installed in one sub-chamber, communicated with the compressed air tank serving to inject compressed air into the sea water tank to float the whole chamber, and to withdraw compressed air from the sea water tank to submerge the whole chamber, the air pump further serves to circulate/supply fresh air into the house, into the landing port, into the engine room, into the machinery room and into all the sub-chambers thru air ducts communicated to the air above the ocean;
wherein, a plurality of anchor connectors are attached to the bottom of the chamber and connected by ropes to anchor rocks on the ocean floor; and
wherein, the vacuum chamber also serves as a fishing boat and a fishing submarine decorated with scales, fins and with a caudal tail and formed into a mechanical fish.

37. The evaporation/condensation chamber of claim 1 further improved by sub-chambers made habitable with oxygen supply, and decorated with scales, fins and with a high power mechanical caudal tail propeller, in order to serve as water transportation and a mobile house, in order to maximize utilization of the chamber.

38. The evaporation/condensation chamber of claim 1 further improved by sub-chambers made habitable with oxygen supply, and decorated by scales, fins and a mechanical caudal tail propeller, having: a head serving as driver compartment, a plurality of wheels attached to and carrying the fish, an engine attached to the fish and mechanically connected to the wheels controlled by the driver, and the apparatus used as land transportation for people and for live fish wherein most part of it is in the form an aquarium, in the effort to maximize utilization of the chamber.

39. The evaporation chamber and condensation apparatus of claim 1 further improved by incorporating a new design of smokeless trash incinerator system, wherein the trash is burned from the top, to heat up the vacuum chamber, to heat up the water being evaporated and to heat up the compressed air used to blow out the atomizer nozzles, the trash incinerator comprising:

a chimney vertically disposed below the vacuum chamber, having: a bottom covered/closed by a bottom plate, a top covered/closed by a top plate, an upper ¼ point, a bottom section, a top section pierced up into the front section of the vacuum chamber, and a bottom section main inlet door having an upper and a lower lips;

a trash burning chamber with a rear end horizontally communicated to, and thru the bottom section inlet door of, the chimney, having: a high ceiling with a plurality of fresh air downward nipples, an upper front end fresh air entrance gate with a throttle, a lower front end, and a smooth floor thru which the trash slides to the rear;

a plurality of fresh air supply perforated pipes/nipples attached to and piercing the ceiling of the burning chamber, each nipple having an upper end open and a lower end open, serving to oxidized gas fumes on the trash and fumes rising up the ceiling;

the ceiling of the burning chamber made high enough to accommodate a good length of the nipples from the ceiling going downward near and above the burning trash, to provide sufficient time heating up the oxidation fresh air;

the upper lip of the main inlet door at bottom section of the chimney being lower than the ceiling of the burning chamber, serving to trap the rising gas fumes to the ceiling thereby providing time for complete oxidation;

an ash outlet downward pipe piercing thru the bottom cover plate of the chimney, disposed at the rear end of the burning chamber, having a couple of control valves;

a trash feeder smooth horizontal elongated chamber having a rear end communicated to the lower front end of, and delivering trash into, the burning chamber, having a front open end, a front section, a ceiling, a straight smooth floor, and a midsection;

a trash receptacle/bin having an open top, having an open bottom communicated to and thru an opening on the ceiling of the midsection of the trash feeder chamber, and having a rear bottom lip lower than the ceiling of the feeder chamber;

an elongated piston, tight fitted into the trash feeder chamber, having wheels resting on the trash feeder floor, and a head end facing the trash;

a hard metal sharp edge piston ring serving as cutting share blade/die attached to the head end of the piston;

a hard metal sharp edge share die attached to the lower rear lip of the bin;

a vertical enclosure pre-heating pipe surrounding the chimney, made large enough to provide air duct space created between the chimney and the enclosure pipe, having: a lower end section, a closed top end connected to and sealed air-tight with the upper ¼ point of the chimney, and an open bottom end main fresh air entrance lower than the burning chamber;

a vertical subdivision wall air tightly inter-connecting the chimney with the enclosure pipe on opposite sides of the chimney, effectively dividing the fresh air supply duct into two and forcing the fresh air to travel up and down the chimney sides;

a horizontal box enclosure air-tightly connected to and communicated with the lower end section of the vertical enclosure pipe, serving as roof and side wall heat insulator for the burning chamber, made large enough thereby creating a fresh supply air passage over and around the burning chamber;

a vertical wall sealing the front end of the horizontal box enclosure, spacedly enclosing the throttle valve, and air-tightly connected around the feeding chamber;

an internal vertical chimney inside the vacuum chamber, having a closed bottom section and an open top end pierced up thru the ceiling of the vacuum chamber;

a plurality of heating radiator tubes inside the chamber, piercing and inter-communicating the top section of the chimney with the bottom section of the internal chimney;

a vertical box chimney disposed above the chamber, having a top and a bottom cover plates, made proportionally thin and horizontally wide, communicated with the open top end of the internal chimney, having: multilevel subdivision floors forming a horizontal zigzag chimney, and a straight upright pipe waste hot air outlet chimney;

a couple of air/water pipes installed bend following the zigzag chimney for heating up the water and the compressed air which finally exit as hot water mist thru the atomizer nozzles, to speed up evaporation in the vacuum chamber; and the chimney having perforations on ½ side facing the downward fresh air supply duct.

* * * * *